(12) United States Patent
Anderson et al.

(10) Patent No.: US 10,647,031 B2
(45) Date of Patent: May 12, 2020

(54) METHOD AND FIXTURE FOR MOLDING A TANK WITH AN EMBEDDED RING

(71) Applicants: Kenneth S. Anderson, Rexburg, ID (US); Klint S. Anderson, Rexburg, ID (US); Chad Strombeck, Ramsey, MI (US)

(72) Inventors: Kenneth S. Anderson, Rexburg, ID (US); Klint S. Anderson, Rexburg, ID (US); Chad Strombeck, Ramsey, MI (US)

( * ) Notice: Subject to any disclaimer, the term of this patent is extended or adjusted under 35 U.S.C. 154(b) by 185 days.

(21) Appl. No.: 15/612,810

(22) Filed: Jun. 2, 2017

(65) Prior Publication Data

US 2018/0071960 A1    Mar. 15, 2018

Related U.S. Application Data

(62) Division of application No. 15/391,439, filed on Dec. 27, 2016, now Pat. No. 9,802,340.

(60) Provisional application No. 62/393,402, filed on Sep. 12, 2016.

(51) Int. Cl.
| | |
|---|---|
| *B29C 41/20* | (2006.01) |
| *B29C 33/12* | (2006.01) |
| *B29C 41/04* | (2006.01) |
| *B29C 41/38* | (2006.01) |
| *B29C 41/42* | (2006.01) |
| B29K 705/00 | (2006.01) |
| B29L 31/00 | (2006.01) |

(52) U.S. Cl.
CPC .............. *B29C 41/20* (2013.01); *B29C 33/12* (2013.01); *B29C 41/04* (2013.01); *B29C 41/38* (2013.01); *B29C 41/42* (2013.01); *B29K 2705/00* (2013.01); *B29L 2031/7172* (2013.01)

(58) Field of Classification Search
CPC ......... B29C 41/04; B29C 41/20; B29C 41/38; B29C 41/42; B29C 33/12
See application file for complete search history.

(56) References Cited

U.S. PATENT DOCUMENTS

| | | | |
|---|---|---|---|
| 2,959,816 A | | 11/1960 | Valentine |
| 4,023,257 A | | 5/1977 | Wright et al. |
| 4,357,293 A | | 11/1982 | Williamson, Jr. |
| 5,356,589 A | | 10/1994 | Sugalski |
| 5,374,026 A | * | 12/1994 | Spurrier .............. B29C 33/0033 249/111 |

(Continued)

*Primary Examiner* — Galen H Hauth
(74) *Attorney, Agent, or Firm* — Schmeiser, Olsen & Watts LLP

(57) ABSTRACT

A method of and fixture for molding a product with an embedded ring. A system for molding a ring into a product including a rotational molding mold with an opening formed in the rotational molding mold sized to fit a ring. A fixture is removably couplable to the ring, wherein the ring and the fixture when coupled are removably couplable in the opening. The fixture is removed from the ring after the ring is molded into a product. A method of manufacturing a product with an embedded ring includes: coupling a ring to a fixture; clamping the fixture and the ring in an opening in a mold top; clamping the mold top to a mold bottom; rotomolding a product; unclamping the fixture from the mold top; uncoupling the fixture from the ring; unclamping the mold top and the mold bottom; and removing the product from the mold.

19 Claims, 65 Drawing Sheets

(56) References Cited

U.S. PATENT DOCUMENTS

| | | |
|---|---|---|
| 5,794,805 A | 8/1998 | Branham |
| 6,193,924 B1 | 2/2001 | Huse |
| 6,415,941 B1 | 7/2002 | Huse |
| 7,083,065 B2 | 8/2006 | Zdroik |
| 8,556,109 B2 | 10/2013 | Fujita |
| 2007/0090566 A1* | 4/2007 | Westhoff .............. B22D 19/009 264/274 |
| 2013/0026684 A1 | 1/2013 | Romero De La Mora |

* cited by examiner

METHOD AND FIXTURE FOR MOLDING A TANK WITH AN EMBEDDED RING

CROSS REFERENCE TO RELATED APPLICATION[S]

This application claims priority to U.S. patent application entitled "METHOD AND FIXTURE FOR MOLDING A TANK WITH AN EMBEDDED RING," Ser. No. 15/391,439, filed Dec. 27, 2016, and U.S. Provisional Patent Application entitled "METHOD AND FIXTURE FOR MOLDING A TANK WITH AN EMBEDDED RING," Ser. No. 62/393,402, filed Sep. 12, 2016, the disclosures of which are hereby incorporated entirely herein by reference.

BACKGROUND OF THE INVENTION

Technical Field

This invention relates to a method and fixture for rotationally molding a tank with a ring embedded in it.

State of the Art

Many everyday products are rotationally molded. Rotational molding or rotomolding is a high temperature, low pressure process that uses heat and biaxial rotation to produce hollow, one-piece parts.

In rotomolding, a mold is filled with powdered or liquid polymer material. The mold is then heated in an oven and rotated until the polymer material is melted. As the mold rotates, the polymer material coats the inside of the mold. The mold is then cooled and the polymer material hardens. The mold is opened and the part is removed.

Rotomolding allows for the production of parts that would normally require multiple pieces coupled together to be formed as a single piece reducing manufacturing costs. Additionally, inserts such as metal pieces may be placed in the mold and the part may be formed around them in certain situations.

The problem, however, is that in order to form a rotomolded part that has an insert such as a metal ring or other metal piece, the insert must be supported in such a way that there are not holes in the resulting product from the support system. This can be a problem if an insert is to be placed in the center of a surface in the part.

Many fuel tanks use a part referred to as a lock ring in order to attach a sending unit or other accessory to the tank. These rings have an unusual cross section that makes holding them in place in a mold difficult. Additionally, the rings are usually located in a more central location in a tank wall.

Therefore, these rings are not used in rotomolded fuel tanks or they are attached to a tank by screwing the ring to threaded inserts that are rotomolded in the tank. This process adds time and expense to the tank manufacturing process.

Accordingly, what is needed is a method and fixture for allowing a lock ring to be rotomolded in place in a tank surface.

DISCLOSURE OF THE INVENTION

The disclosed invention relates to a method of and fixture for manufacturing a product such as a fuel tank with an embedded lock ring or other similar insert.

An embodiment of a system for rotationally molding a ring into a product includes a rotational molding mold. An opening formed in the rotational molding mold sized to fit a ring. A fixture is removably coupled to the ring, wherein the ring and the fixture when coupled are removably coupled in the opening. Wherein the fixture is removed from the ring after the ring is molded into a product.

An embodiment of a method of manufacturing a product with an embedded ring includes: coupling a ring to a fixture; clamping the fixture and the ring in an opening in a mold top; clamping the mold top to a mold bottom; rotomolding a product; unclamping the fixture from the mold top; uncoupling the fixture from the ring; unclamping the mold top and the mold bottom; and removing the product from the mold top and the mold bottom.

An embodiment of a fixture for holding a ring in a mold for rotational molding includes a locking plate, wherein the locking plate rotatably receives a ring. A fixture plate is coupled to the locking plate. The fixture plate having a ridge for placement in a fixture opening in a rotational molding mold.

An additional embodiment of a system for rotationally molding a ring into a product including a rotational molding mold with an opening formed in the rotational molding mold sized to fit a ring. A fixture may be removably coupled to the ring, wherein the ring and the fixture when coupled are removably coupled in the opening. The fixture having a locking plate for receiving a plurality of coupler teeth on the ring and a fixture plate, wherein the fixture plate is removably coupled to a top of the locking plate. The fixture plate covers openings in the locking plate. The fixture is removed from the ring after the ring is molded into a product.

An additional embodiment of fixture for holding a ring in a mold for rotational molding may include a locking plate, wherein the locking plate receives a plurality of coupling teeth on a ring. The locking plate locks the ring into a fixture. A fixture plate coupled to the locking plate, wherein the fixture plate and the locking plate form a solid surface. The fixture plate having a ridge for placement in a fixture opening in a rotational molding mold.

An additional alternate embodiment of a system for rotationally molding a ring into a product includes a rotational molding mold. An opening formed in the rotational molding mold sized to fit a ring. The ring having a plurality of coupler teeth and mounting tabs. A fixture removably coupled to the ring, wherein the ring and the fixture when coupled are removably coupled in the opening. The fixture including a locking plate; a plurality of slots formed in the locking plate, wherein the plurality of slots rotatably receive the plurality of coupler teeth of the ring; and a fixture plate removably coupled to the locking plate. The fixture plate and the locking plate form a solid surface within the ring. The fixture plate covering openings in the locking plate. The fixture is removed from the ring after the ring is molded into a product.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DETAILED DESCRIPTION OF EMBODIMENTS OF THE INVENTION

Figure 1:
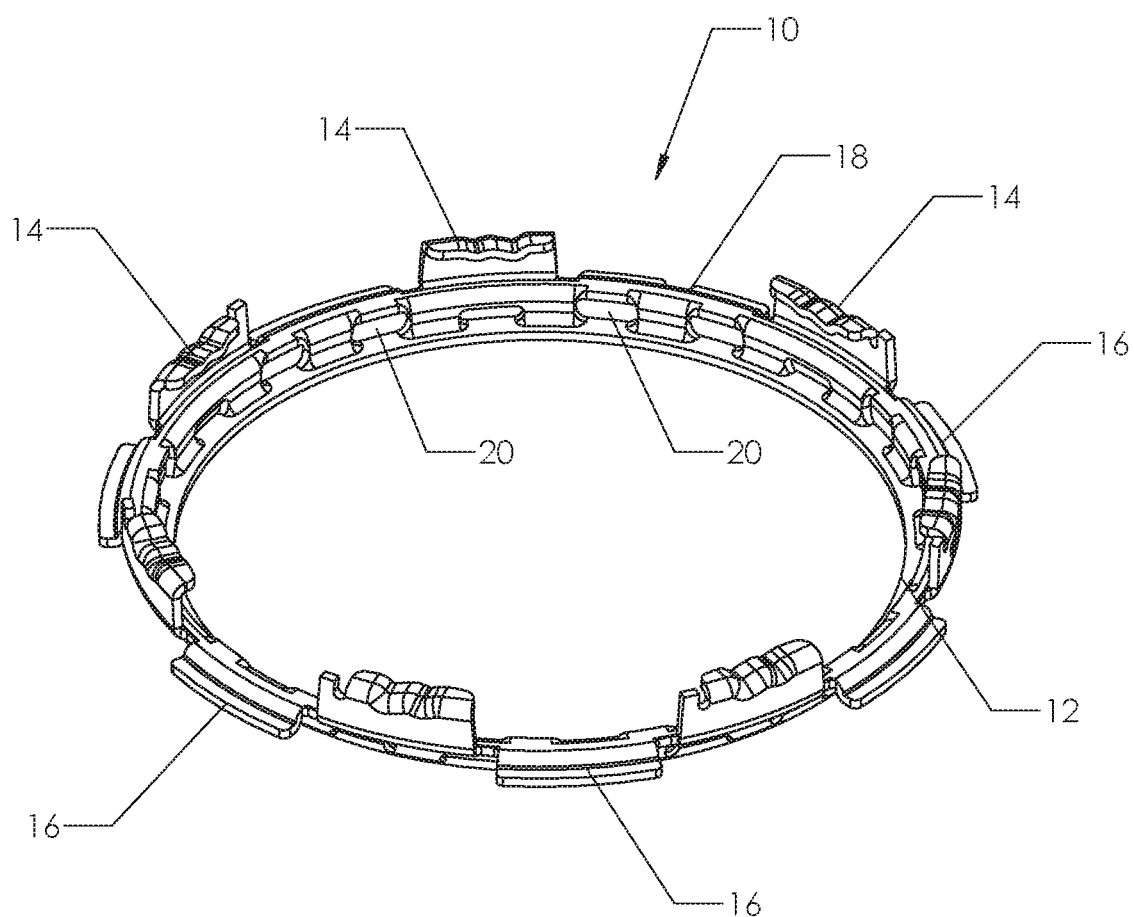
FIG. 1 is an isometric view of a lock ring.
Figure 2:
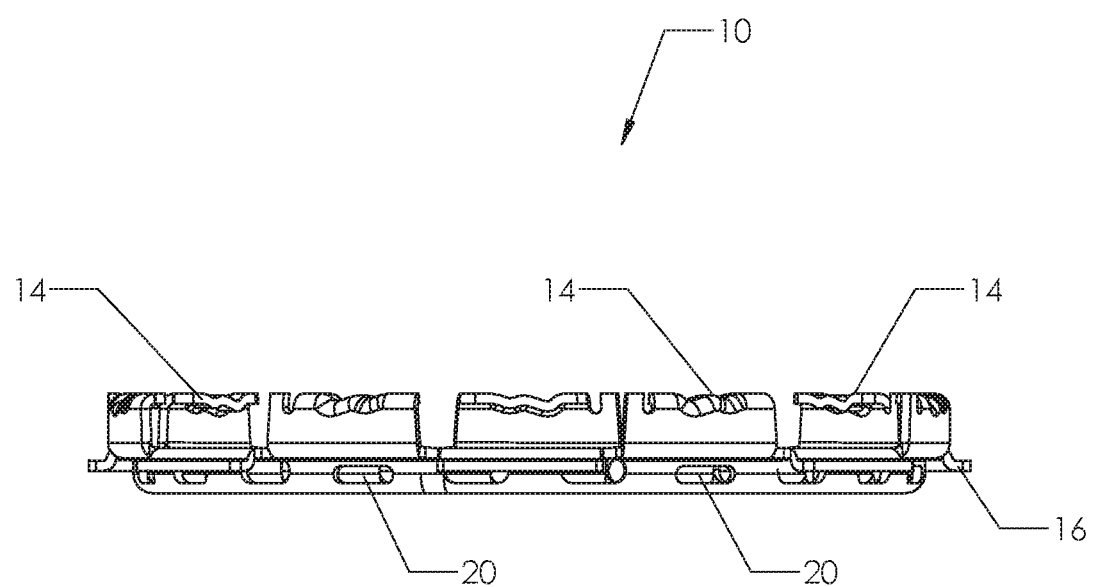
FIG. 2 is a side view of a lock ring.
Figure 3:
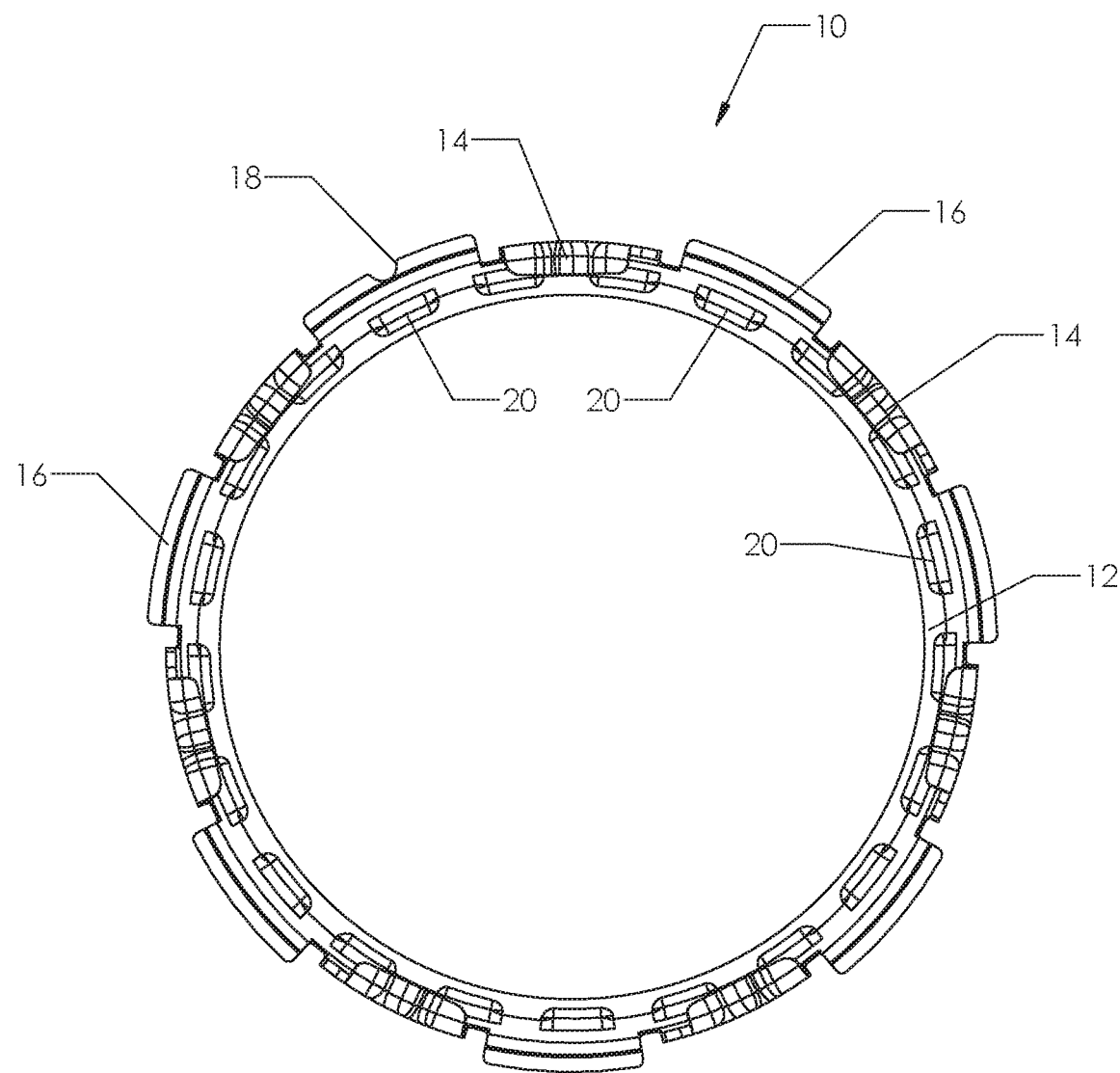
FIG. 3 is a top view of a lock ring.
Figure 4:
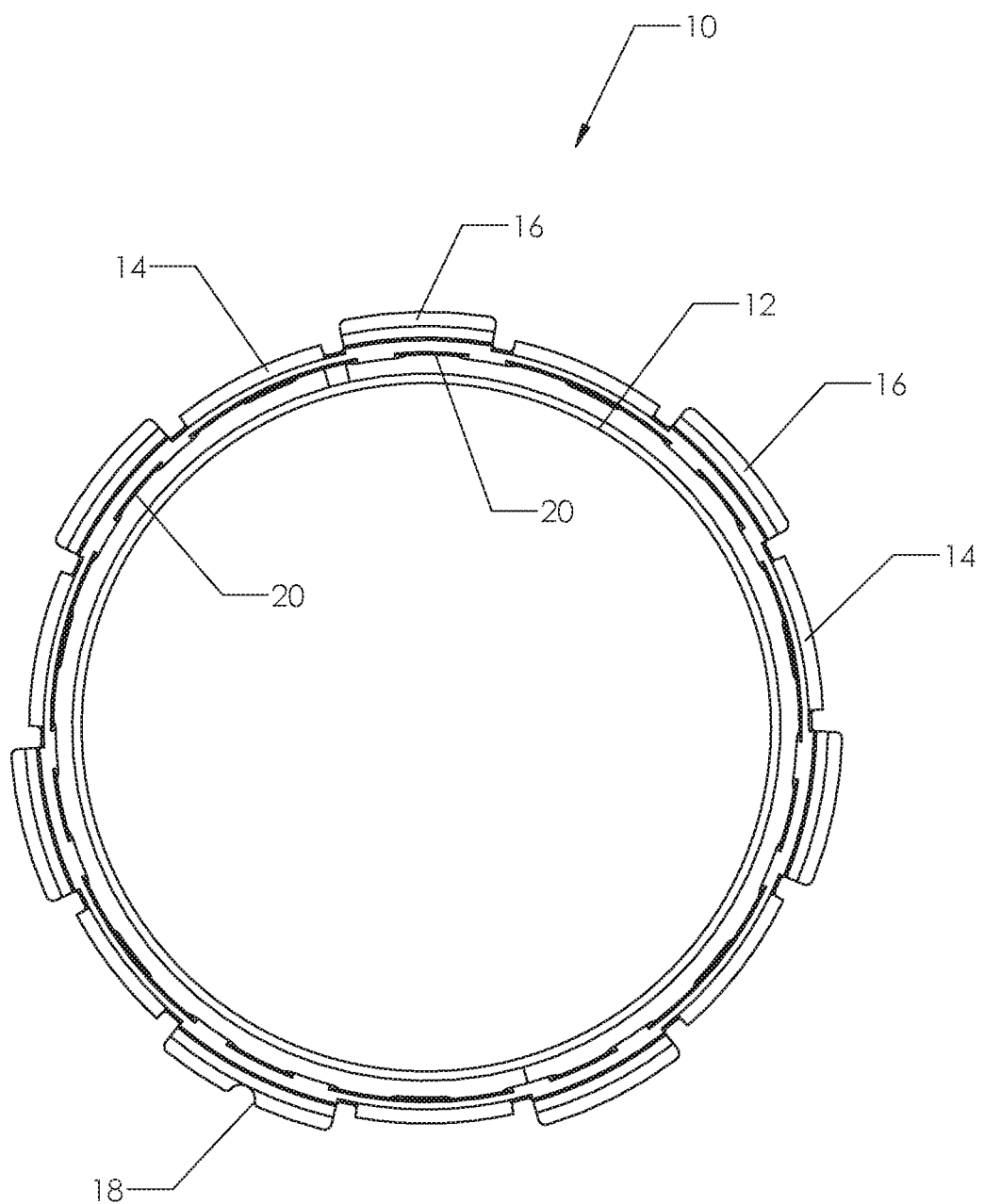
FIG. 4 is a bottom view of a lock ring.
Figure 5:
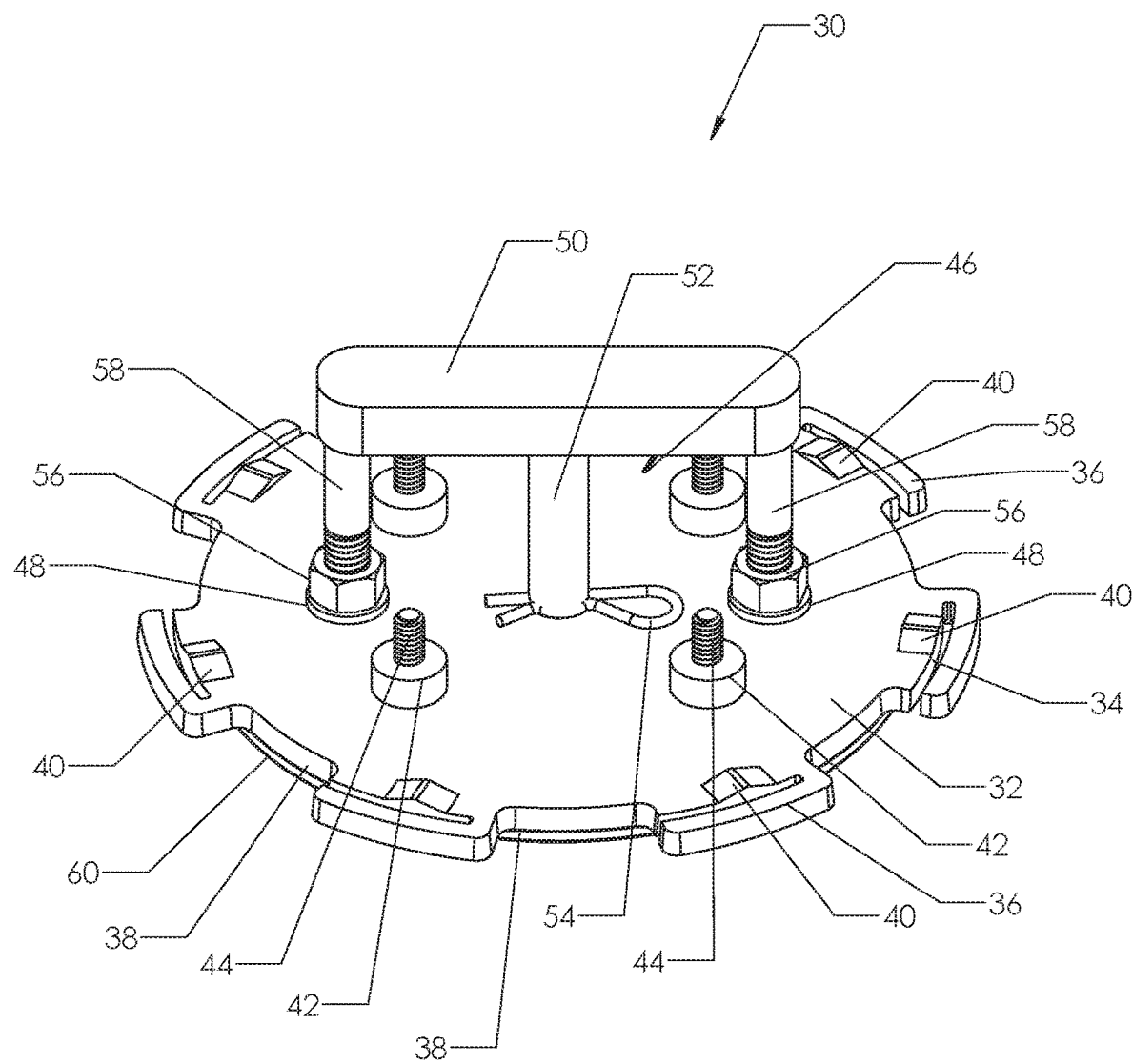
FIG. 5 is an isometric view of a first embodiment of a locking plate of a fixture for holding a lock ring in a rotational molding mold.
Figure 6:
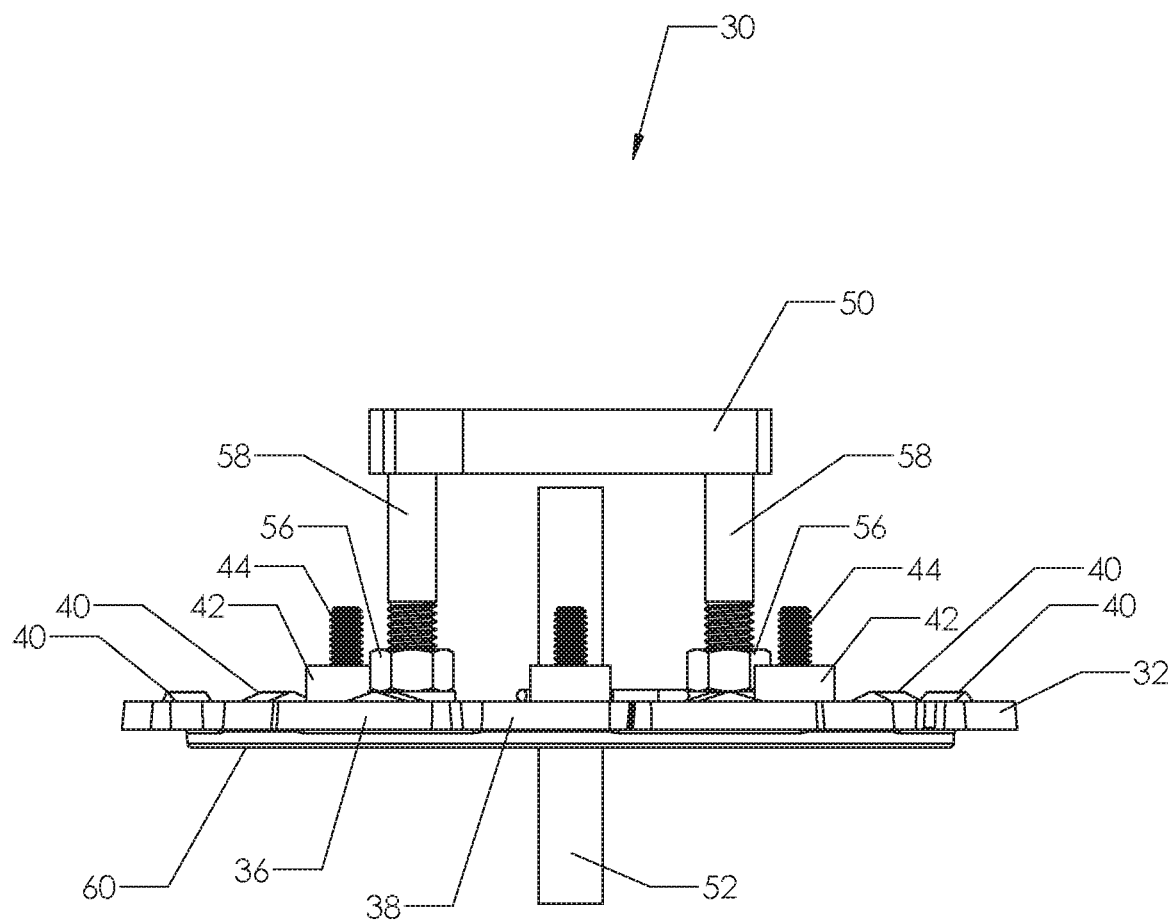
FIG. 6 is a side view of a first embodiment of a locking plate of a fixture for holding a lock ring in a rotational molding mold.
Figure 7:
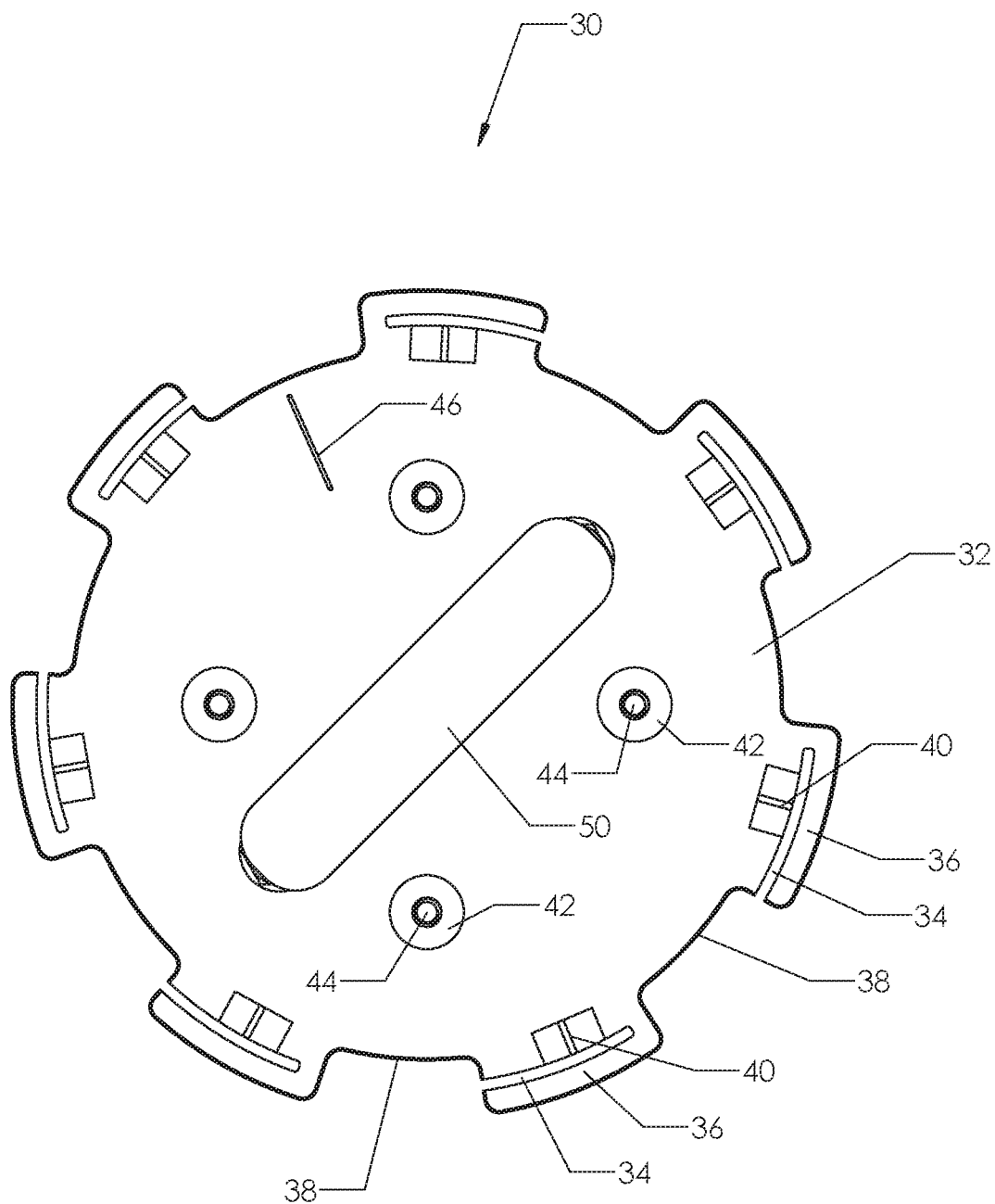
FIG. 7 is a top view of a first embodiment of a locking plate of a fixture for holding a lock ring in a rotational molding mold.

As discussed above, embodiments of the present invention relate to a fixture for and method of manufacturing a product such as a fuel tank with an embedded insert such as a lock ring.

FIGS. 1-4 illustrate an embodiment of a lock ring 10. This ring may also be known as an encapsulated ring. The lock ring 10 is used to couple accessories such as sending units to fuel tanks on vehicles. The lock ring 10, for the purposes herein, may be any size or shape desired. The lock ring 10 configuration is not limiting as the lock ring 10 itself, as well as variations of the lock ring 10, are well known in the art.

The lock ring 10 includes a ring body 12. The ring body 12 is the underlying ring shape used to form the basis of the lock ring 10. The ring body 12 may be any size or shape desired. The ring body 12 may be round as illustrated or may be oval, square or the like. The ring body 12 may be one solid piece or may have openings formed in it.

The lock ring 10 also includes coupler teeth 14 formed in the top of the ring body 12. The coupler teeth 14 extend perpendicularly from the ring body 12, with a 90 degree bend near the top of the teeth 14. The coupler teeth 14 also have ridges formed near the 90 degree bend of the teeth 14. The 90 degree bend and the ridges help the coupler teeth 14 to securely lock an accessory such as a sending unit into place.

The lock ring 10 also includes mounting tabs 16 which are used to mount the lock ring 10 to a product or item such as a fuel tank. These mounting tabs 16 are tabs that extend from the outside of the ring body 12. The mounting tabs 16 are bent slightly towards the bottom of the ring body 12.

The lock ring 10 includes an alignment mounting tab 18. The alignment mounting tab 18 may be wider than the other mounting tabs 16. Additionally, the alignment mounting tab 18 may have a cutout or mark formed in its edge in order to form a location which may be aligned with other alignment marks on the molds and the tanks.

The lock ring 10 also contains multiple holes or openings 20 formed through the ring body 12. The openings 20 allow material to flow through the ring during molding, thereby creating a more secure coupling between the tank or other product and the lock ring 10.

In order to use a lock ring 10 on a product such as a fuel tank, typically the fuel tank must be manufactured through blow molding or injection molding as the lock ring 10 is designed to be used in blow or injection molds. Alternatively, a different insert may be molded into a rotomolded tank and then the lock ring 12 may be coupled to this insert. Both of these options are significantly more expensive than molding the lock ring 10 into a rotomolded tank, as rotomolding is cheaper than blow molding for smaller batches of products such as are used for aftermarket tanks.

When using the lock ring 10 to couple an item to the product, the item such as a sending unit is placed inside the ring. An additional top ring is placed on top of the sending unit and is rotated so the top ring locks into the coupler teeth 14 to push down on the sending unit and seal it into place.

Mounting or molding the lock ring 10 to the product, as described previously, is expensive. A cheaper method of mounting the lock ring 10 would be to rotomold the lock ring 10 into place on the product or tank. However, a fixture for holding the lock ring 10 in place inside the mold for rotomolding, in such a way that the fixture that holds the lock ring 10 does not interfere with the design of the product, has not been available previously.

A system for securing a lock ring in a rotational molding mold may include a mold with an opening formed in it and a fixture for securing the lock ring in the opening in the mold.

FIGS. 5-8 illustrate a first embodiment of a locking plate 30 which is used as part of a fixture for holding a lock ring 10 in a mold for rotomolding. Locking plate 30 is used to hold the lock ring 10 securely in the fixture.

The locking plate 30 is a circular plate 32 formed from metal or another material that can withstand the rotomolding process. The locking plate 30 has a thickness that is less than the height of the coupler teeth 14 of the lock ring 10.

Though illustrated as a circular plate 32, the locking plate 30 may be formed in any shape required to mate with the lock ring 10 desired to be molded into a product.

The locking plate 30 has a circular edge with a diameter slightly larger than that of the lock ring 10. The locking plate 30 has indented locations 38 evenly spaced around the outside of the locking plate 30.

The locking plate 30 also has extended locations 36 formed between the indented locations 38 around the outside of the locking plate 30. The extended locations 36 are portions of plate material that are the full diameter of the locking plate 30, or in other words, the extended locations 36 have an outer edge forming a diameter slightly larger than that of the lock ring 10.

The locking plate 30 has slots 34 formed at a location inset for the outer edge of the extended locations 36. The slots 34 are formed in the extended locations 36 on the locking plate 30. The slots 34 extend from a side of the extended locations 36 towards the opposite side of the extended locations 36. The slots 34 do not extend the entire width of the extended locations 36. The slots 34 pass through the entire thickness of the locking plate 30.

The slots 34 are formed as thin rectangular cuts through the locking plate 30.

Additionally, the locking plate 30 includes triangular locks 40 located at the inner edge of the slots 34. The triangular locks 40 are triangular pieces that extend above the surface of the locking plate 30. The triangular locks 40 have a rounded top.

The triangular locks 40 may be any thickness, width or height desired, provided the triangular locks 40 are sturdy enough to lock the lock ring 10 in place.

The triangular locks 40 though illustrated as triangles, may in fact be any shape desired.

The locking plate 30 also has fixture plate coupler locations 42 formed in it. The fixture plate coupler locations 42 are cylinders extending from the top of the locking plate 30. Through the center of the cylinders, a hole is drilled in order to allow a coupler such as a bolt to extend from the bottom of the locking plate 30, up through the cylindrical, fixture plate coupler location 42.

There may be as many or as few fixture plate coupler locations 42 as desired, provided that there are enough of the fixture plate coupler locations 42 to securely couple a fixture plate to the locking plate 30 and few enough to allow the fixture to be easily assembled and disassembled.

The hole through the fixture plate coupler locations 42 may be threaded in order to receive a bolt.

Figure 8:
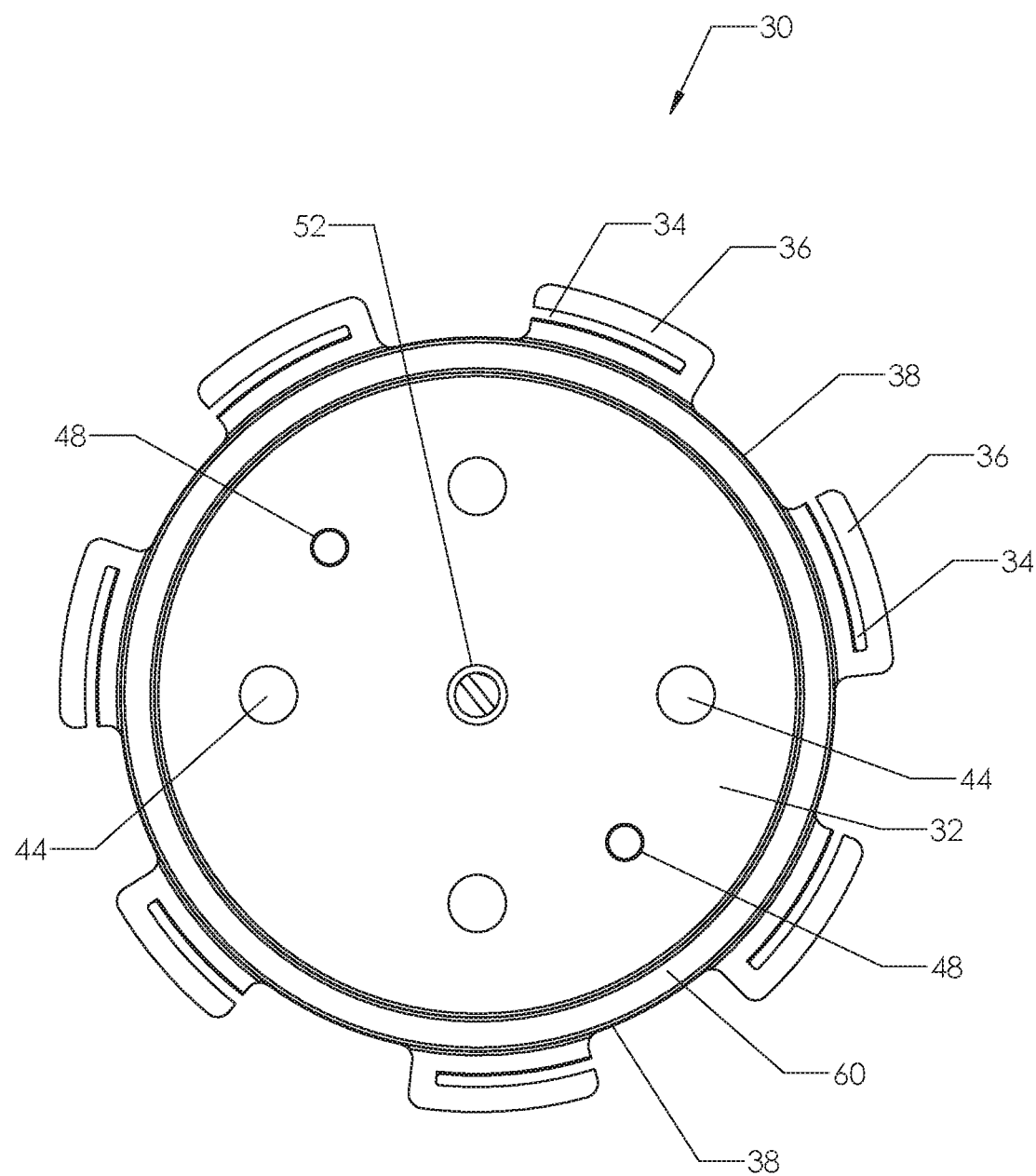
FIG. 8 is a bottom view of a first embodiment of a locking plate of a fixture for holding a lock ring in a rotational molding mold.
Figure 9:
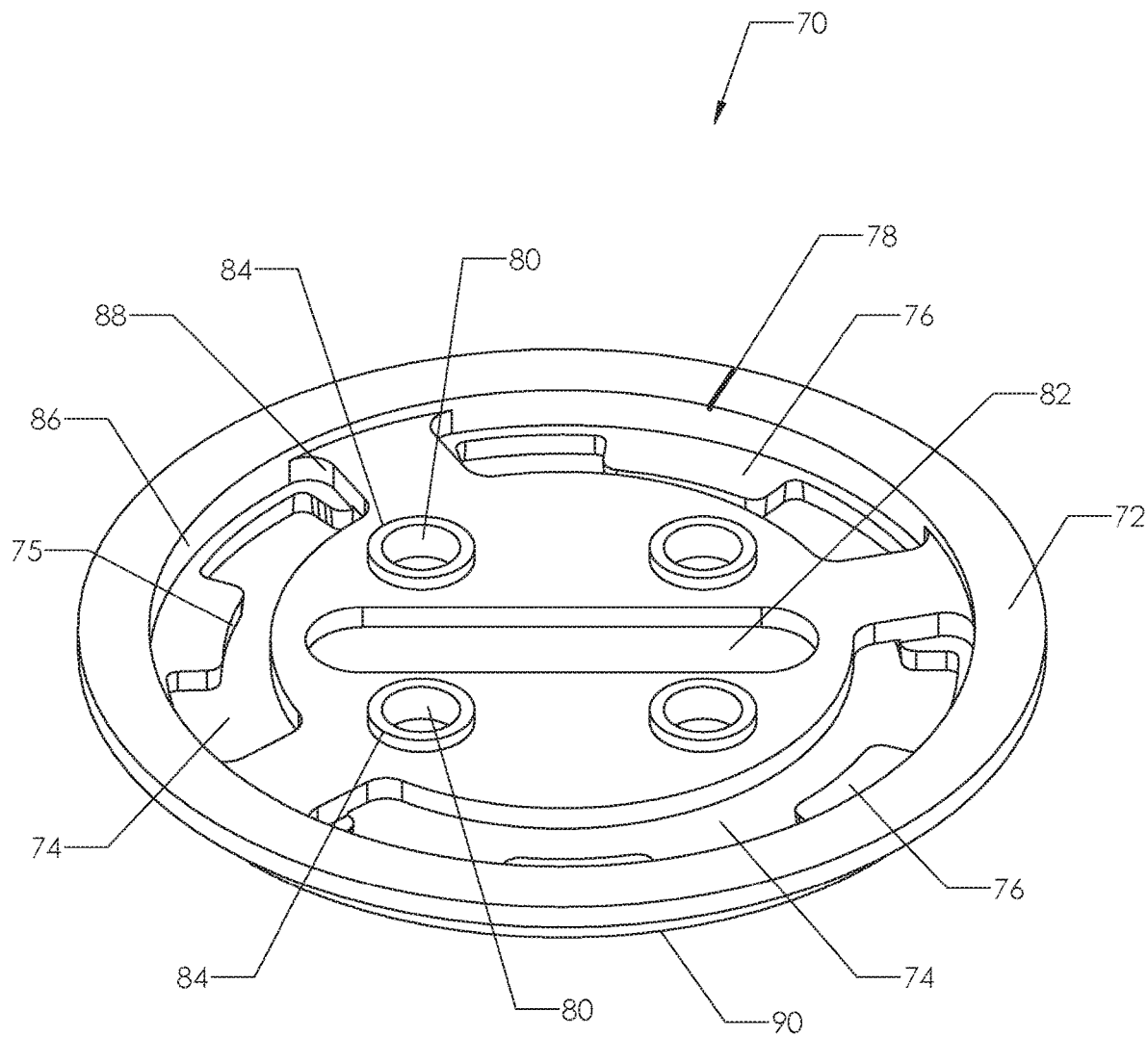
FIG. 9 is an isometric view of a fixture plate of a fixture for holding a lock ring in a rotational molding mold.
Figure 10:
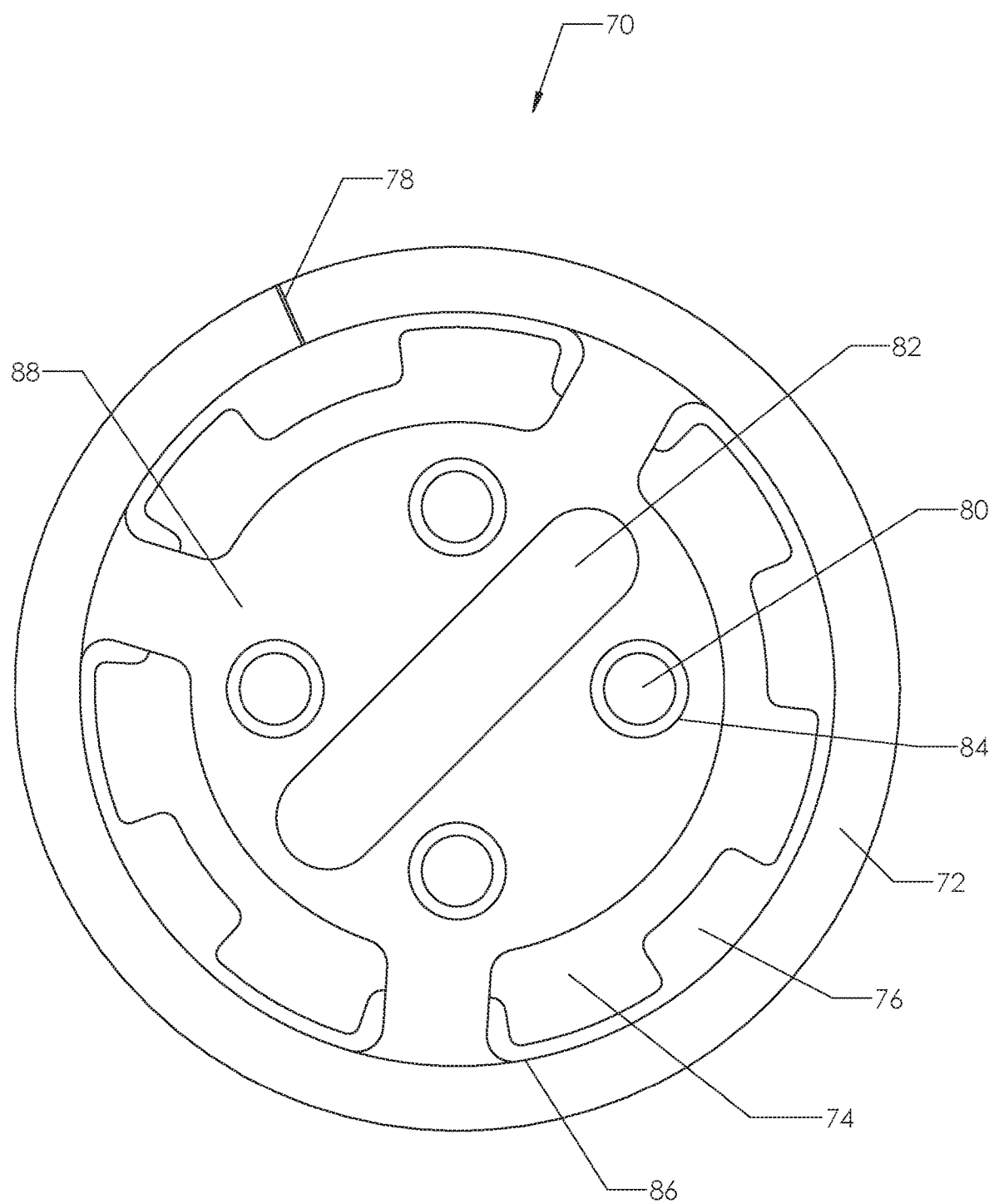
FIG. 10 is a top view of a fixture plate of a fixture for holding a lock ring in a rotational molding mold.
Figure 11:
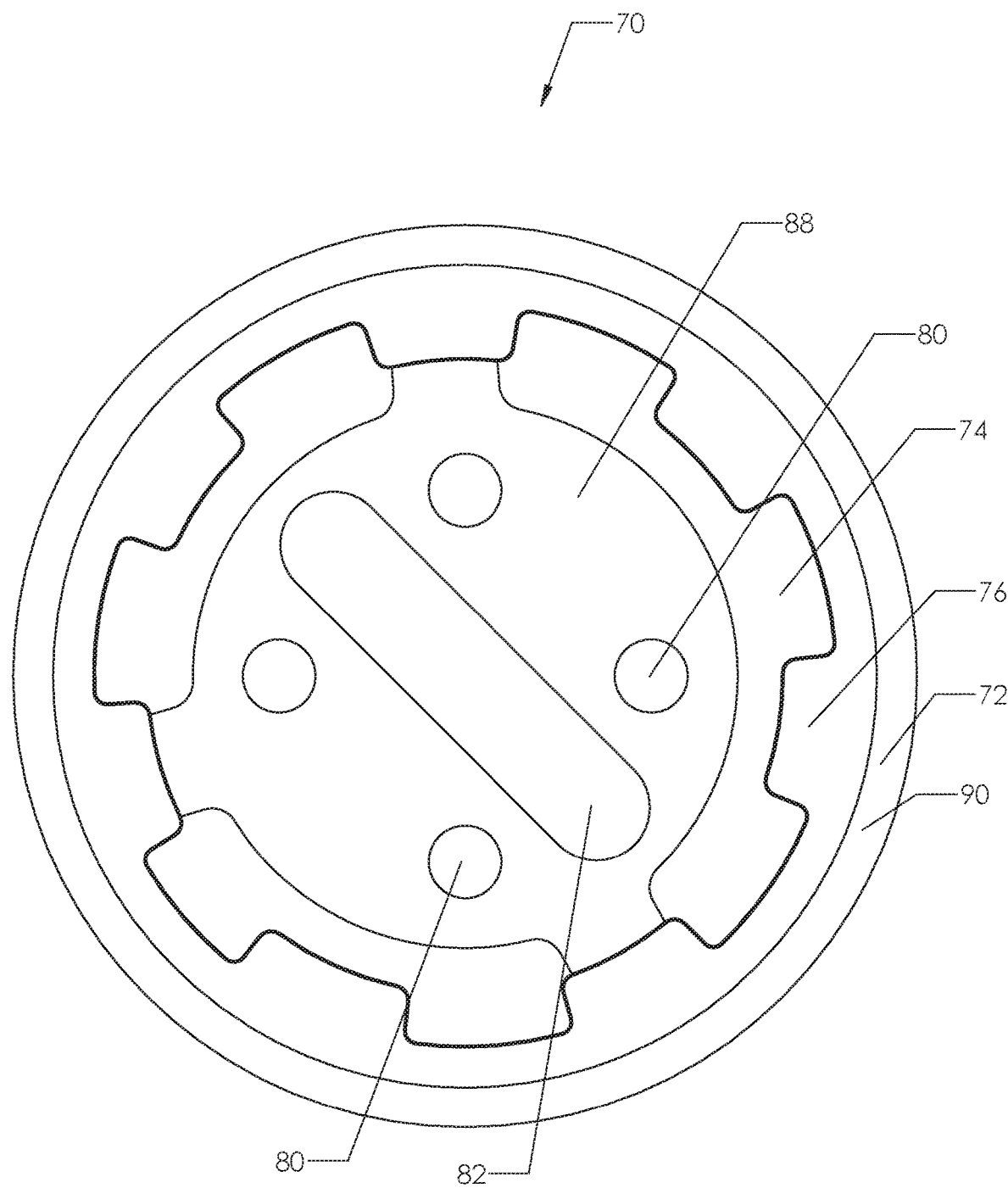
FIG. 11 is a bottom view of a fixture plate of a fixture for holding a lock ring in a rotational molding mold.
Figure 12:
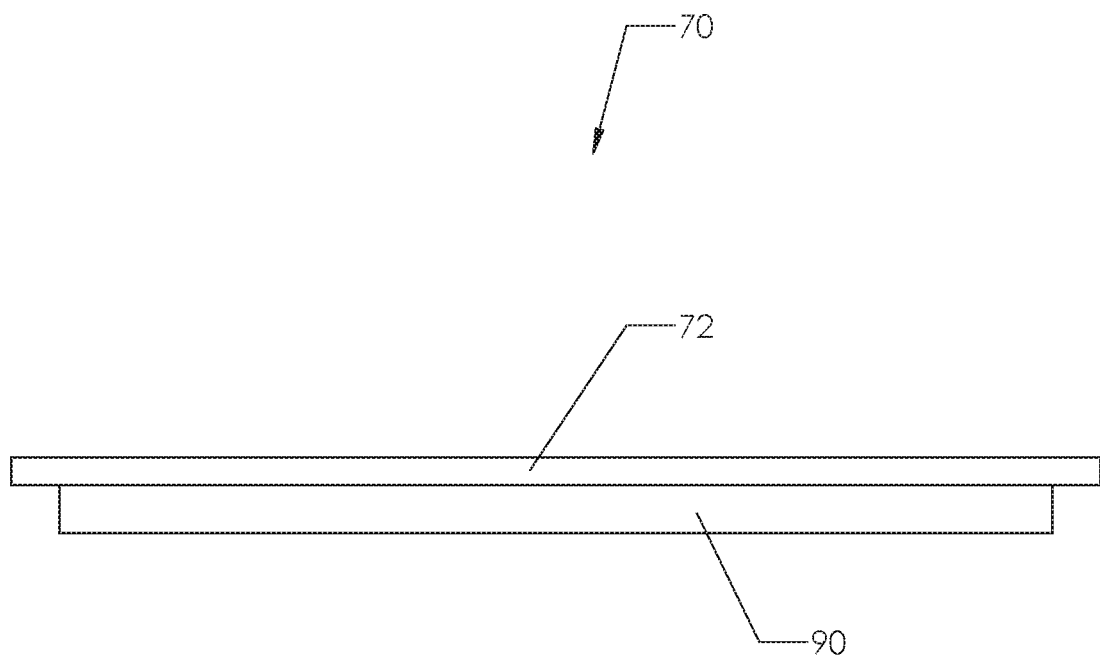
FIG. 12 is a side view of a fixture plate of a fixture for holding a lock ring in a rotational molding mold.
Figure 13:
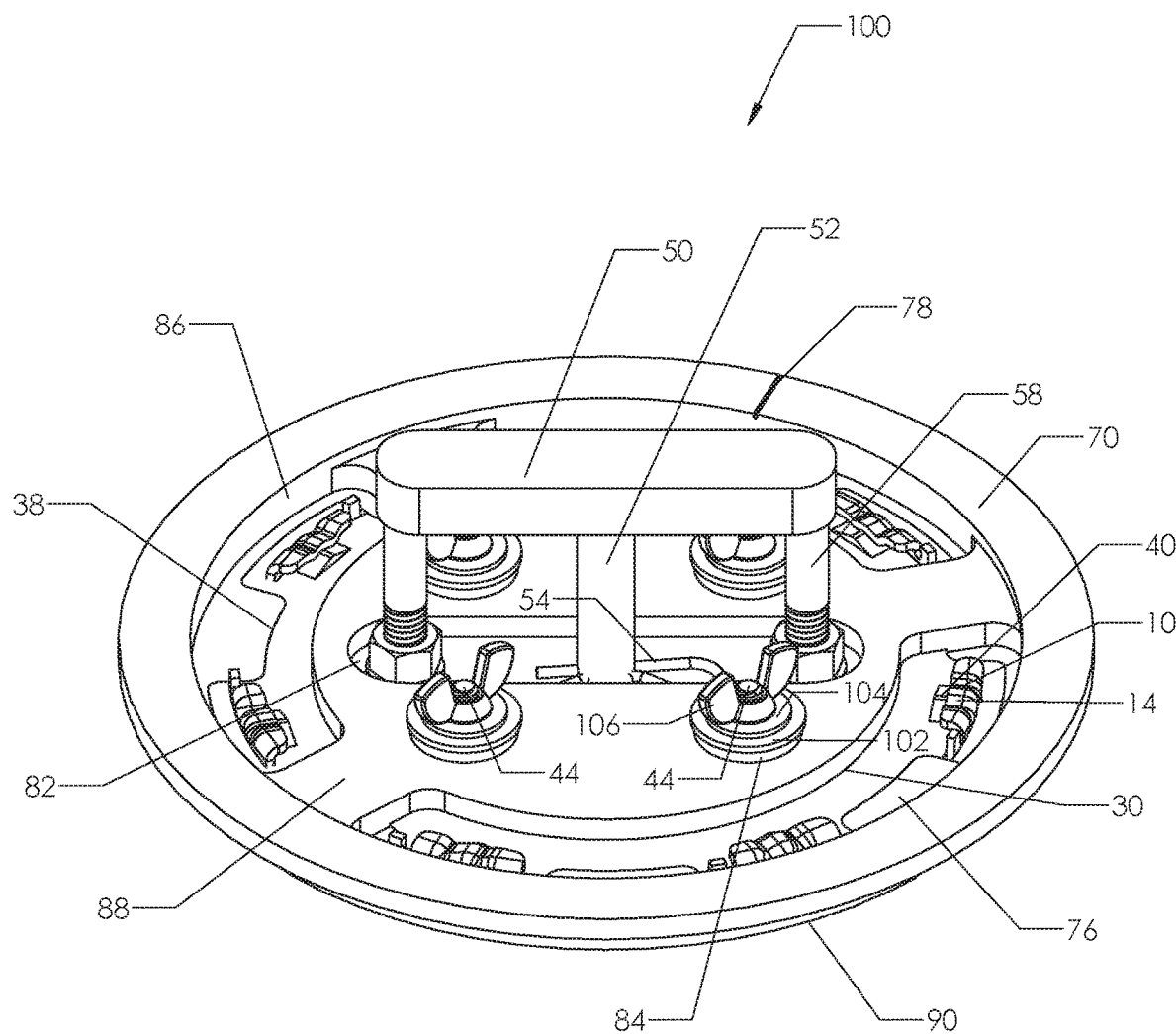
FIG. 13 is an isometric view of a first embodiment of a fixture for holding a lock ring in a rotational molding mold.
Figure 14:
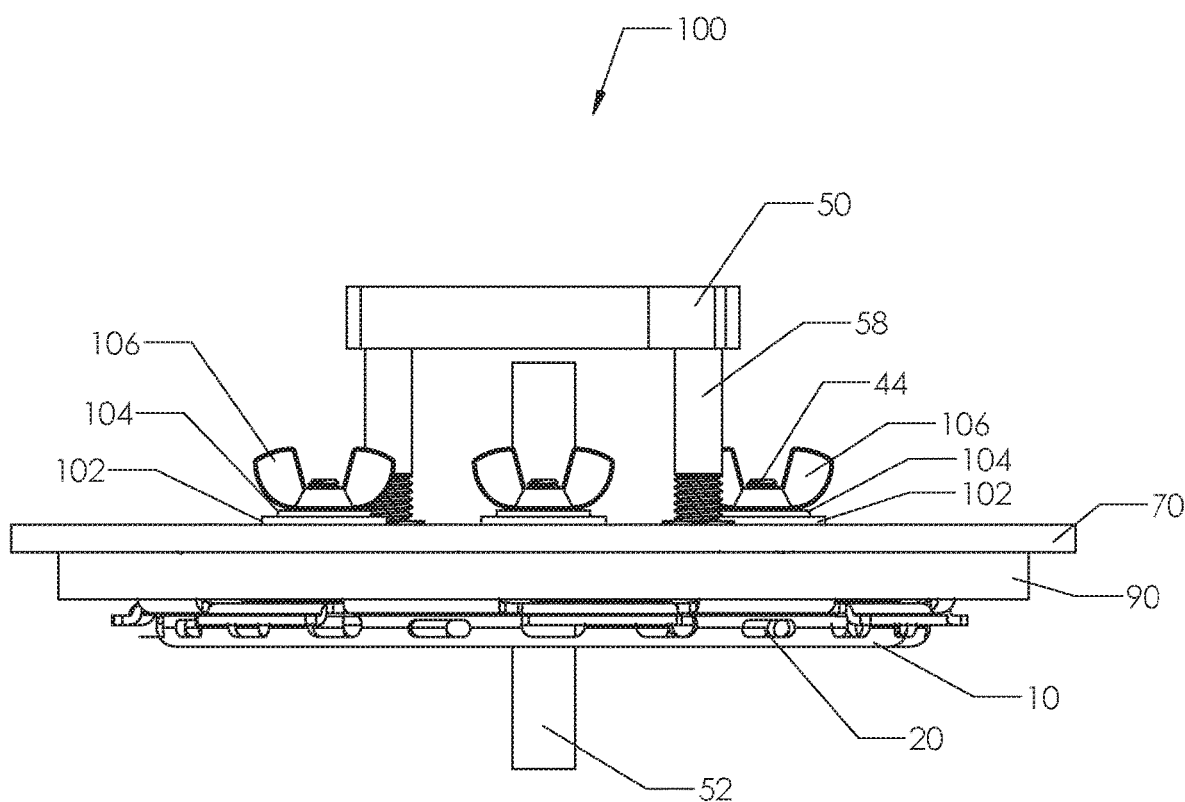
FIG. 14 is a side view of a first embodiment of a fixture for holding a lock ring in a rotational molding mold.
Figure 15:
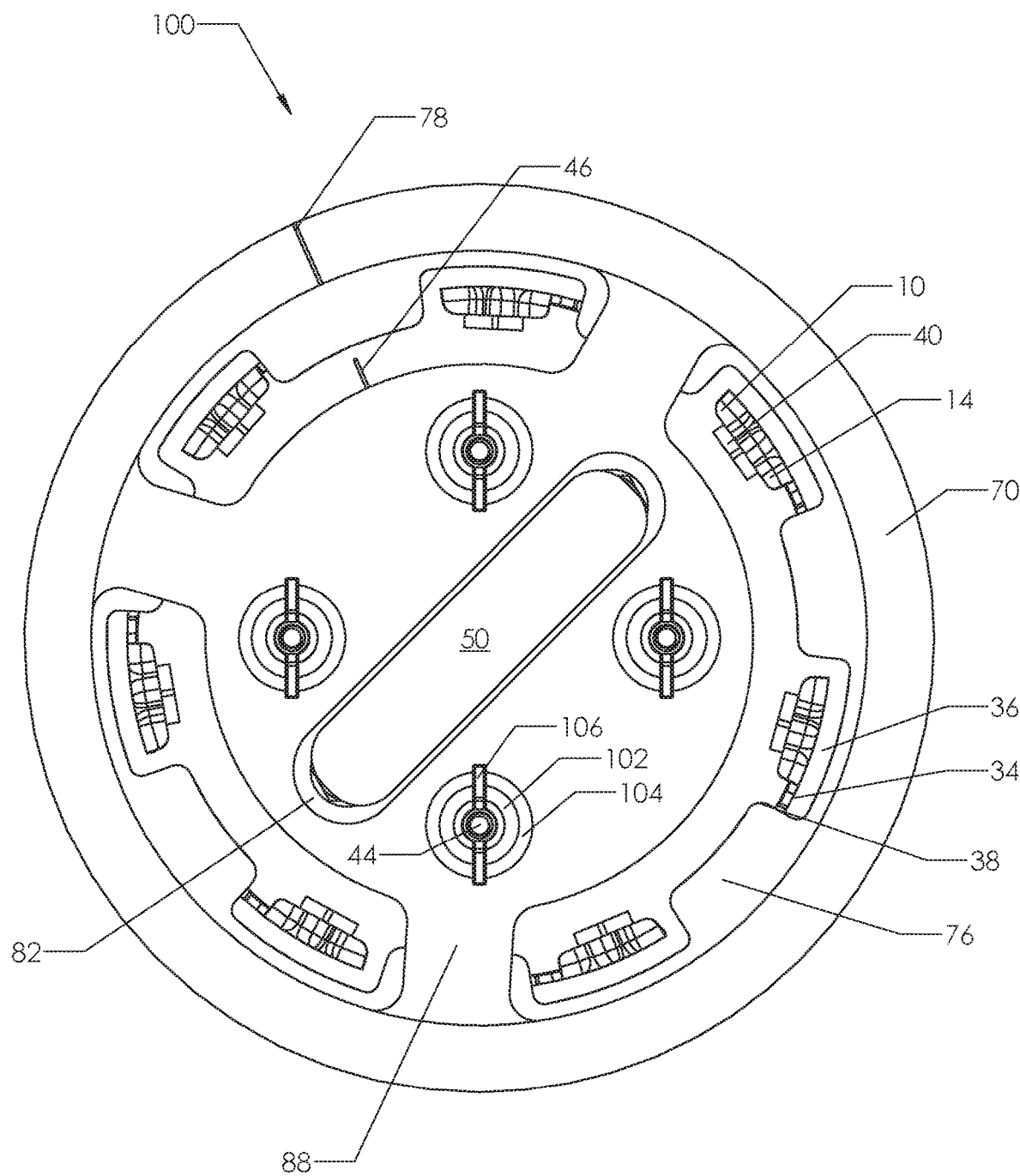
FIG. 15 is a top view of a first embodiment of a fixture for holding a lock ring in a rotational molding mold.
Figure 16:
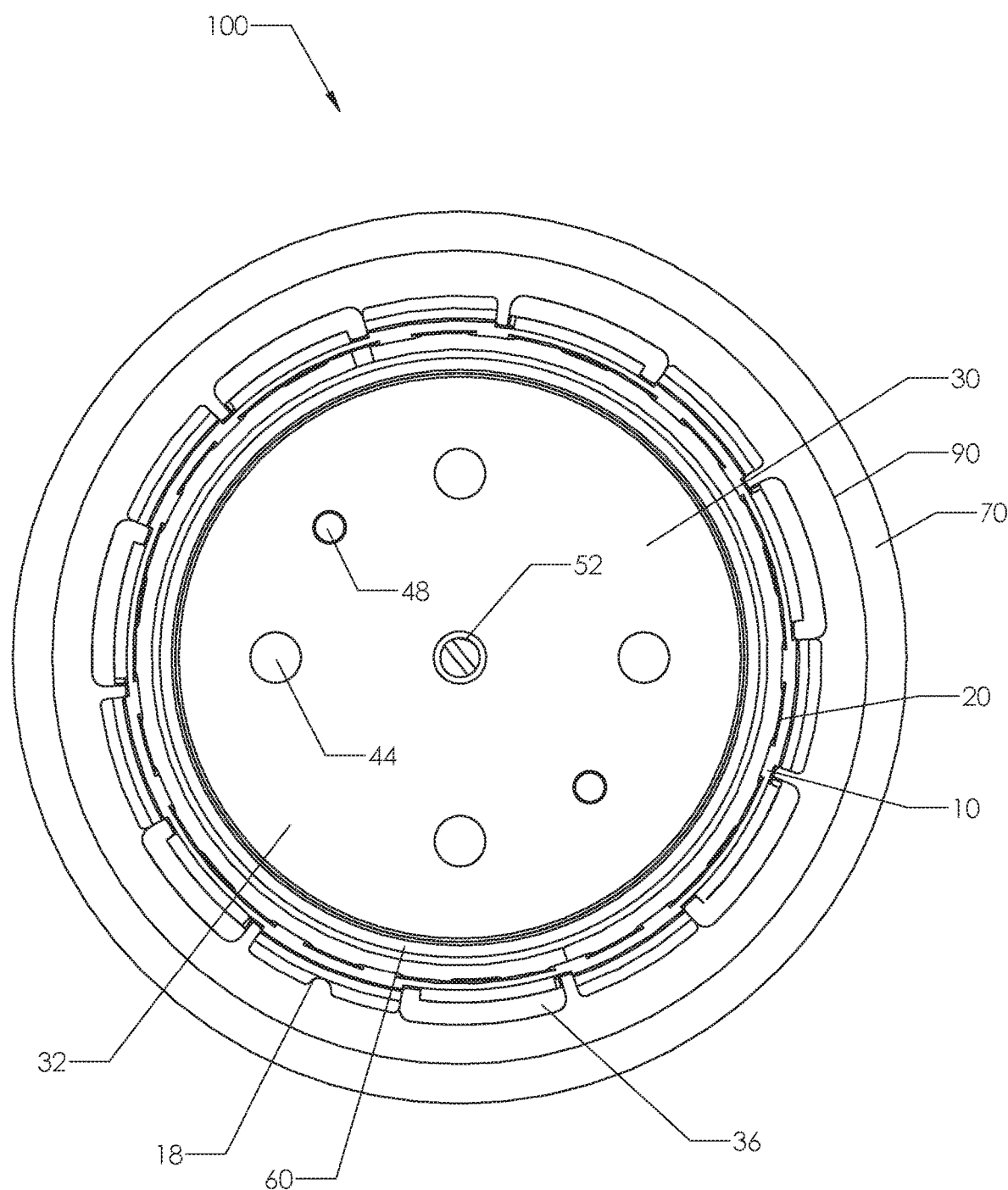
FIG. 16 is a bottom view of a first embodiment of a fixture for holding a lock ring in a rotational molding mold.
Figure 17:
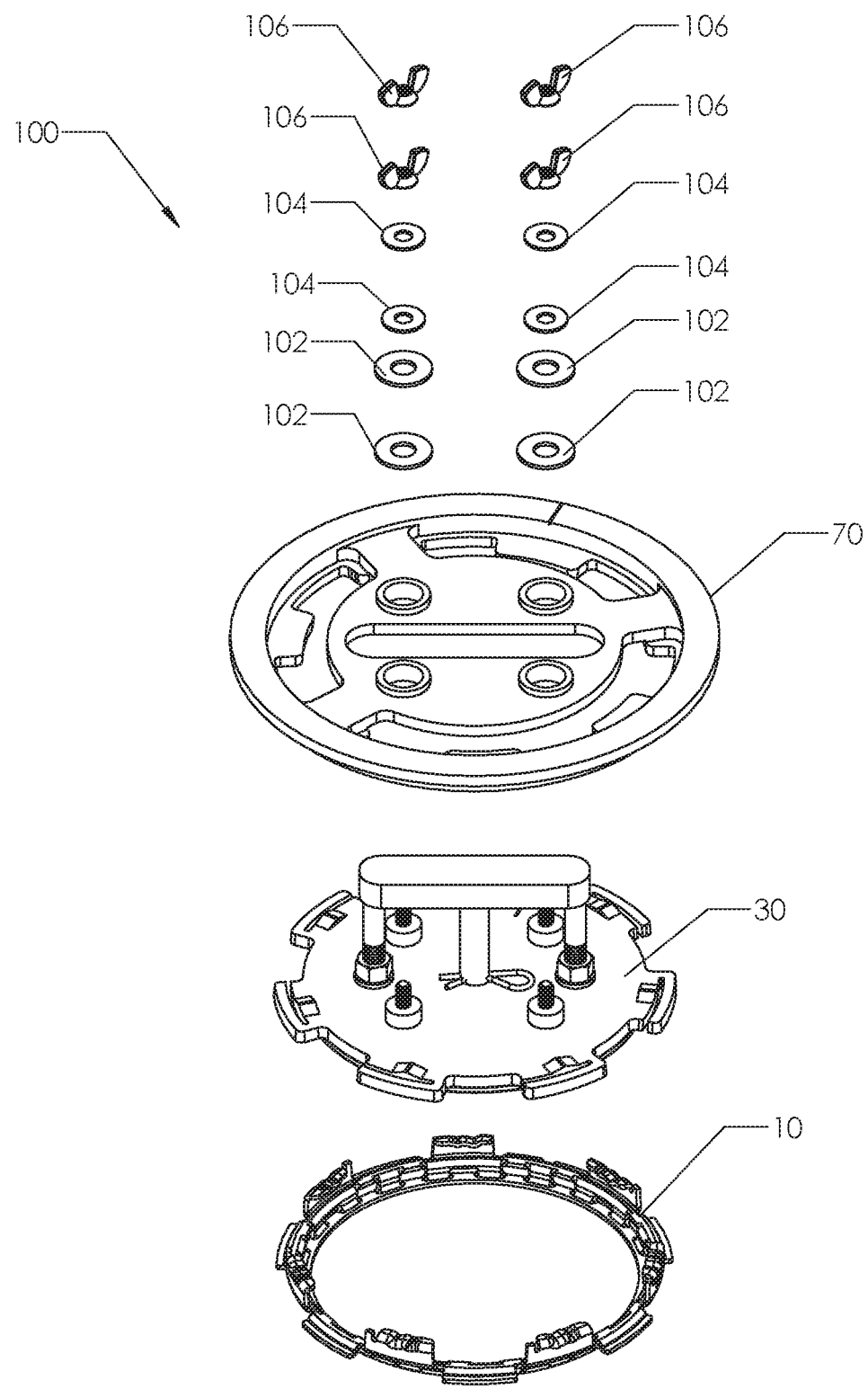
FIG. 17 is an exploded isometric view of a first embodiment of a fixture for holding a lock ring in a rotational molding mold.
Figure 18:
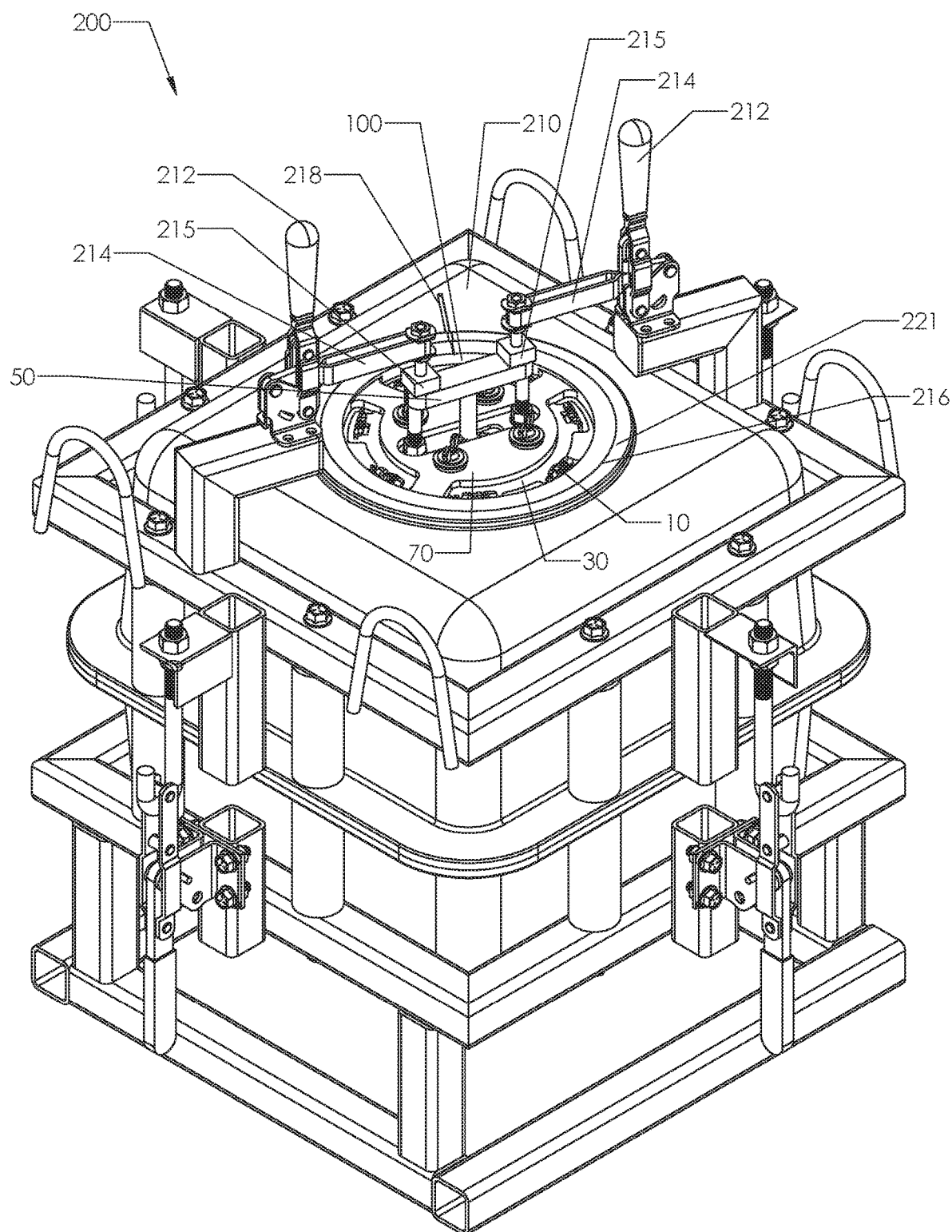
FIG. 18 is an isometric view of a first embodiment of a fixture for holding a lock ring in a rotational molding mold coupled in a mold.
Figure 19:
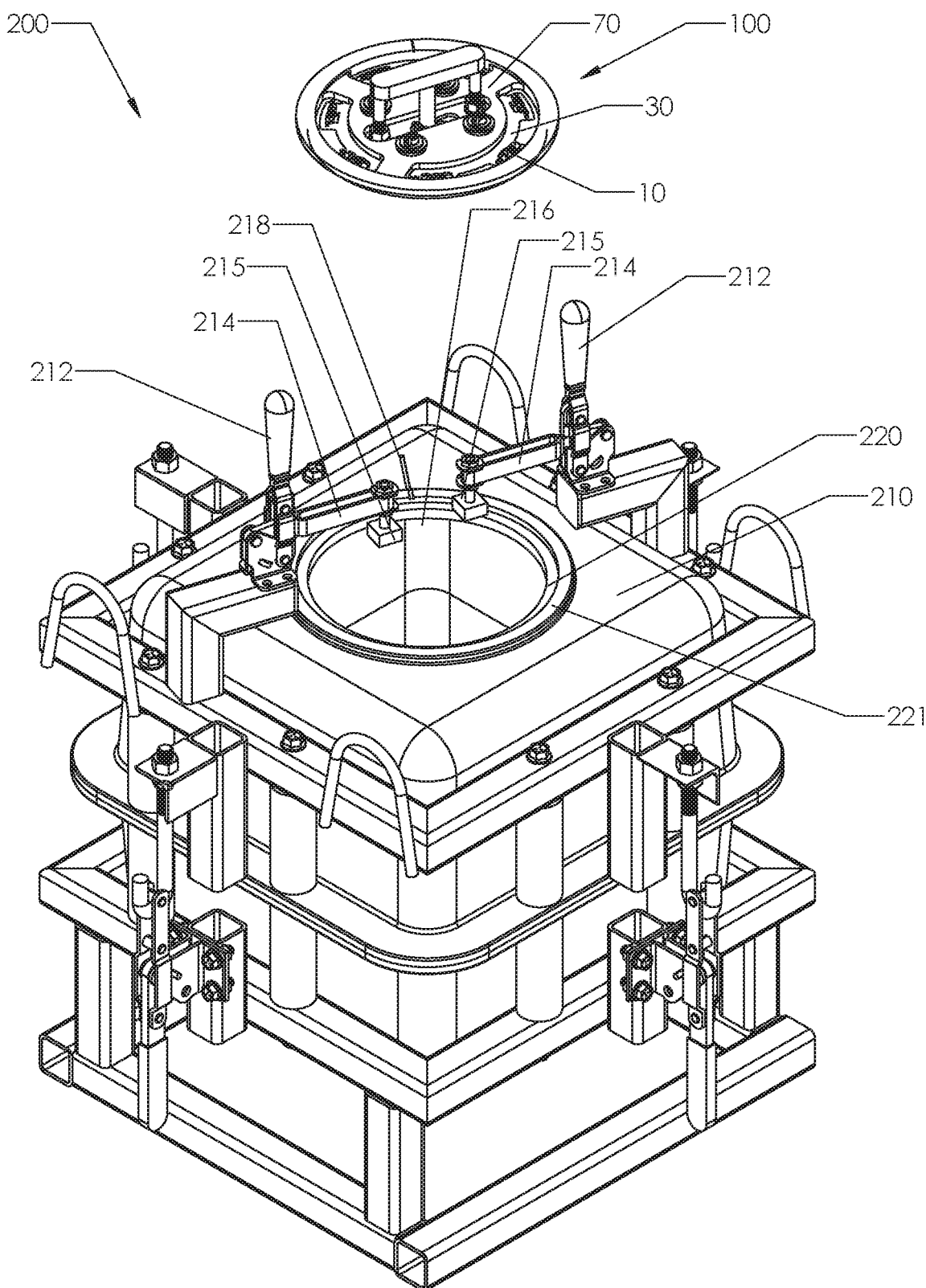
FIG. 19 is a partially exploded isometric view of a first embodiment of a fixture for holding a lock ring in a rotational molding mold coupled in a mold.
Figure 20:
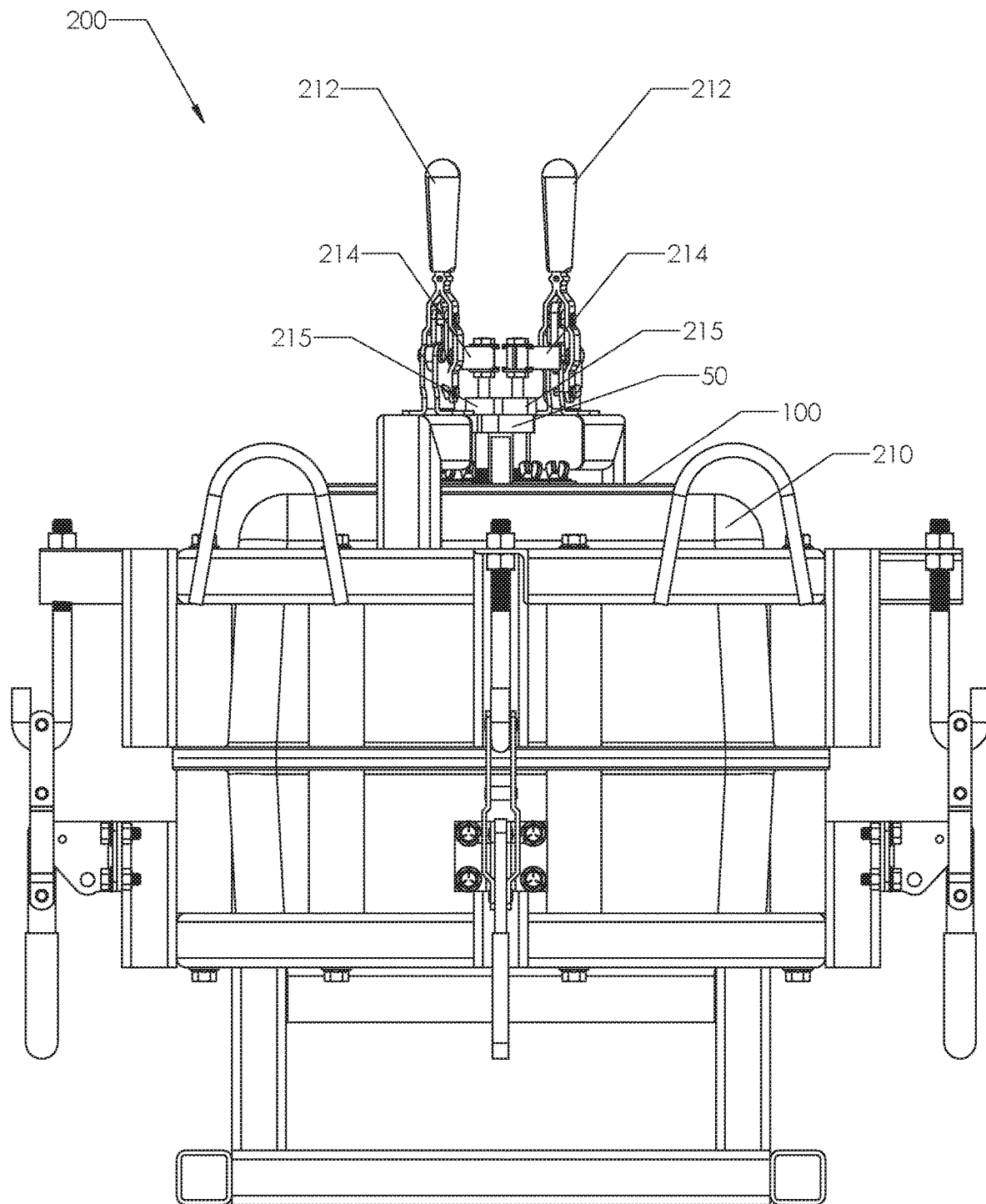
FIG. 20 is a side view of a first embodiment of a fixture for holding a lock ring in a rotational molding mold coupled in a mold.
Figure 21:
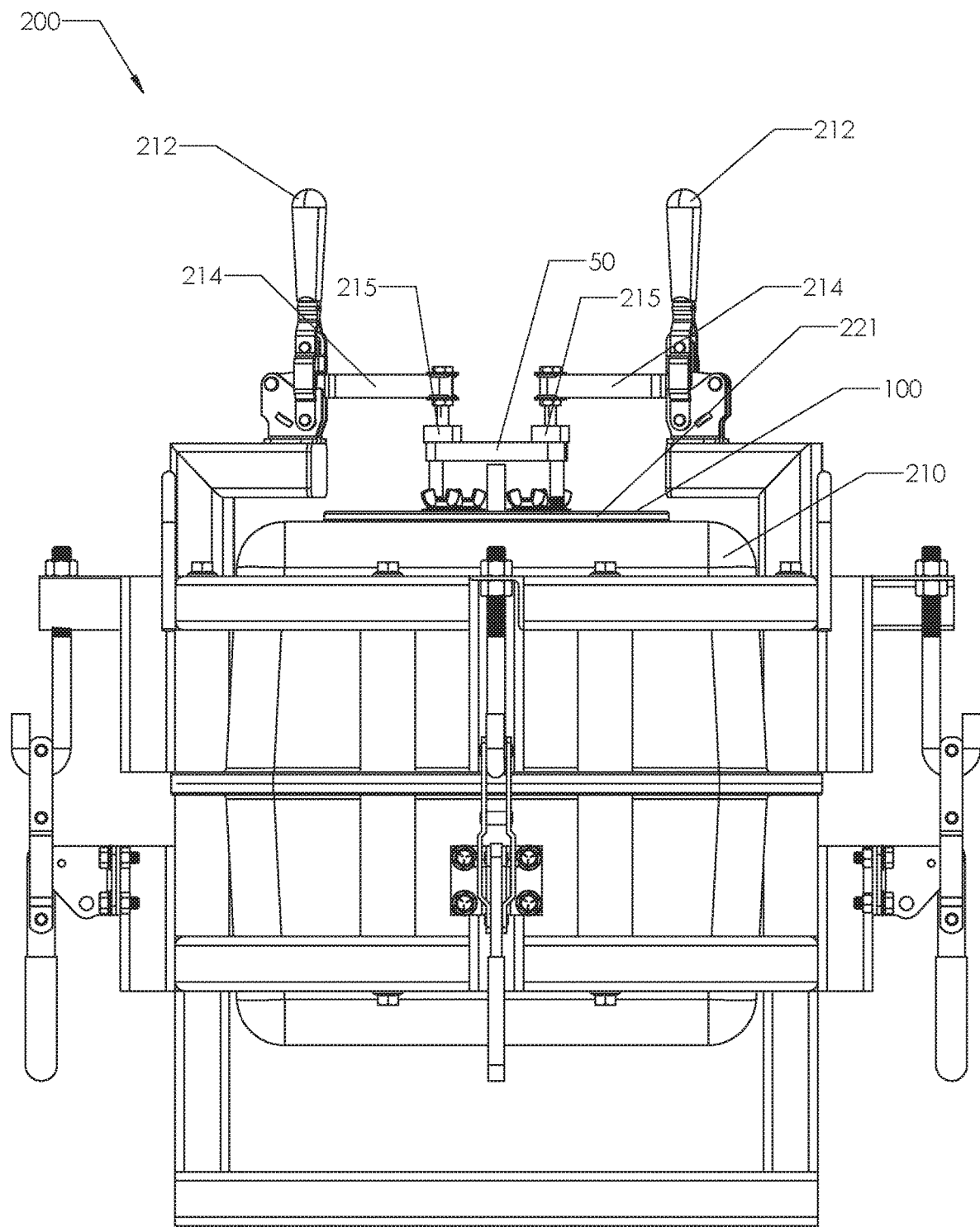
FIG. 21 is a front view of a first embodiment of a fixture for holding a lock ring in a rotational molding mold coupled in a mold.
Figure 22:
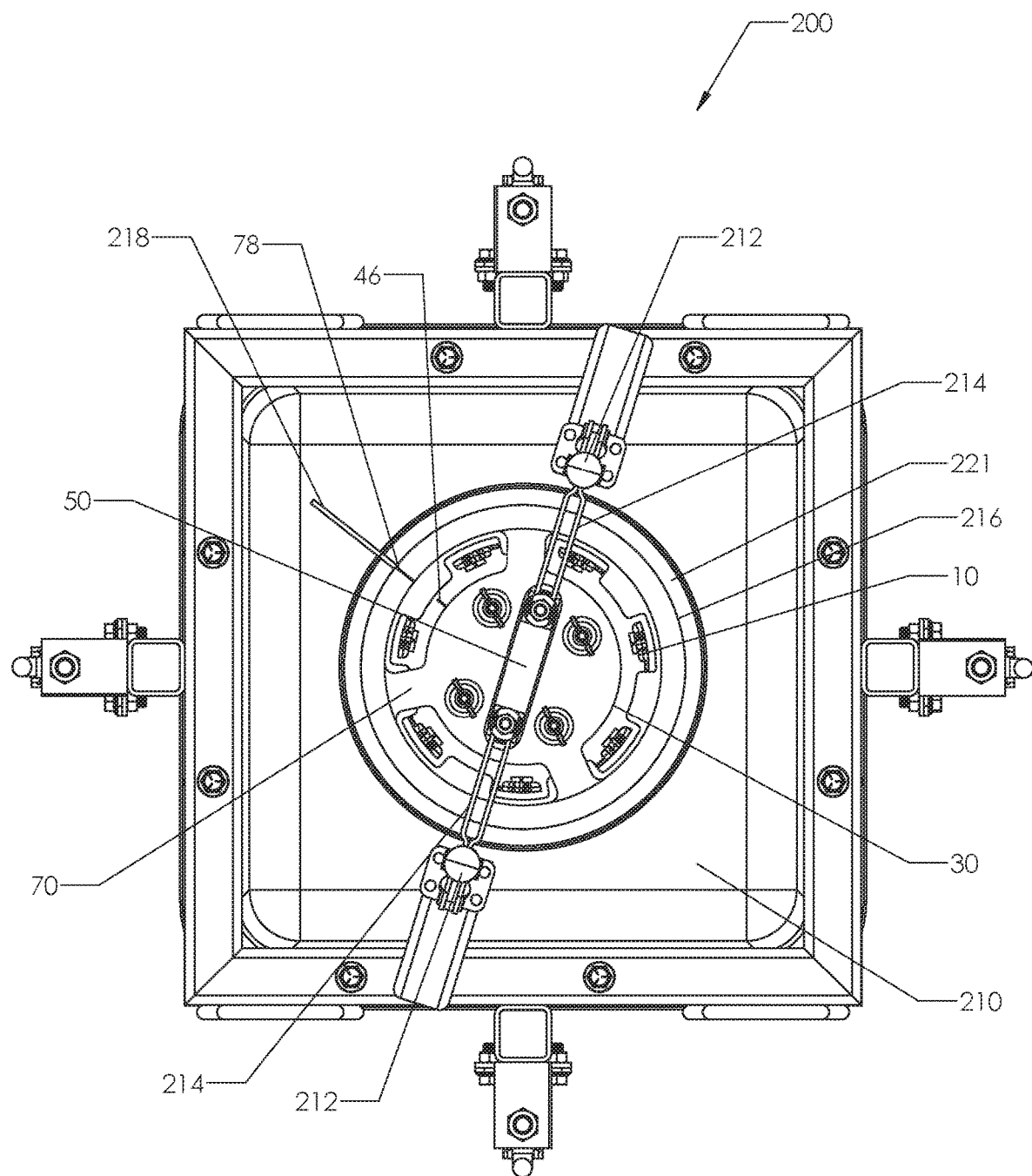
FIG. 22 is a top view of a first embodiment of a fixture for holding a lock ring in a rotational molding mold coupled in a mold.
Figure 23:
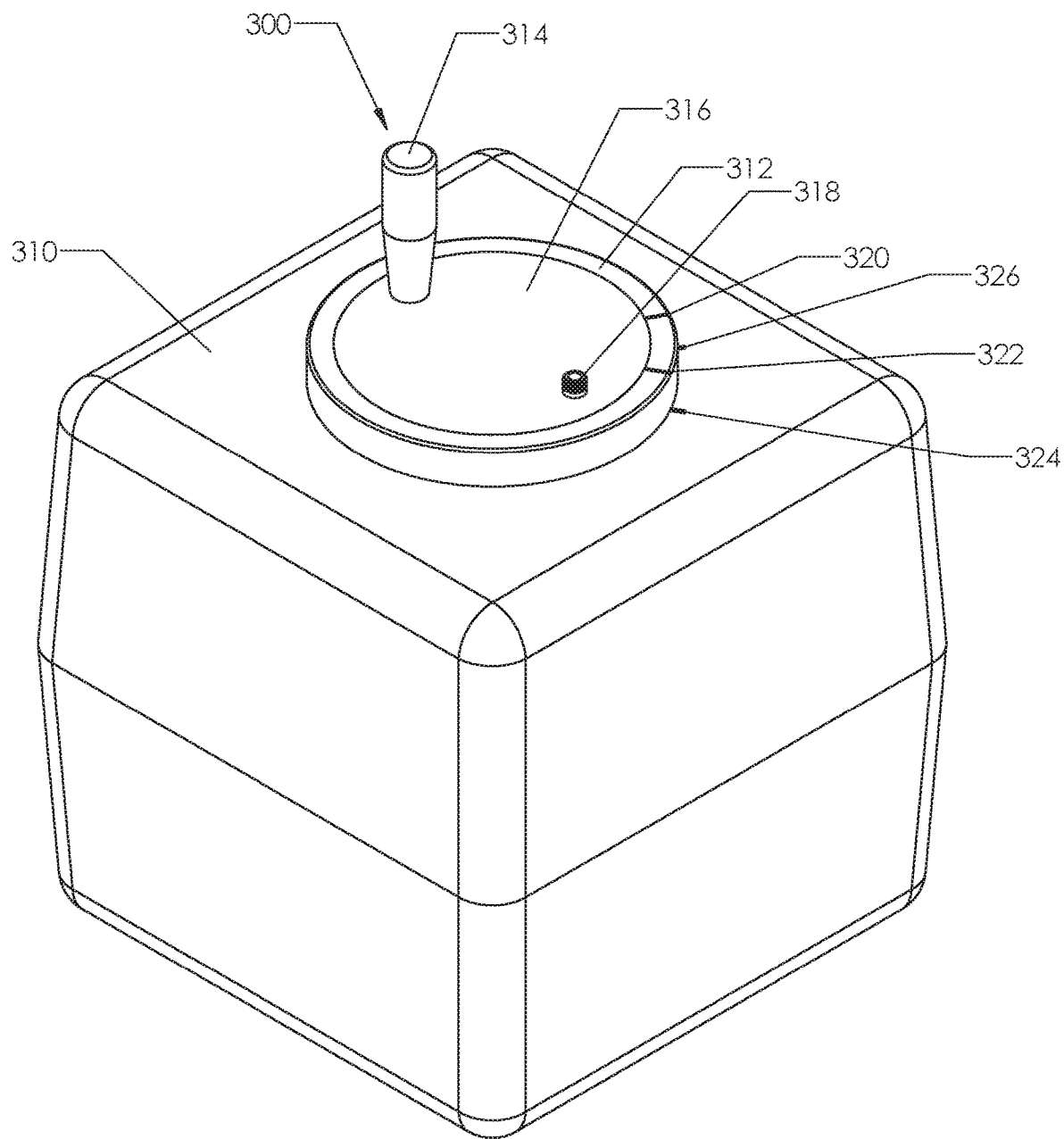
FIG. 23 is an isometric view of a first embodiment of a machining guide mounted on a rotationally molded product.
Figure 24:
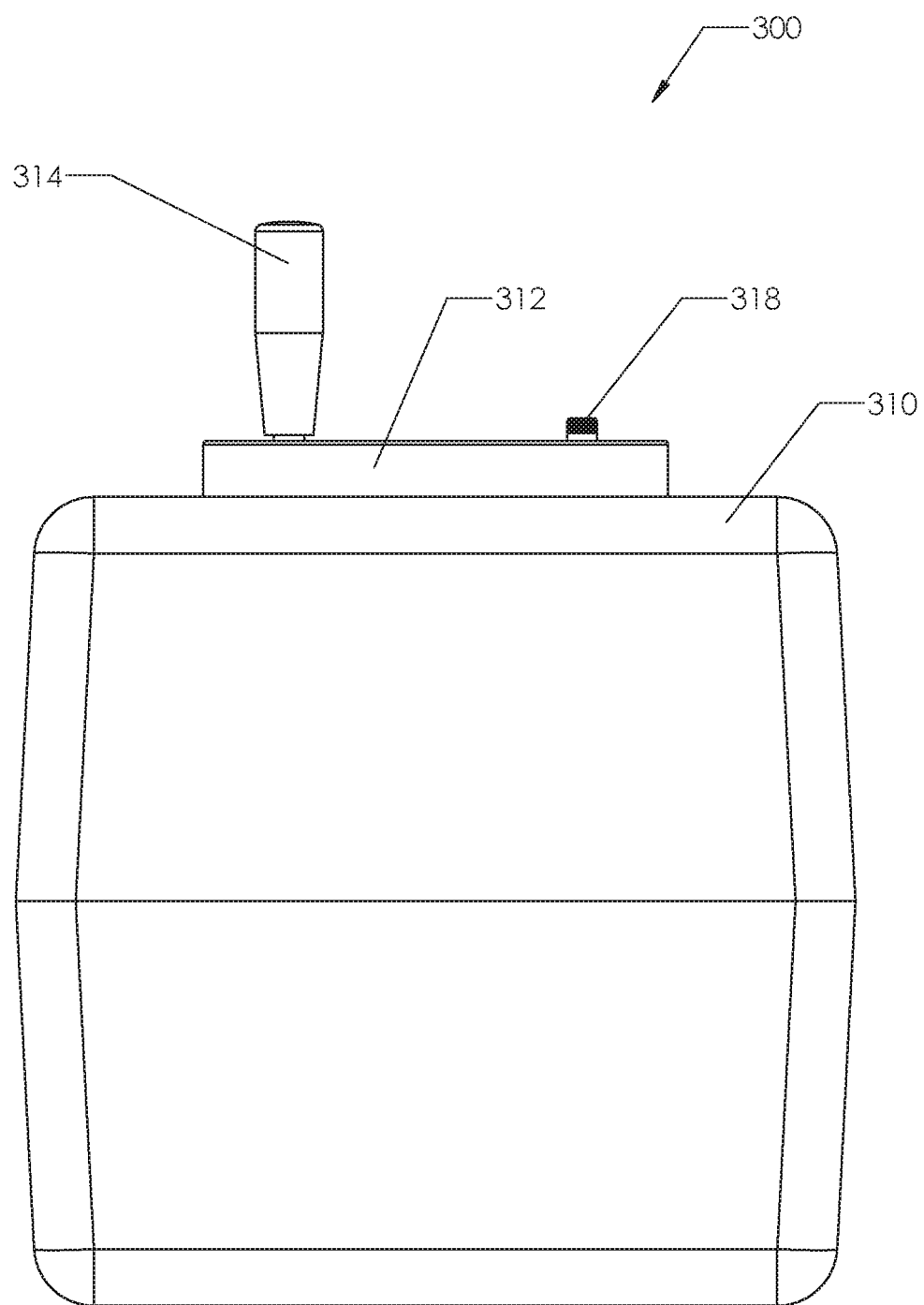
FIG. 24 is a side view of a first embodiment of a machining guide mounted on a rotationally molded product.
Figure 25:
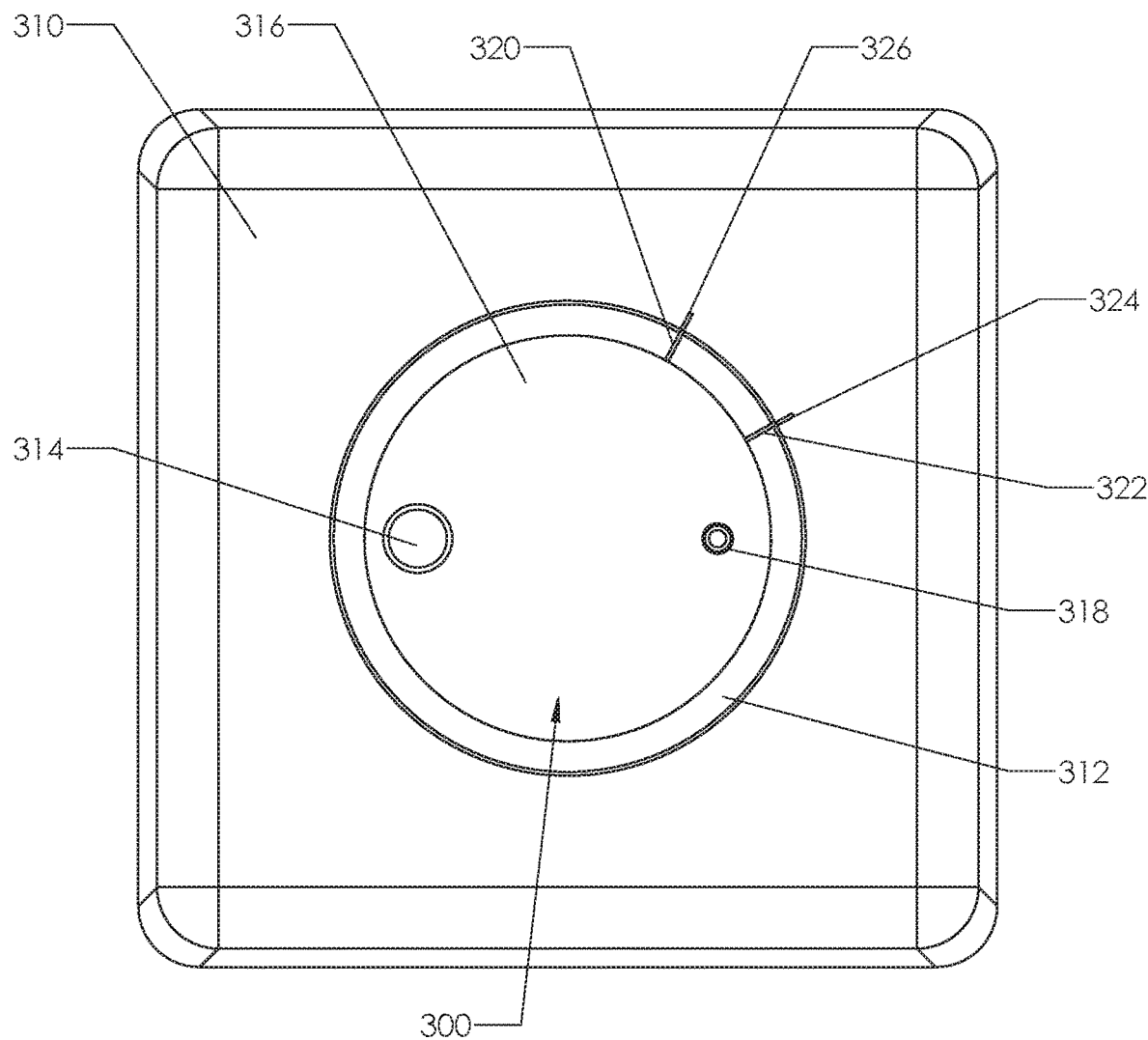
FIG. 25 is a top view of a first embodiment of a machining guide mounted on a rotationally molded product.

Bolts 44 are threaded through fixture plate coupler locations 42. Bolts 44 allow additional pieces of the fixture to be coupled together. Bolts 44, once placed through fixture plate coupler locations 42, are sanded or ground down so that they do not extend through the bottom of the locking plate 30 as illustrated in FIG. 8. Typically, the holes in the fixture plate coupler locations 42 are countersunk and the bolts 44 have flat heads so that only a portion of the head must be ground off.

Bolts 44 may be coupled in the fixture plate coupler locations 42 through threads, adhesives, welding or the like.

Handle locations 48 are also formed in the locking plate 30. Handle locations 48 are holes drilled through the locking plate 30. The handle location 48 holes are also threaded in order to couple the handle 50 to the locking plate 30. The handle locations 48 are located at two locations opposite each other in the locking plate 30.

Bolts 58 are coupled to handle locations 48. In assembling, locking plate 30, nut 56 and at least one lock washer are threaded onto bolts 58. Bolts 58 are then screwed into handle locations 48. Nuts 56 are then tightened down on bolts 58. The bottoms of bolts 58 are then sanded or ground down in order to prevent the ends of bolts 58 from extending into the mold itself.

Handle 50 is coupled to the tops of bolts 58. Handle 50 is permanently coupled through welding, adhesives or the like. Handle 50 allows locking plate 30 to be easily twisted into the lock ring 10 and the like.

Handle 50 is illustrated as a rounded rectangle, however, handle 50 could be any shape or size desired, provided it does not interfere with the function of the fixture.

An alignment mark 46 may also be formed in the surface of the locking plate 30. The alignment mark 46 is a linear indentation formed in the surface of the locking plate 30 in order to allow the locking plate 30 to be properly aligned with the rest of the fixture.

Vent 52 is also coupled to locking plate 30. Vent 52 passes through the center of locking plate 30 in order to allow gasses and pressure within the mold to escape during the rotational molding process. Vent 52 is illustrated as a hollow cylindrical tube. Vent 52 may be any size or shape desired, provided that it stills serves the purpose of allowing gasses to escape the mold. Vent 52 may be formed from any material desirable which can withstand the rotational molding process.

Vent 52 is held in place by pin 54. Pin 54 couples to vent 52 and prevents it from falling through the locking plate 30.

FIG. 8 illustrates the bottom of the locking plate 30. The bottom of locking plate 30 includes a ridge 60. Ridge 60 is a raised circular or ring shaped area that is located just inside the indented locations 38 of the locking plate 30.

Though, illustrated as a ring shaped area, ridge 60 may be any size or shape desired.

Ridge 60 is formed inside of the coupling teeth 14 of the lock ring 10. There is, however, a space between ridge 60 and the coupling teeth 14. This space allows material to flow through openings 20 of the lock ring 10 in order to secure the lock ring 10 into place in the surface of the molded product. Additionally, the material flows through openings 20 and creates an exterior surface of a channel on the molded product.

Ridge 60 creates a channel in the rotationally molded product. The channel is located just inside of the coupling teeth 14 of the lock ring 10. The channel is a ring shaped indentation formed in the surface of the molded product. The channel encircles the interior of the coupling the lock ring 10. An O-ring is placed in the channel after the product is completed.

In order to couple the lock ring 10 to the locking plate 30, the coupler teeth 14 are placed in the indented locations 38 of the locking plate 30.

The locking plate 30 is then rotated with respect to the lock ring 10 so that the coupler teeth 14 travel into the slots 34 on the extended locations 36 of the locking plate 30. The coupler teeth 14 are locked into the slots 34 by the ridges on the coupler teeth 14 mating with the triangular locks 40 on the locking plate 30.

FIGS. 9-12 illustrate a fixture plate 70. The fixture plate 70 is a thin round plate similar to the locking plate 30. The fixture plate 70, though illustrated as a thin round plate, may be any shape or size desired, provided it can be used to secure the locking plate 30 to a mold.

The fixture plate 70 includes fixture plate coupler openings 80. The fixture plate coupler openings 80 are openings cut through the fixture plate 70. The fixture plate coupler openings 80 also have a lip 84 which extends cylindrically from the surface of the fixture plate 70.

Coupler teeth openings 74 are also formed in the fixture plate 70. These openings are shaped to fit around the coupler teeth 14 of the lock ring 10. The coupler teeth openings 74 are illustrated as three curved slots formed so that they encompass almost the entire circumference of the fixture plate 70. Each of these coupler teeth openings 74 has rectangular cutouts formed along their outer edges. These rectangular cutouts are configured to receive the extended locations 36 of the locking plate 30.

Forming the rectangular cutouts in the coupler teeth openings 74 are rectangular extensions 76 which extend from the outer edges of the coupler teeth openings 74 into the interior of the coupler teeth openings 74. The rectangular extensions 76 are rounded rectangular pieces of material that mate with the locking plate 30 in order to prevent material from leaking from the mold.

The locking plate 30 and the fixture plate 70 fit together like puzzle pieces in order to create a solid surface that material will not leak through during molding.

The fixture plate 70 may have multiple elevations as illustrated by ridge 88. These multiple elevations allow fixture plate 70 to fit over the top of locking plate 30 while still having portions of fixture plate 70 that interlock with locking plate 30 to create a smooth surface adjacent to the interior of the mold.

Additionally, the fixture plate 70 has a ring 72 that runs around the outer circumference of the fixture plate 70.

A handle opening 82 is formed in the center of the fixture plate 70. The handle opening 82 is a rounded slot formed across the center of the fixture plate 70.

Though, all of the openings formed in the fixture plate 70 are illustrated in specific shapes, they may be formed in any shape which allows the fixture to function properly.

The outer bottom edge of the fixture plate 70 includes a mold ridge 90. The mold ridge 90 is used to mate with a lip on the mold in order to prevent the fixture from falling into the mold. The mold ridge 90 is an indented lip that runs the entire circumference of the fixture plate 70 at the bottom outer edge of the ring 72.

While the mold ridge 90 is illustrated as travelling the entire circumference of the fixture plate 70, in alternate embodiments, the mold ridge 90 may consist of a set of individual ridges formed at given intervals which mate with extended portions of the mold in order to hold the fixture plate 70 in place.

Additionally, the fixture plate 70 has an alignment mark 78 which is aligned with the alignment mark 46 on the locking plate 30 when the fixture is assembled.

In order to use the fixture, the fixture plate 70 is placed over the locking plate 30 which is mated with the lock ring 10. The coupler teeth 14 of the lock ring 10 fit through the rectangular openings formed along the edges of the coupler teeth openings 74.

The edges of the fixture plate 70 that mate with the locking plate 30 have a draft 75 of approximately 5 degrees. The draft 75 is a slight angling of the edges of the two plates. Both the fixture plate 70 and the locking plate 30 are drafted the same direction in order to allow the plates to sit flush next to each other and to hold the ring 10 at the proper depth in the mold.

FIGS. 13-17 illustrate a fixture 100 with a lock ring 10 for holding the lock ring 10 in position in a mold during the rotational molding process.

Fixture plate 70 is removably coupled to locking plate 30 with bolts 44. Bolts 44 are permanently coupled to locking plate 30. When fixture plate 70 is placed on top of locking plate 30, bolts 44 extend through fixture plate coupler openings 80. Washers 102 and 104 are then placed on bolts 44. Everything is then held in place with wingnuts 106.

In alternate embodiments, alternate methods of coupling the ring 10, locking plate 30 and fixture plate 70 may be used.

FIGS. 18-22 illustrate a fixture 100 with a mold 200. The fixture 100 is placed in an opening 216 in the mold body 210. The opening 216 allows the fixture to be in fluid communication with the mold interior. The opening 216 is formed near the center of the top of the mold body 210. The opening 216 is used to hold the fixture during manufacturing. The opening 216 is illustrated as a circular opening. The opening 216 may, however, be formed in any shape or size desired.

The fixture 100 sits on edge 220 with mold ridge 90 abutting the edge 220. The edge 220 and mold ridge 90 support the fixture 100 above the interior of the mold body 210.

Rim 221 is a raised portion surrounding opening 216. Rim 221 helps to secure fixture 100 in opening 216 by preventing the fixture 100 from shifting.

Once the fixture 100 has been placed in opening 216, the fixture 100 is aligned so that the alignment marks 46 and 78 on the fixture align with alignment mark 218 on the mold body 210.

Clamps 214 are then used to clamp the fixture 100 in place. In order to clamp the fixture 100 in place, the handle 50 is aligned with the clamps 214. The clamp pads 215 are then placed on the handle 50 of the fixture 100. The clamps 214 are then closed firmly on the fixture 100 by moving handles 212 towards the center of the mold body 210.

Clamps 214 may be any type of device that applies pressure to the fixture 100 in order to hold it securely in place in opening 216. Additionally, clamps 214 may be any device that prevents the fixture 100 from leaving opening 216 during the rotational molding process.

FIGS. 23-26 illustrate a rotationally molded product 310 with a machining guide 300. The machining guide 300 is used to guide a router so as to remove additional material within the lock ring 10 on the molded product 310.

In use, a router with a router guide bushing 318 is placed in an opening in the machining guide 300. The handle 314 on the machining guide 300 is rotated and the router bit follows a predetermined path to remove a circular or other shaped section of material within the lock ring 10 embedded in the product 310.

The machining guide 300 includes a guide ring 312 and a guide plate 316. Additionally, the guide ring 312 has alignment marks 320 and 322 which align with marks 326 and 324 on the molded product 310. Marks 326 and 324 are created during the molding process.

Figure 26:
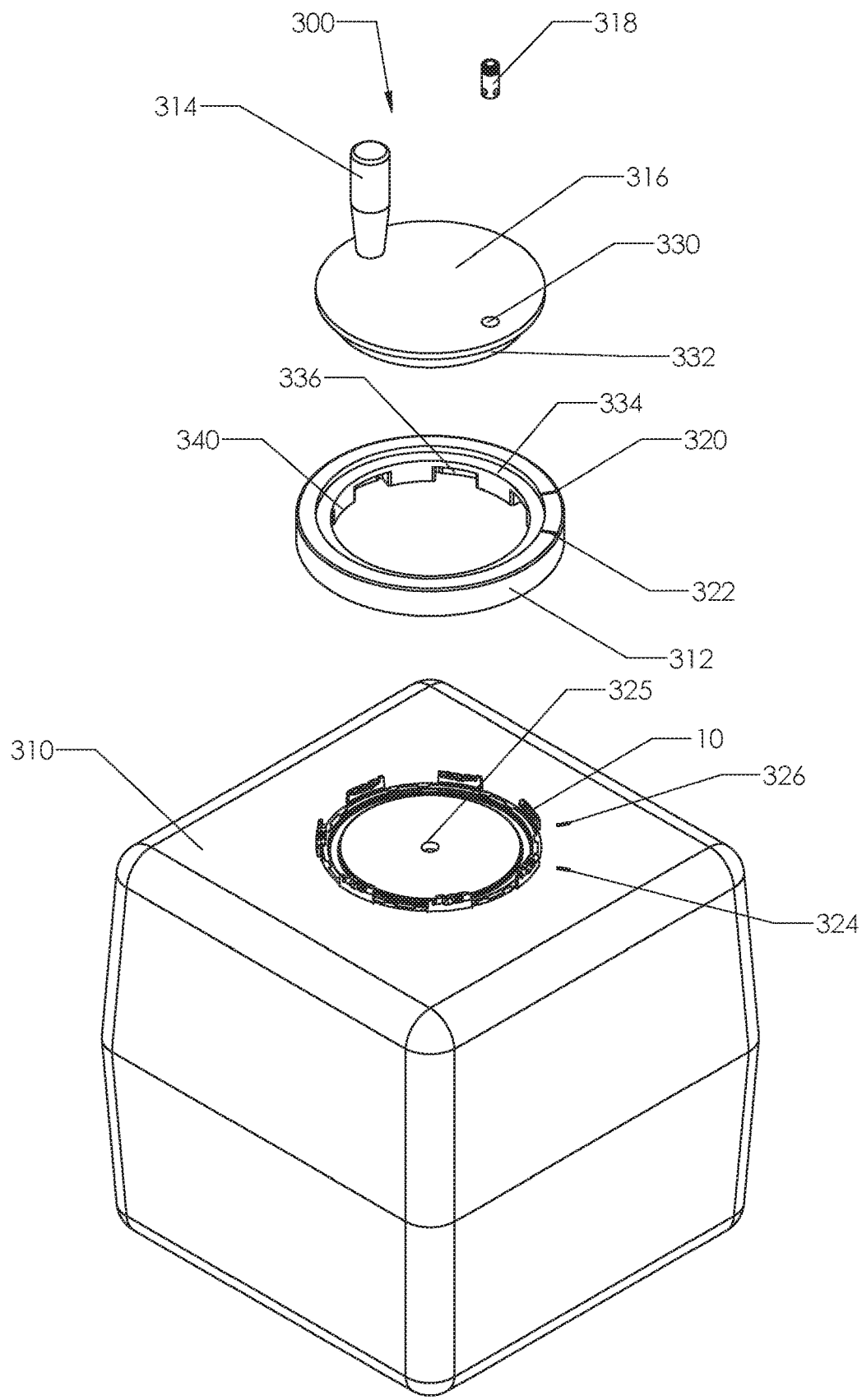
FIG. 26 is an exploded view of a first embodiment of a machining guide for mounting on a rotationally molded product.
Figure 27:
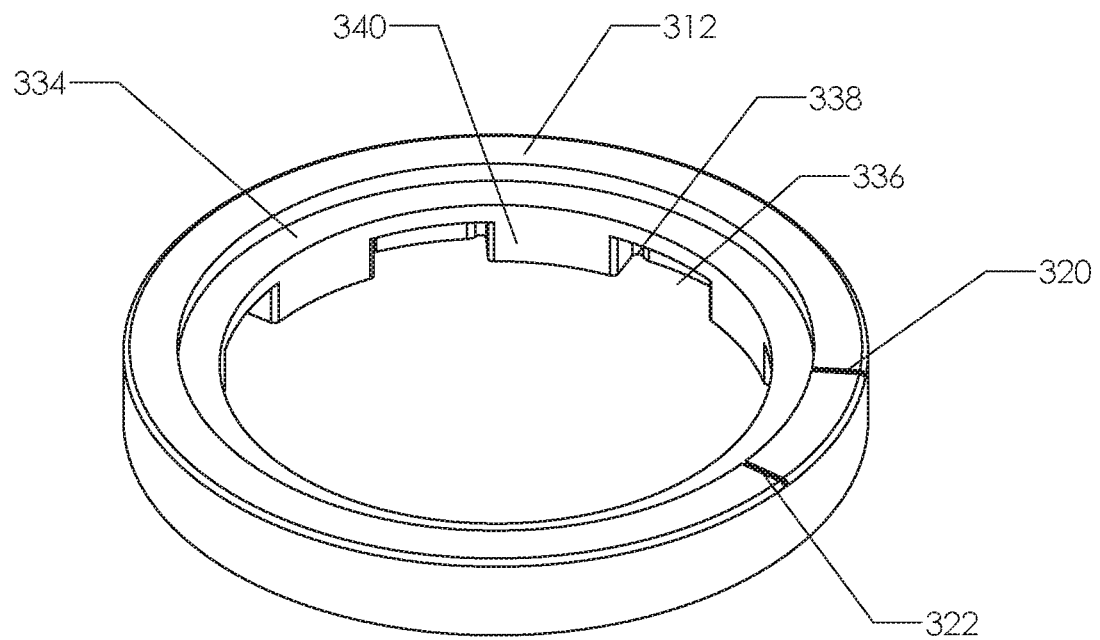
FIG. 27 is an isometric view of a guide ring for a machining guide for mounting on a rotationally molded product.
Figure 28:
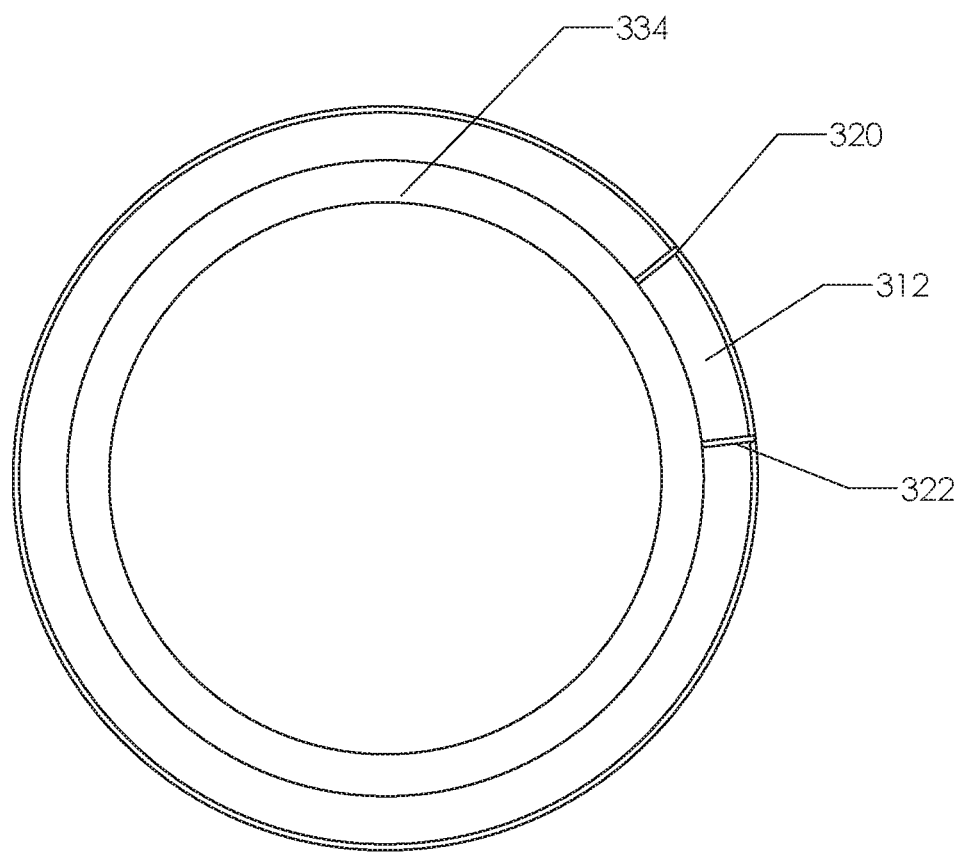
FIG. 28 is a top view of a guide ring for a machining guide for mounting on a rotationally molded product.
Figure 29:
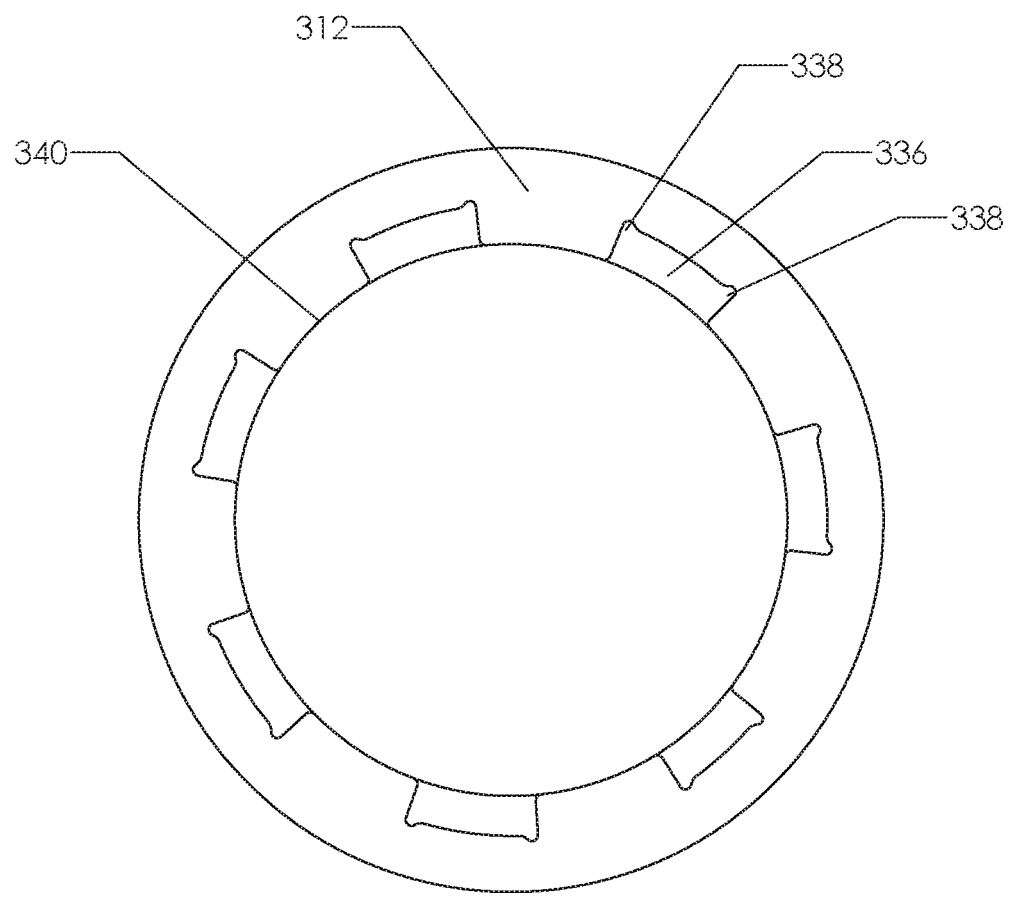
FIG. 29 is a bottom view of a guide ring for a machining guide for mounting on a rotationally molded product.
Figure 30:
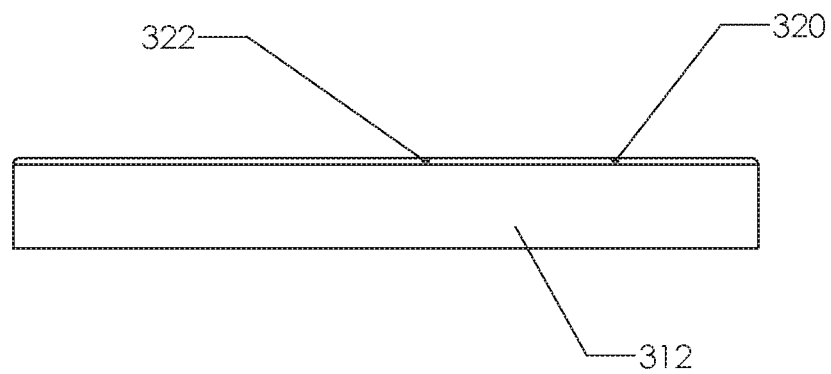
FIG. 30 is a side view of a guide ring for a machining guide for mounting on a rotationally molded product.
Figure 31:
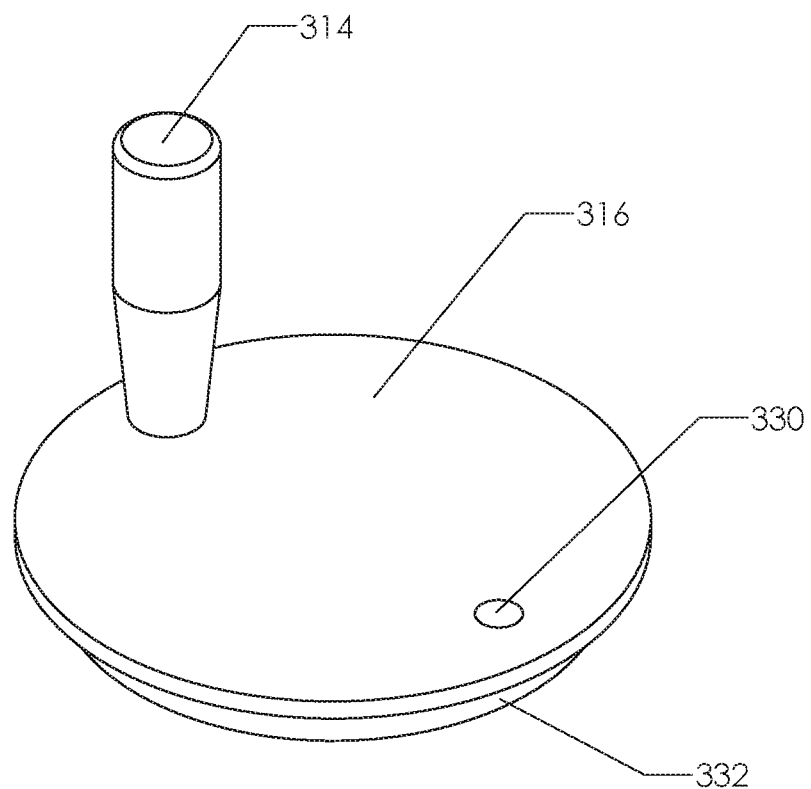
FIG. 31 is an isometric view of a first embodiment of a guide plate for a machining guide for mounting on a rotationally molded product.
Figure 32:
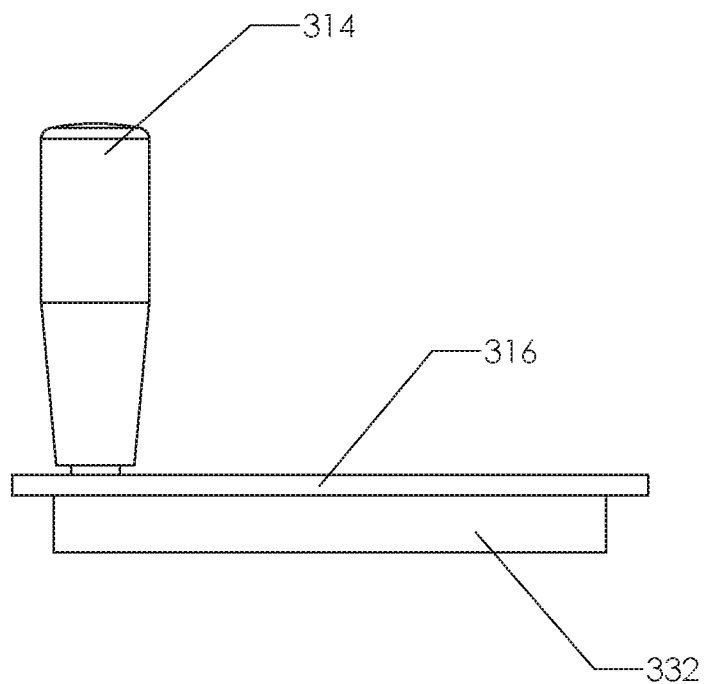
FIG. 32 is a side view of a first embodiment of a guide plate for a machining guide for mounting on a rotationally molded product.

FIG. 26 is an exploded view of a machining guide 300 and a molded product 310. FIG. 26 illustrates the lock ring 10 embedded in the molded product 310. A hole 325 is also formed in the top of the molded product 310 by the vent 52.

The guide ring 312 is removably coupled to the lock ring 10. The guide plate 316 is then inserted into the guide ring 312.

FIGS. 27-30 illustrate a guide ring 312. The guide ring 312 is a ring with an inner diameter similar to the inner diameter of the lock ring 10. The outer diameter of the guide ring 312 is larger than the outer diameter of the lock ring 10.

The guide ring 312 includes an outer ring with a lip 334. The lip 334 is an indentation in the inner edge of the guide ring 312. The lip 334 extends the entire circumference of the interior of the guide ring 312.

The lower interior surface 340 of the guide ring 312 has indentations 336 formed in it. Indentations 336 are substantially rectangular cutouts that are configured to receive the coupling teeth 14 of the lock ring 10.

The corners 338 of the indentations 336 are extended beyond the depth of the indentations 336 in order to allow the indentations 336 in the guide ring 312 to be manufactured to abut the coupling teeth 14.

While the indentations 336 are illustrated as rectangular cutouts, they may be any shape that will accommodate the coupling teeth 14 of the lock ring 10.

The guide ring 312 also includes alignment markings 320 and 322 which align with alignment markings formed on the surface of the molded product. The alignment markings 320 and 322 are lines formed in the surface of the guide ring 312 similar to the lines forming the other alignment markings previously discussed.

In alternate embodiments, the guide ring 312 may be any size or configuration that fits the specific ring or other insert being molded into the rotationally molded product.

FIGS. 31-35 illustrate a first embodiment of a guide plate 316. The guide plate 316 is configured to be received in the guide ring 312. The guide plate 316 includes a circular plate with a ridge 332 formed in the bottom outside circumference of the guide plate 316. The ridge 332 is configured to be received on the lip 334 of the guide ring 312.

A handle 314 is coupled near an edge of the guide plate 316. The handle 314 allows the guide plate 316 to be rotated within the guide ring 312. The handle 314 may be shaped or formed in any way that allows a user to easily manipulate the guide plate 316.

A router opening 330 is formed near an edge of the guide plate 316 in a location different from the location at which the handle 314 is coupled. The router opening 330 is a hole through the guide plate 316 at a distance from the lock ring 10 at which it is desired to make a cut.

A router with a router guide bushing is placed in the router opening 330. The guide plate 316 is then rotated and the router makes a circular cut through the molded product in order to remove material within the lock ring 10.

Figure 33:
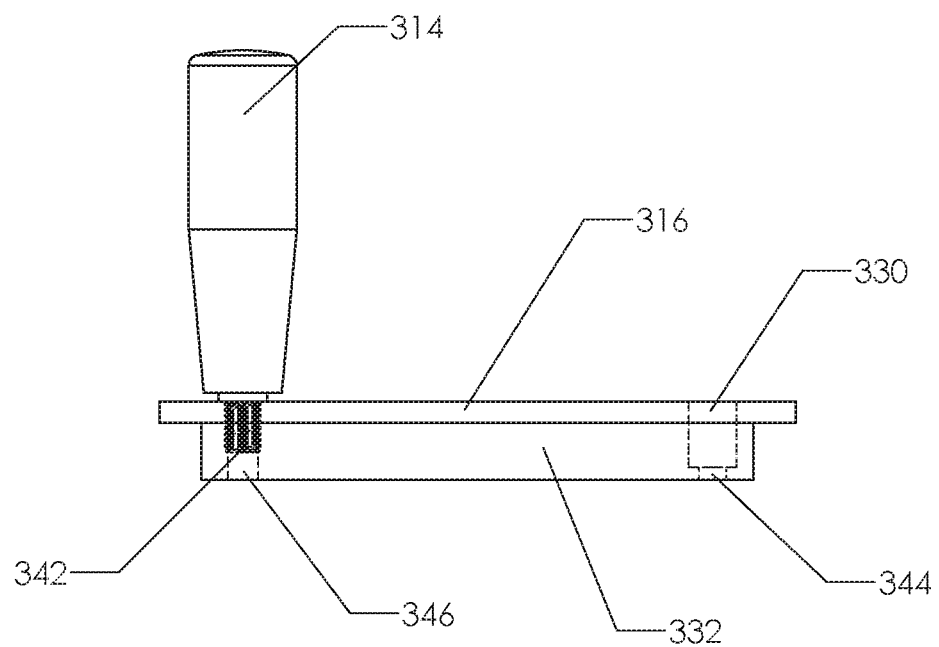
FIG. 33 is a side view showing hidden lines of a first embodiment of a guide plate for a machining guide for mounting on a rotationally molded product.
Figure 34:
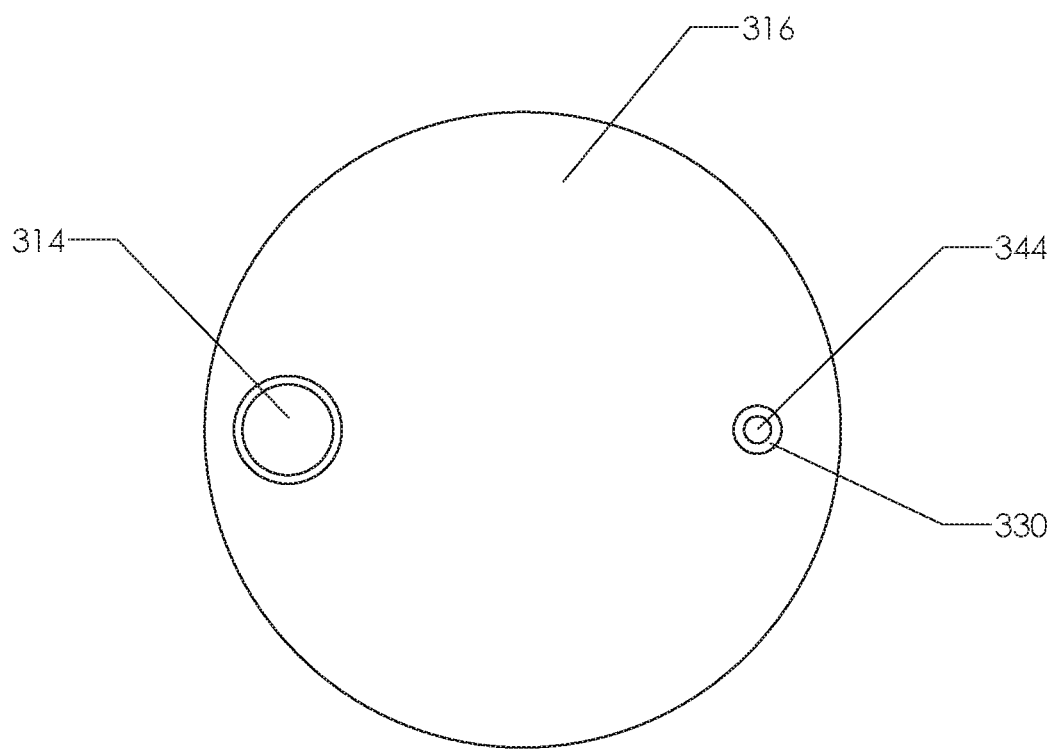
FIG. 34 is a top view of a first embodiment of a guide plate for a machining guide for mounting on a rotationally molded product.
Figure 35:
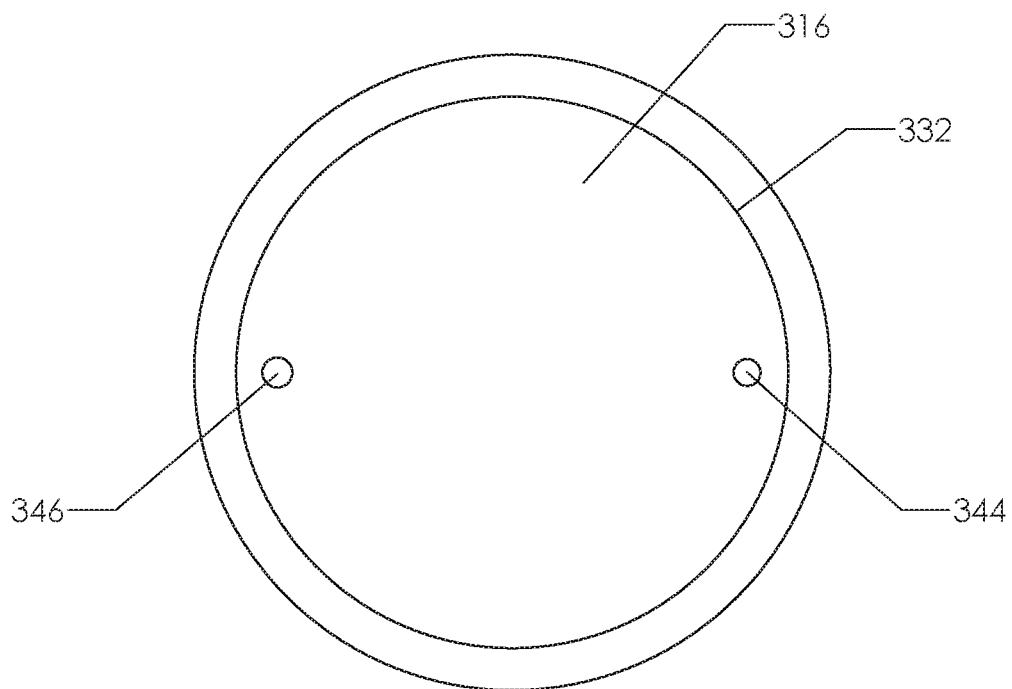
FIG. 35 is a bottom view of a first embodiment of a guide plate for a machining guide for mounting on a rotationally molded product.
Figure 36:
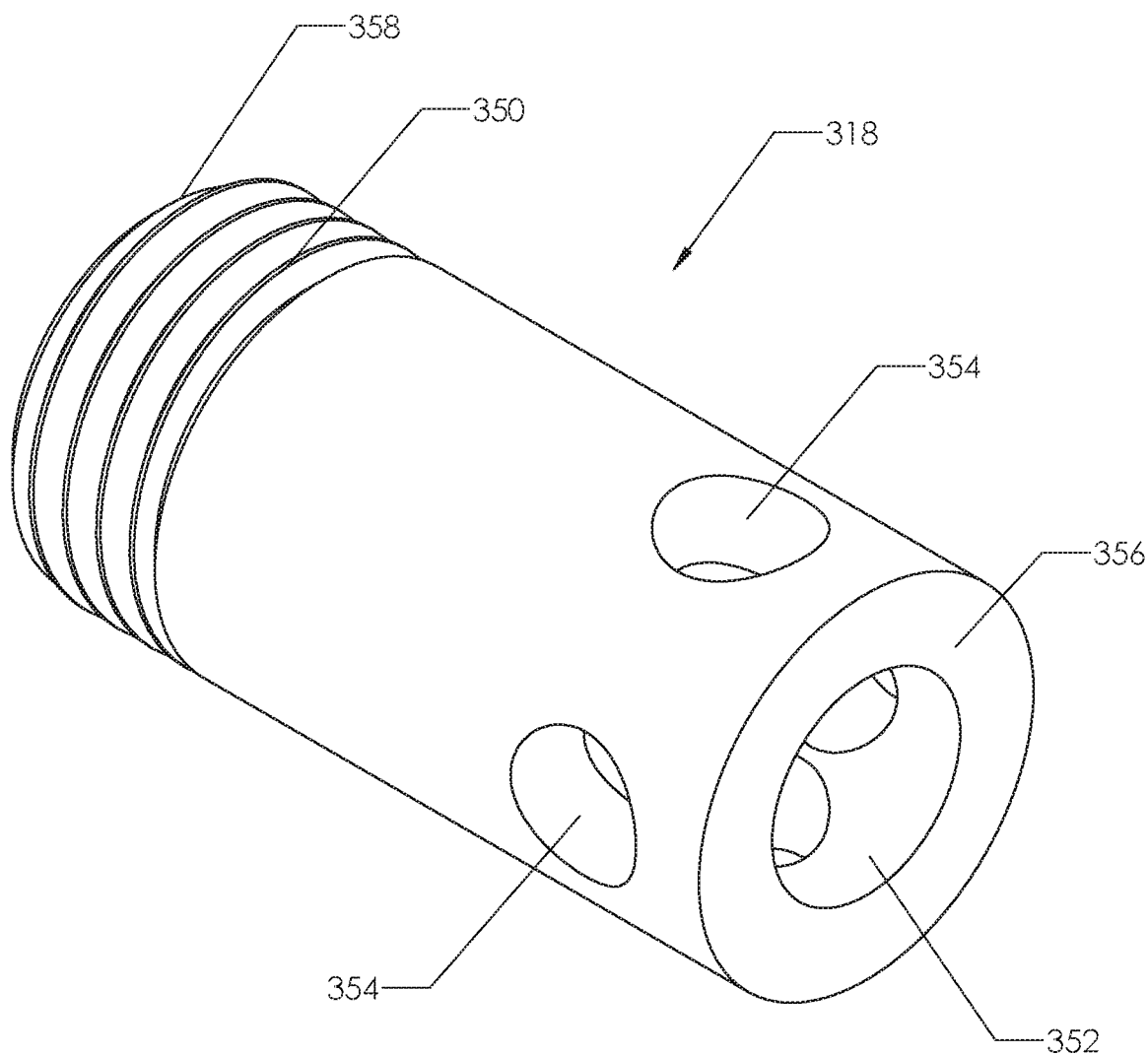
FIG. 36 is an isometric view of a first embodiment of a router guide bushing for a machining guide for mounting on a rotationally molded product.
Figure 37:
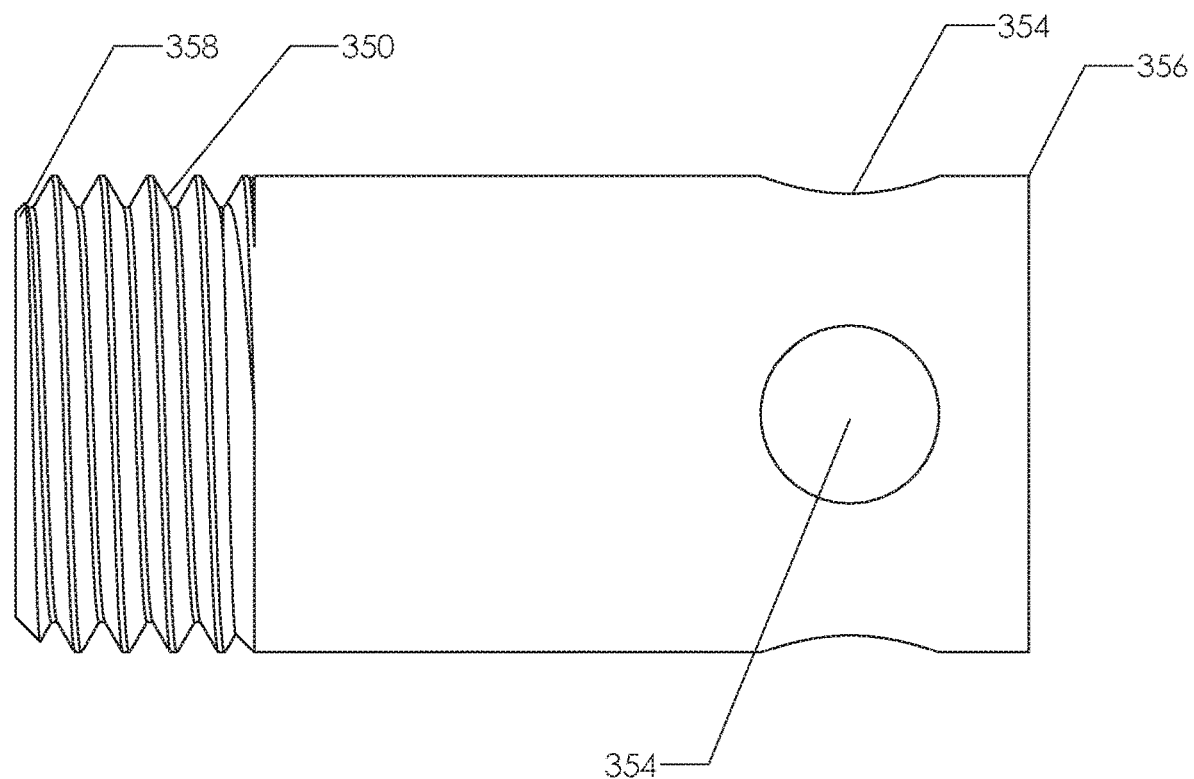
FIG. 37 is a side view of a first embodiment of a router guide bushing for a machining guide for mounting on a rotationally molded product.
Figure 38:
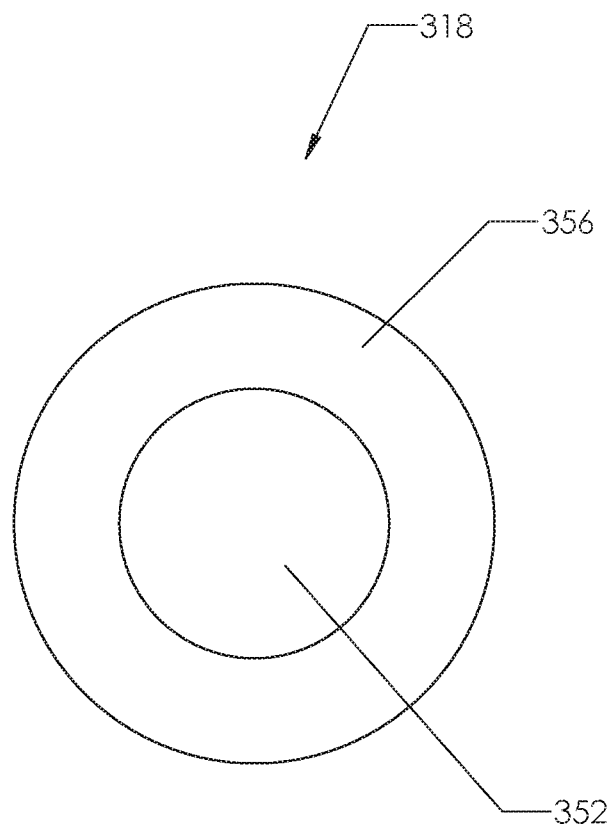
FIG. 38 is a first end view of a first embodiment of a router guide bushing for a machining guide for mounting on a rotationally molded product.
Figure 39:
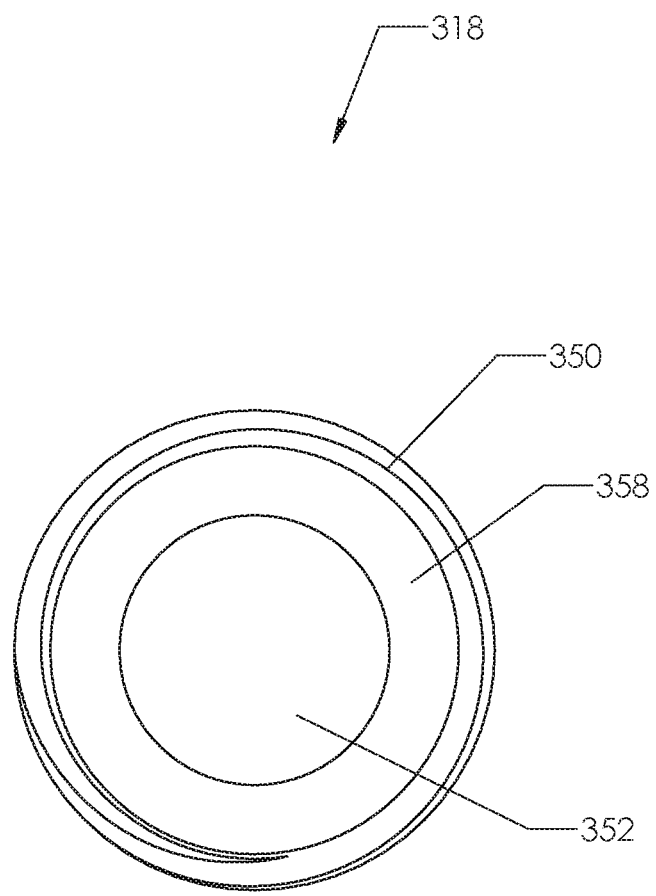
FIG. 39 is a second end view of a first embodiment of a router guide bushing for a machining guide for mounting on a rotationally molded product.

FIG. 33 illustrates a side view of a guide plate 316 with hidden lines shown. In this view, the bottom of handle 314 can be seen. The bottom of handle 314 is threaded 342 in order to allow the handle to be coupled in hole 346 formed in the guide plate 316.

Additionally, router opening 330 has a larger opening at the top and narrows abruptly towards the bottom 344 creating a lip which is used to support a router guide bushing.

FIGS. 36-39 illustrate a first embodiment of a router guide bushing 318. Router guide bushing 318 is a cylindrical member with a threaded 350 top 358. The router guide bushing 318 is open in the interior 352 with additional openings 354 in the sides of the router guide bushing 318 near the bottom 356. These additional openings 354 allow particles and the like from machining to leave the router guide bushing 318.

The router guide bushing 318 is configured to couple at its threaded end 358 to a router. The bit of the router extends through the interior 352 of the router guide bushing 318 and below the bottom 356 of the router guide bushing 318.

The router guide bushing 318 is coupled to the router and then the router guide bushing 318 is inserted into the router opening 330 in the guide plate 316. The router bit extends through the narrow bottom 344 of the router opening 330 with the router guide bushing 318 being supported by the larger top portion of the router opening 330.

After the router guide bushing 318 is inserted into the router opening 330, the router may be used to remove excess material from the molded product.

Figure 40:
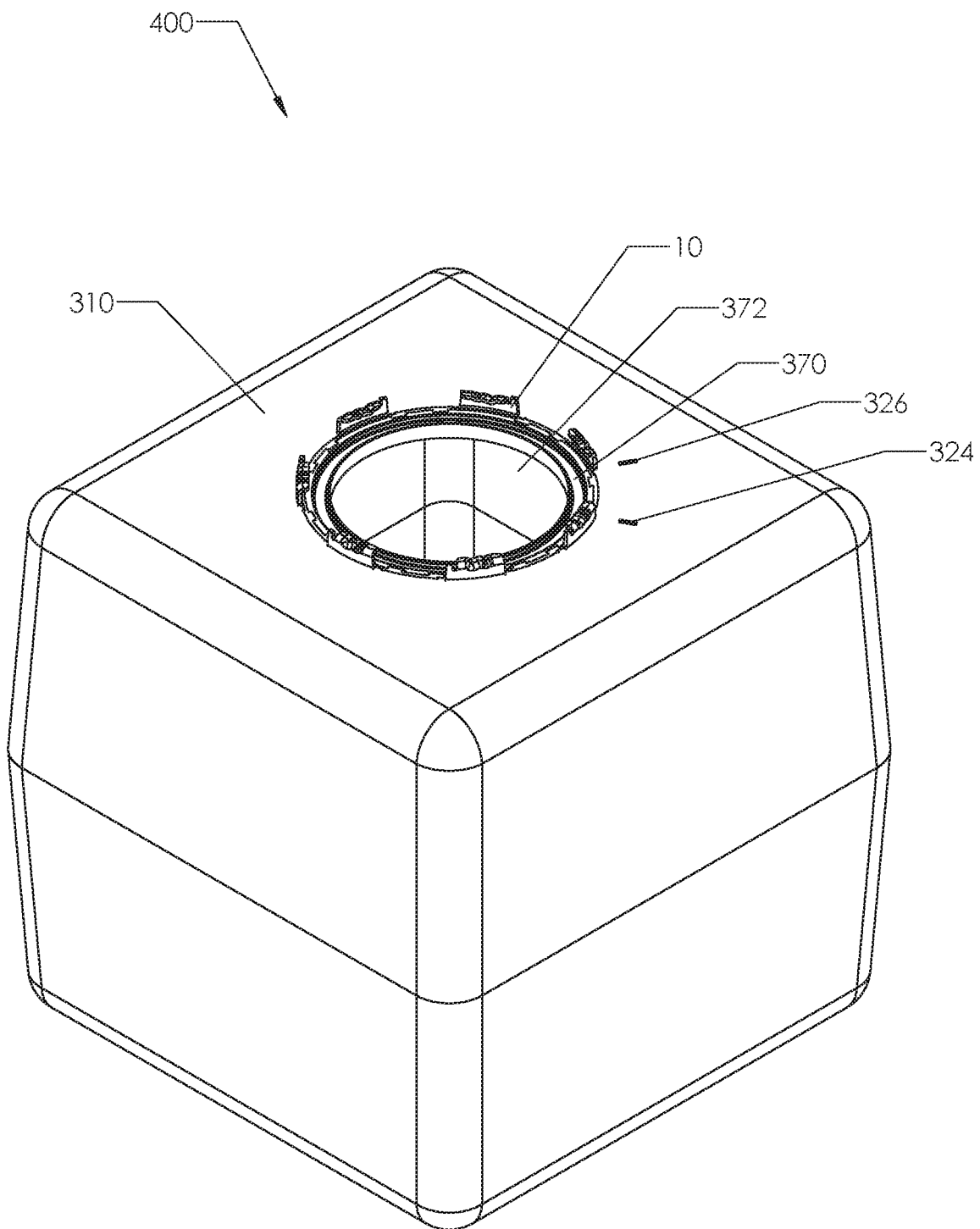
FIG. 40 is an isometric view of a completed rotationally molded product completed by a first embodiment of a method of rotationally molding a product with an embedded ring.

FIG. 40 illustrates a completed product 400. Molded product 310 is illustrated with embedded lock ring 10. Opening 372 has been cut in the center of the lock ring 10 with a router as discussed previously. Channel 370 was created by ridge 60 in the bottom of locking plate 30. Channel 370 will receive an O-ring.

Figure 41:
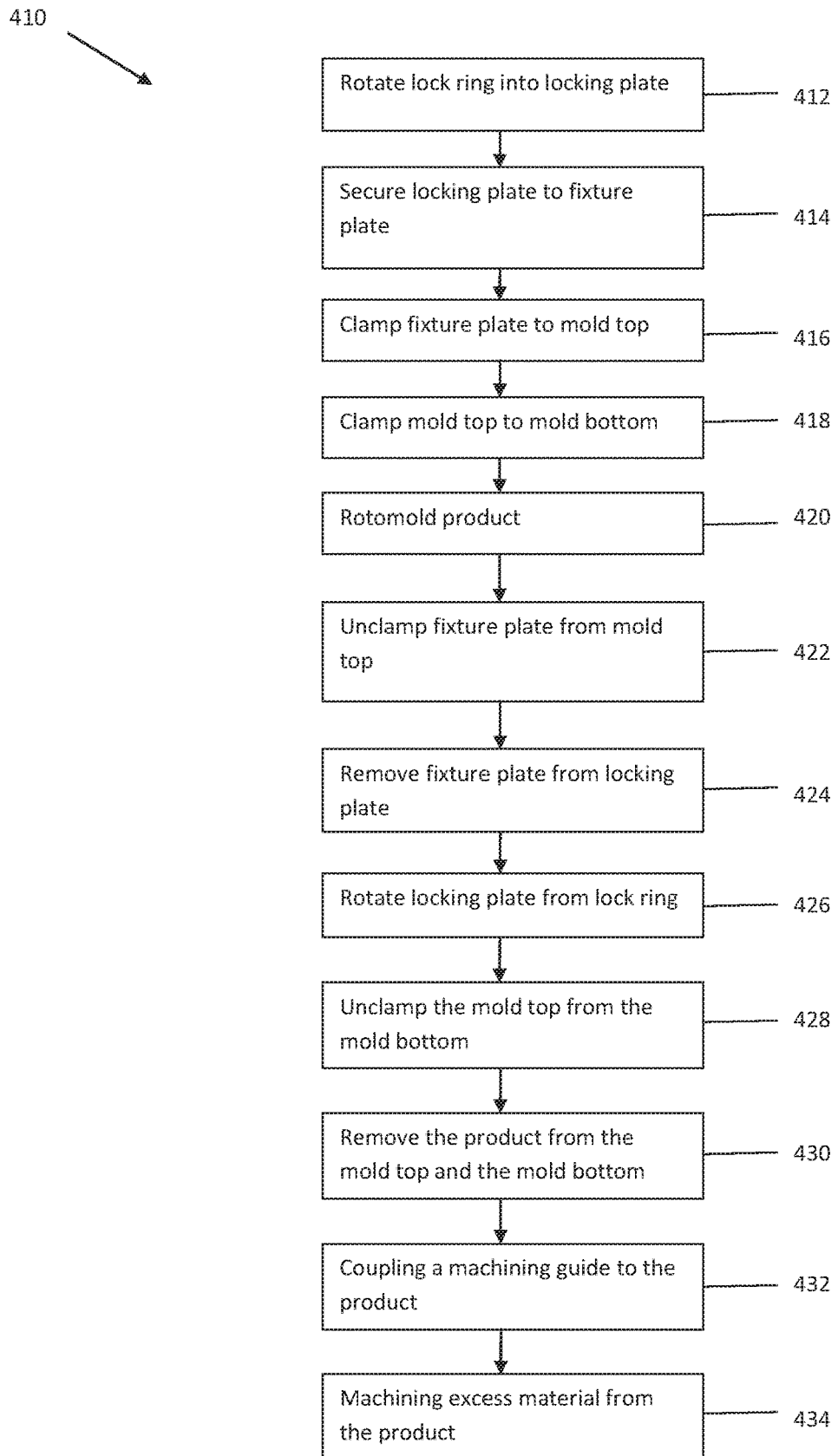
FIG. 41 is a flow chart of a first embodiment of a method of rotationally molding a product with an embedded ring.
Figure 42:
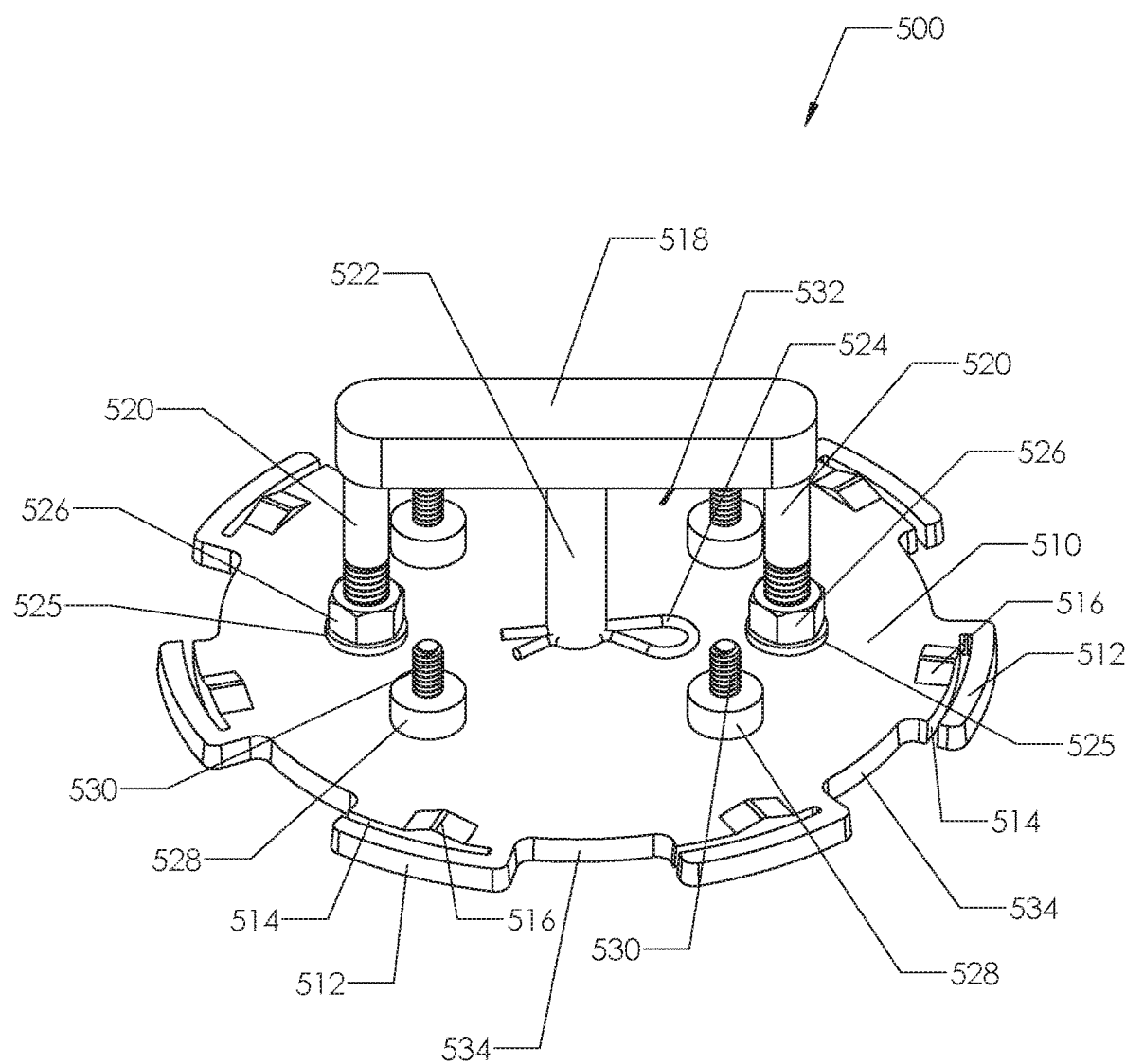
FIG. 42 is an isometric view of a second embodiment of a locking plate of a fixture for holding a lock ring in a rotational molding mold.
Figure 43:
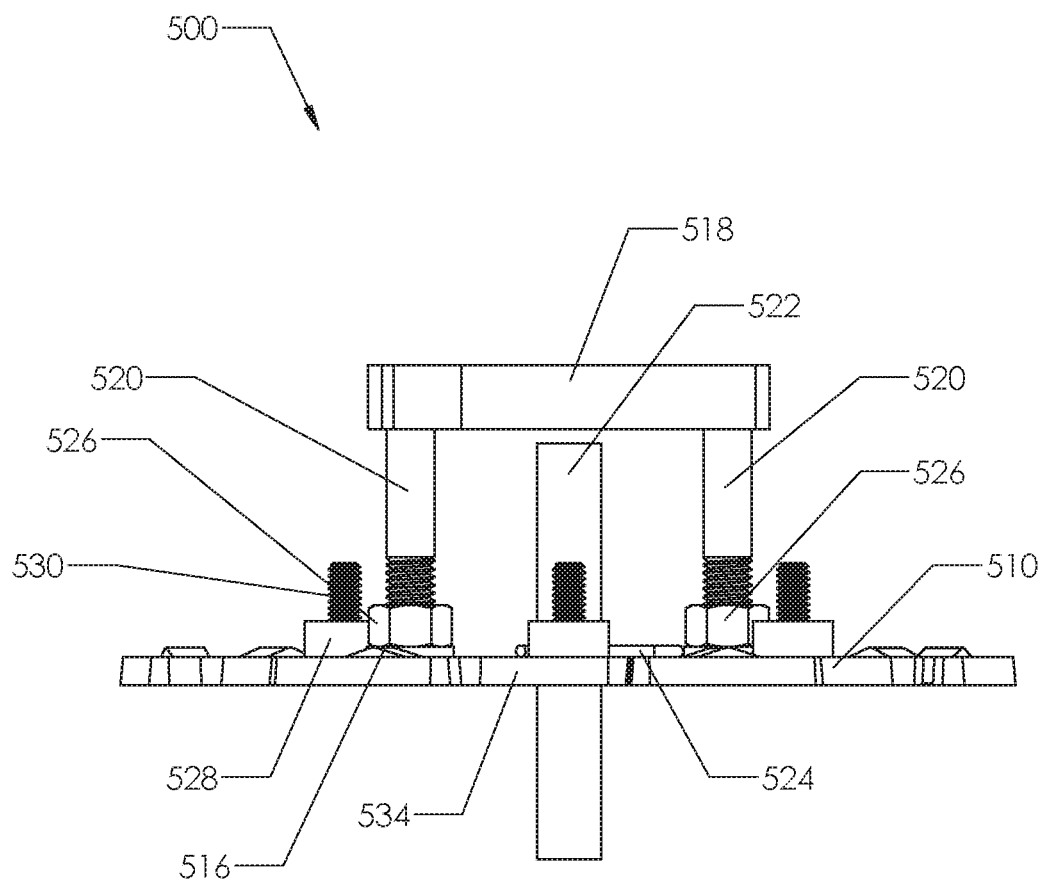
FIG. 43 is a side view of a second embodiment of a locking plate of a fixture for holding a lock ring in a rotational molding mold.
Figure 44:
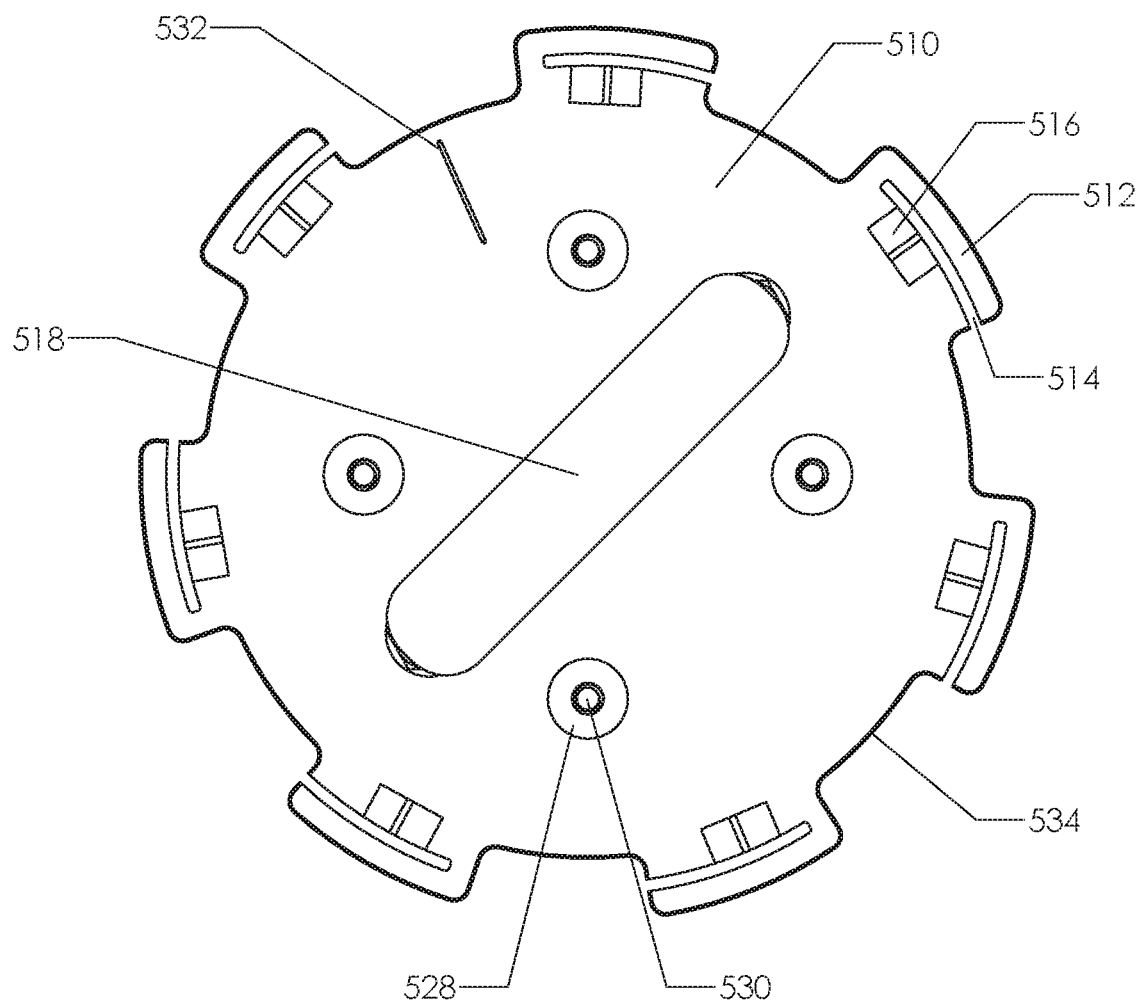
FIG. 44 is a top view of a second embodiment of a locking plate of a fixture for holding a lock ring in a rotational molding mold.

FIG. 41 illustrates a method 410 of manufacturing a product, such as a tank, with an embedded insert such as a lock ring 10. Step 412 of the method involves rotating the lock ring into the locking plate. The lock ring is placed into the locking plate so that the coupler teeth extend above the locking plate surface. The locking plate is then rotated with respect to the lock ring so that the coupler teeth are locked into place in the slots in the locking plate.

Step 414 of the method is to secure the locking plate to the fixture plate. The locking plate is secured to the fixture plate through the use of couplers such as bolts, screws, or the like. While adhesives or epoxies may be used, it is desirable to be able to disassemble the locking plate and fixture plate when the molding is done.

Step 416 is to clamp the fixture plate to the mold top. The fixture plate may be clamped into a fixture opening formed anywhere in the mold. The fixture plate is placed in the fixture opening with the mounting tabs of the lock ring pointing towards the inside of the mold. The fixture plate is secured in place by using large clamps.

Step 418 is to assemble the mold by clamping the top of the mold to the bottom of the mold.

Step 420 is to mold the product. While the product may be molded with injection molding, rotomolding or any other process desired. It is anticipated that this fixture and process will most likely be used in a rotomolding process.

Once the product has been molded and cooled, step 422 is to unclamp the fixture plate from the top of the mold.

Step 424 is to remove the fixture plate from the locking plate. The fixture plate is removed from the locking plate by removing the nuts and washers from the fixture plate bolts. The fixture plate can then be lifted up off of the locking plate.

Step 426 is to rotate the locking plate from the lock ring. The locking plate may be uncoupled from the lock ring by rotating the locking plate in the opposite direction it was rotated previously. Once the coupler teeth are free from the slots in the locking plate, the locking plate may be lifted free from the lock ring. The lock ring is now embedded in the product.

Step 428 is to unclamp the mold top and the mold bottom.

Step 430 is to remove the product from the mold top and the mold bottom.

Step 432 is to couple a machining guide to the lock ring embedded in the top of the product. The machining guide is coupled to the lock ring by placing the guide ring over the coupling teeth of the lock ring. The guide plate is then placed in the guide ring. A router guide bushing is coupled to a router.

Step 434 is to insert the router into the machining guide and by rotating the guide plate in the guide ring, to machine the excess material out of the inside of the lock ring on the molded part.

FIGS. 42-45 illustrate a second embodiment of a locking plate 500. Locking plate 500, as discussed above, is used to hold the lock ring 10 securely in the fixture.

The locking plate 500 is a circular plate 510 formed from metal or another material that can withstand the rotomolding process. The locking plate 500 has a thickness that is less than the height of the coupler teeth 14 of the lock ring 10.

Though illustrated as a circular plate 510, the locking plate 500 may be formed in any shape required to mate with the lock ring 10 desired to be molded into a product.

The locking plate 500 has a circular edge with a diameter slightly larger than that of the lock ring 10. The locking plate 500 has indented locations 534 evenly spaced around the outside of the locking plate 500.

The locking plate 500 also has extended locations 512 formed between the indented locations 534 around the outside of the locking plate 500. The extended locations 512 are portions of plate material that are the full diameter of the locking plate 500, or in other words, the extended locations 512 have an outer edge forming a diameter slightly larger than that of the lock ring 10.

The locking plate 500 has slots 514 formed at a location inset for the outer edge of the extended locations 512. The slots 514 are formed in the extended locations 512 on the locking plate 500. The slots 514 extend from a side of the extended locations 512 towards the opposite side of the extended locations 512. The slots 514 do not extend the entire width of the extended locations 512. The slots 514 pass through the entire thickness of the locking plate 500.

The slots 514 are formed as thin rectangular cuts through the locking plate 500.

Additionally, the locking plate 500 includes triangular locks 516 located at the inner edge of the slots 514. The triangular locks 516 are triangular pieces that extend above the surface of the locking plate 500. The triangular locks 516 have a rounded top.

The triangular locks 516 may be any thickness, width or height desired, provided the triangular locks 516 are sturdy enough to lock the lock ring 10 in place.

The triangular locks 516 though illustrated as triangles may in fact be any shape desired.

The locking plate 500 also has fixture plate coupler locations 528 formed in it. The fixture plate coupler locations 528 are cylinders extending from the top of the locking plate 500. Through the center of the cylinders, a hole is drilled in order to allow a coupler such as a bolt to extend from the bottom of the locking plate 500, up through the cylindrical, fixture plate coupler location 528. Typically the hole will be threaded.

There may be as many or as few fixture plate coupler locations 528 as desired, provided that there are enough of the fixture plate coupler locations 528 to securely couple a fixture plate to the locking plate 500 and few enough to allow the fixture to be easily assembled and disassembled.

Figure 45:
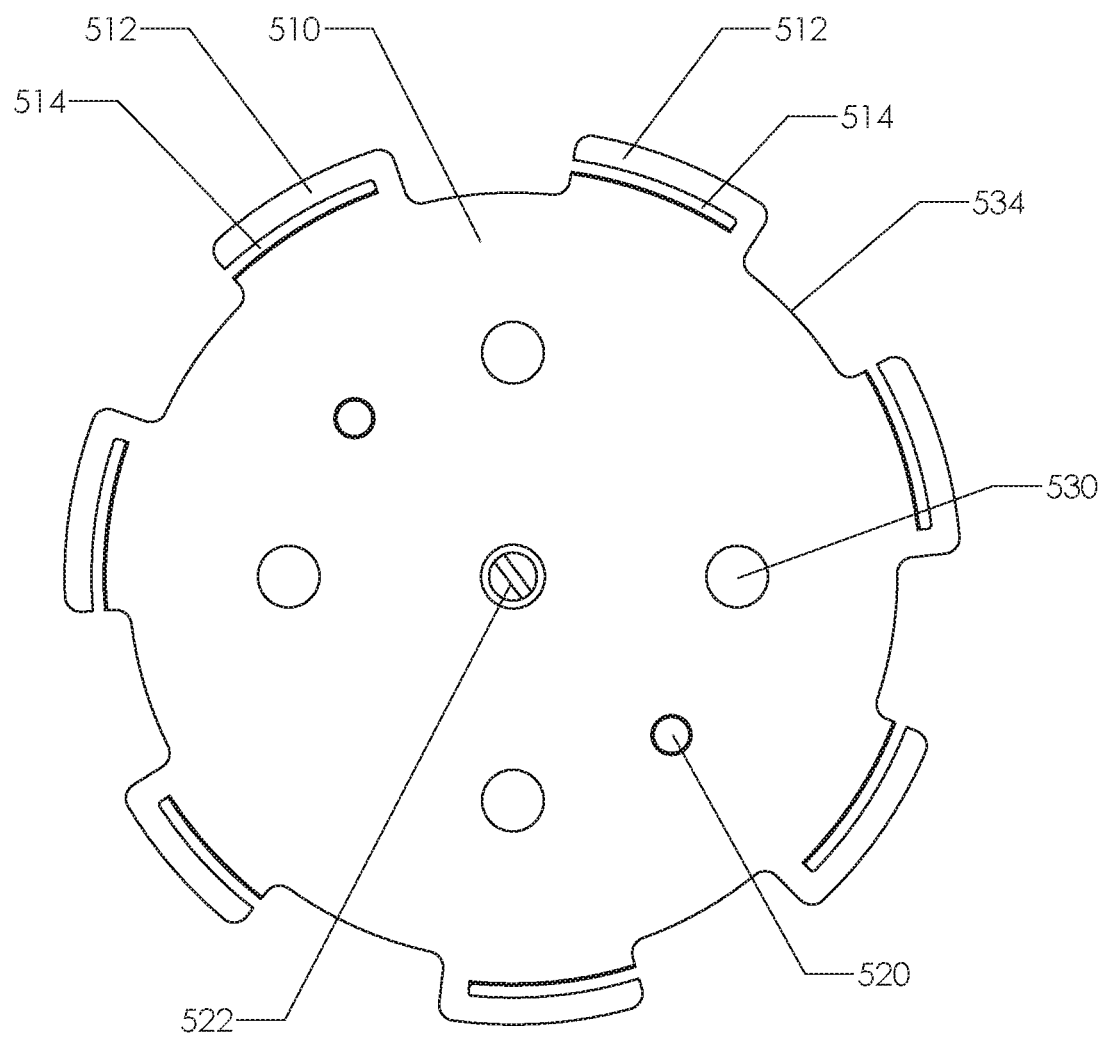
FIG. 45 is a bottom view of a second embodiment of a locking plate of a fixture for holding a lock ring in a rotational molding mold.
Figure 46:
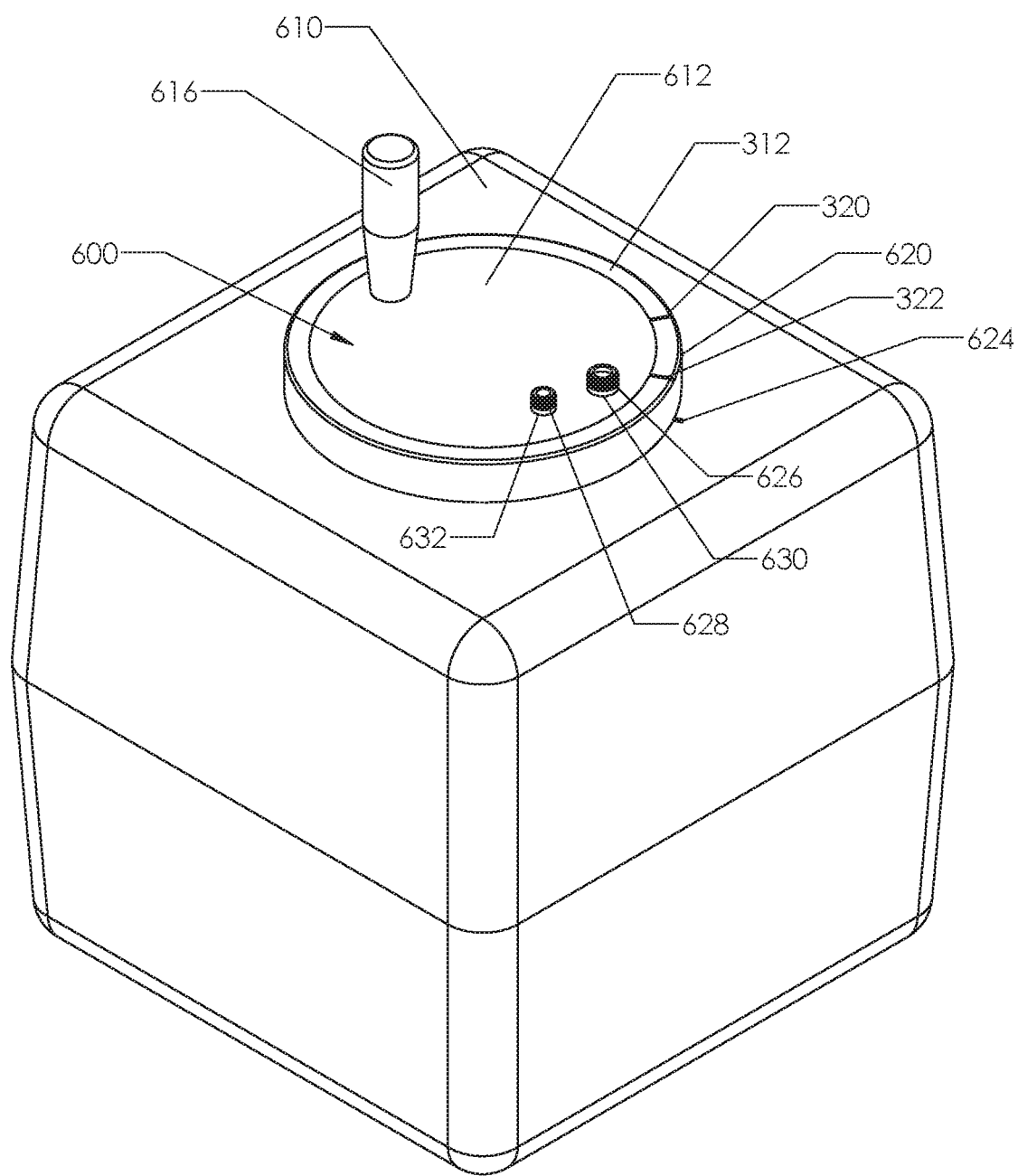
FIG. 46 is an isometric view of a second embodiment of a machining guide mounted on a rotationally molded product.
Figure 47:
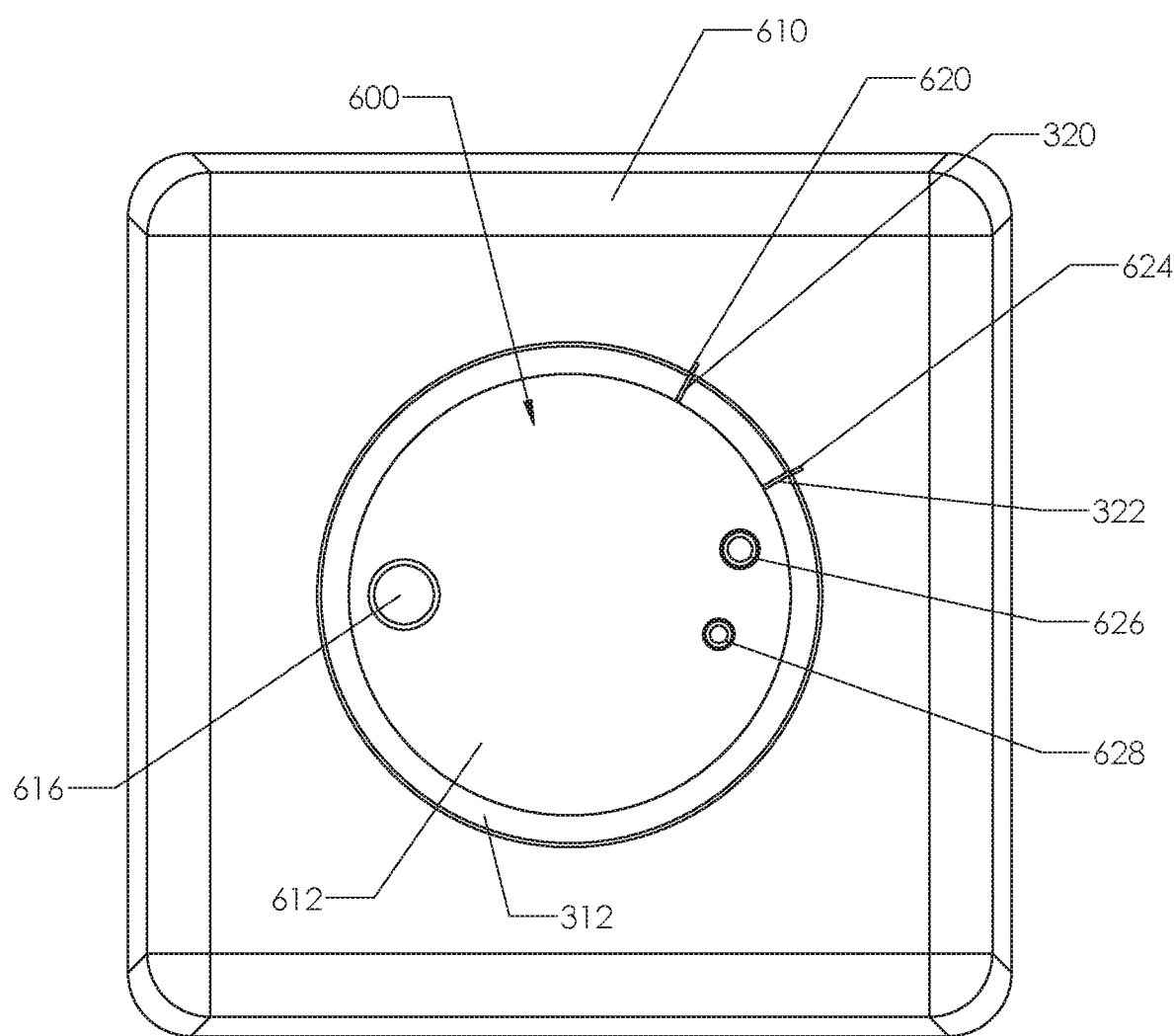
FIG. 47 is a top view of a second embodiment of a machining guide mounted on a rotationally molded product.
Figure 48:
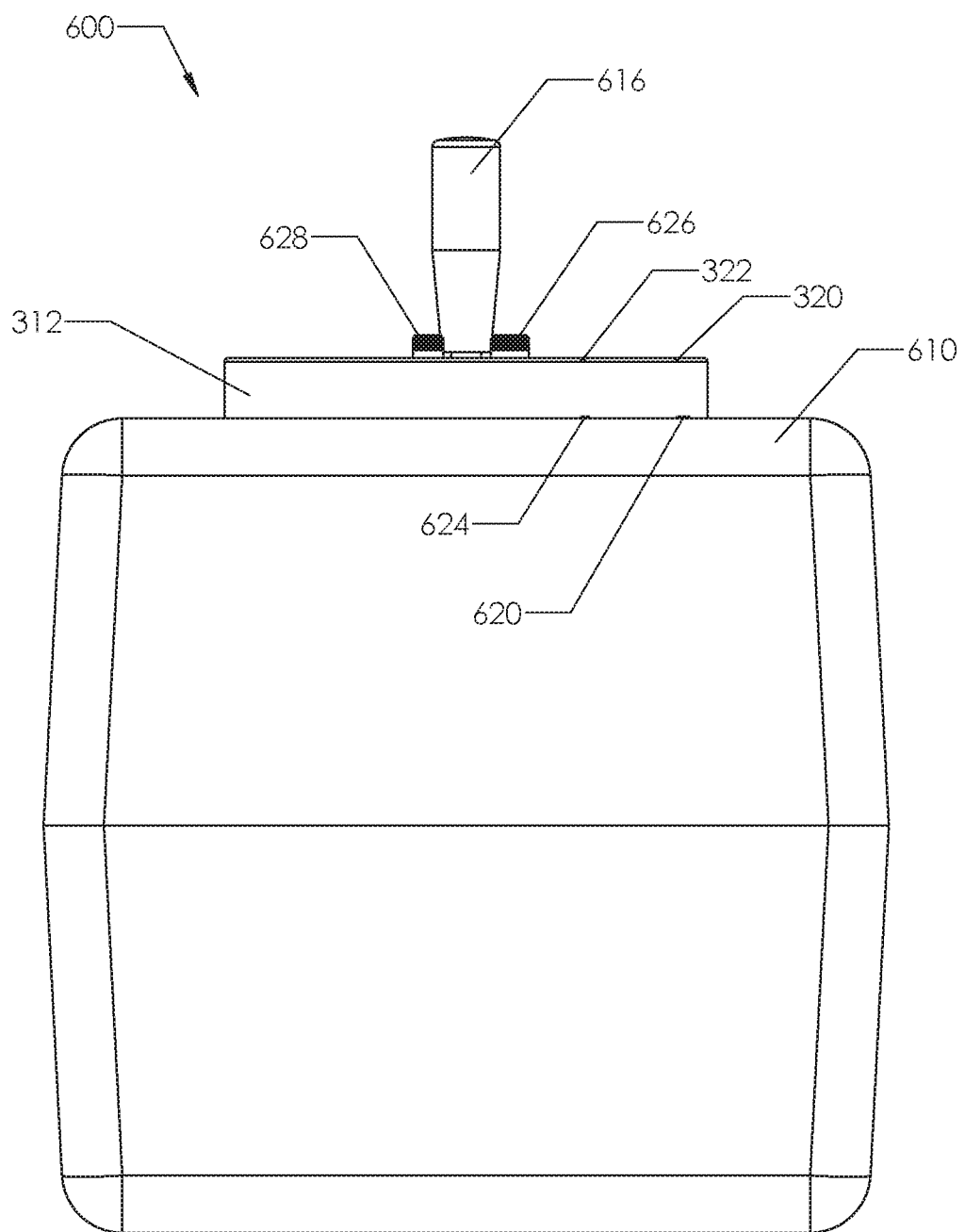
FIG. 48 is a side view of a second embodiment of a machining guide mounted on a rotationally molded product.
Figure 49:
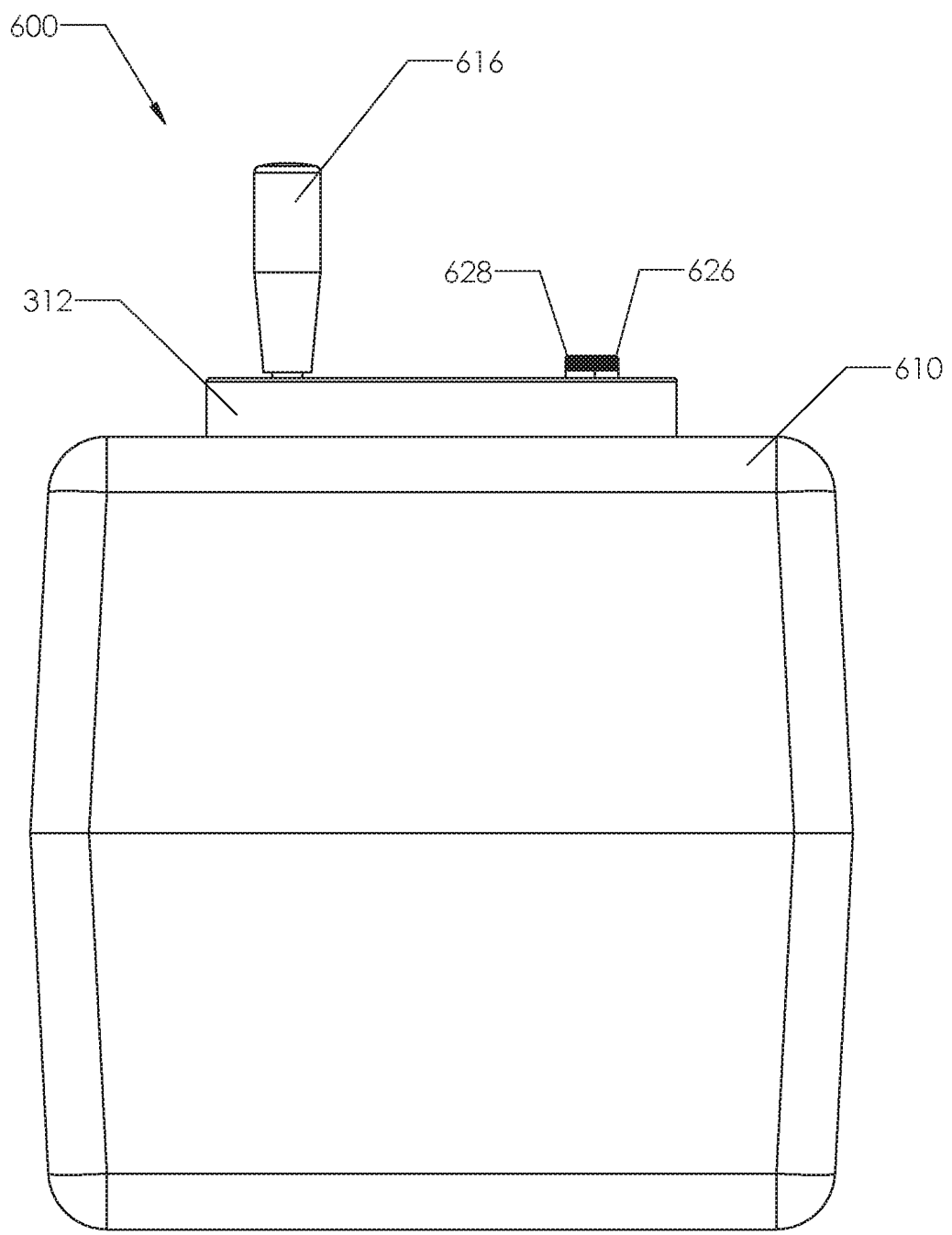
FIG. 49 is a front view of a second embodiment of a machining guide mounted on a rotationally molded product.

Bolts 530 are threaded through fixture plate coupler locations 528. Bolts 530 allow additional pieces of the fixture to be coupled together. Bolts 530, once placed through fixture plate coupler locations 528, are sanded or ground down so that they do not extend through the bottom of the locking plate 500 as illustrated in FIG. 45.

Handle locations 525 are also formed in the locking plate 500. Handle locations 525 are holes drilled through the locking plate 500. The handle location 525 holes are also threaded in order to couple the handle 518 to the locking plate 500. The handle locations 525 are located at two locations opposite each other in the locking plate 500.

Bolts 520 are coupled to handle locations 525. In assembling locking plate 500, a nut 526 and at least one lock washer are threaded onto bolts 520. Bolts 520 are then screwed into handle locations 525. Nuts 526 are then tightened down on bolts 520. The bottoms of bolts 520 are then sanded or ground down in order to prevent the ends of bolts 520 from extending into the mold itself.

Handle 518 is coupled to the tops of bolts 520. Handle 518 is permanently coupled through welding, adhesives or the like. Handle 518 allows locking plate 500 to be easily twisted into the lock ring 10 and the like.

Handle 518 is illustrated as a rounded rectangle, however, handle 518 could be any shape or size desired, provided it does not interfere with the function of the fixture.

An alignment mark 532 may also be formed in the surface of the locking plate 500. The alignment mark 532 is a linear indentation formed in the surface of the locking plate 500 in order to allow the locking plate 500 to be properly aligned with the rest of the fixture.

Vent 522 is also coupled to locking plate 500. Vent 522 passes through the center of locking plate 500 in order to allow gasses and pressure within the mold to escape during the rotational molding process. Vent 522 is illustrated as a hollow cylindrical tube. Vent 522 may be any size or shape desired, provided that it stills serves the purpose of allowing gasses to escape the mold. Vent 522 may be formed from any material desirable which can withstand the rotational molding process.

Vent 522 is held in place by pin 524. Pin 524 couples to vent 522 and prevents it from falling through the locking plate 500.

Unlike the previous embodiment of a locking plate, locking plate 500 does not have a ridge on the bottom of the locking plate 500.

In order to couple the lock ring 10 to the locking plate 500, the coupler teeth 14 are placed in the indented locations 534 of the locking plate 500.

The locking plate 500 is then rotated with respect to the lock ring 10 so that the coupler teeth 14 travel into the slots 514 on the extended locations 512 of the locking plate 500. The coupler teeth 14 are locked into the slots 514 by the ridges on the coupler teeth 14 mating with the triangular locks 516 on the locking plate 500.

The alternate embodiment of locking plate 500 couples to a lock ring and fixture plate as discussed above. Additionally, the locking plate 500 is utilized in a fixture in a mold as discussed previously. The locking plate 500 does not, however, include a ridge on the bottom as the previous embodiment of a locking plate did. Therefore, a channel is not formed in the molded product as in the previous embodiments.

FIGS. 46-50 illustrate an second embodiment of a machining guide 600 to be used on a molded product 610. The second embodiment of a machining guide 600 is configured to be used when the second embodiment of the locking plate 500 is used in the molding process.

The second embodiment of a machining guide 600 is used to machine a channel and cut out the extra material in the center of the lock ring.

The guide ring 312 used in the second embodiment of the machining guide 600 operates identically to the guide ring 312 discussed previously. The guide ring 312 used in the second embodiment of the machining guide 600 may, however, have different dimensions than the guide ring 312 used in the first embodiment of the machining guide.

The guide plate 612, however, is different for the second embodiment of the machining guide 600 as it has two router openings 630 and 632. Router opening 630 is used to cut a channel in the surface of the molded product. The channel will receive an O-ring. Router opening 632 is used to remove the excess material in the center of the lock ring.

As previously discussed, the molded product 610 has alignment marks 620 and 624 which are marks formed in the molding of the product. Alignment marks 620 and 624 align with alignment marks 320 and 322 on the guide ring 312. The alignment marks are linear indentations formed in the surfaces of the various pieces.

Guide plate 612 also comprises a handle 616 and router guide bushings 626 and 628.

Figure 50:
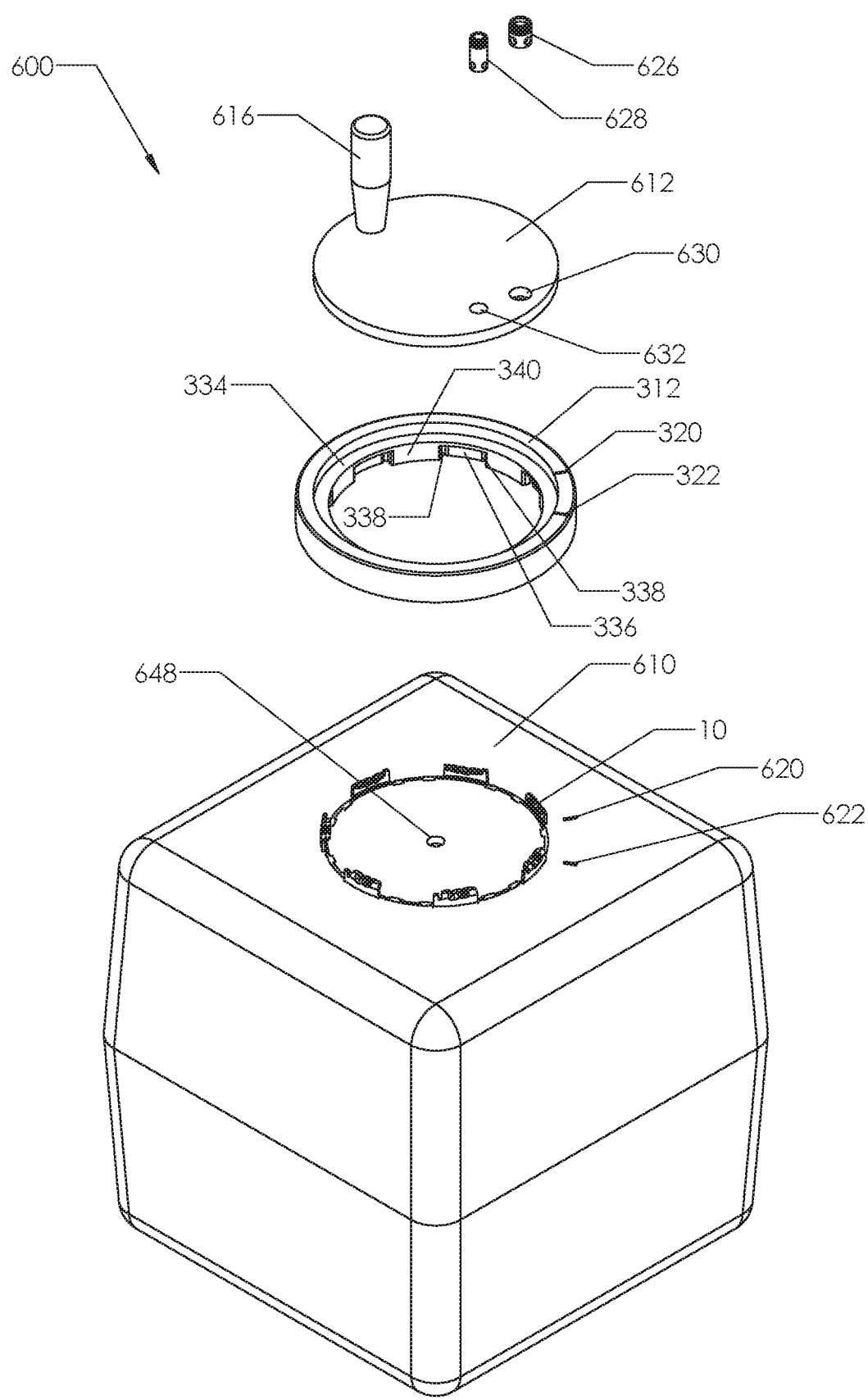
FIG. 50 is an exploded isometric view of a second embodiment of a machining guide mounted on a rotationally molded product.
Figure 51:
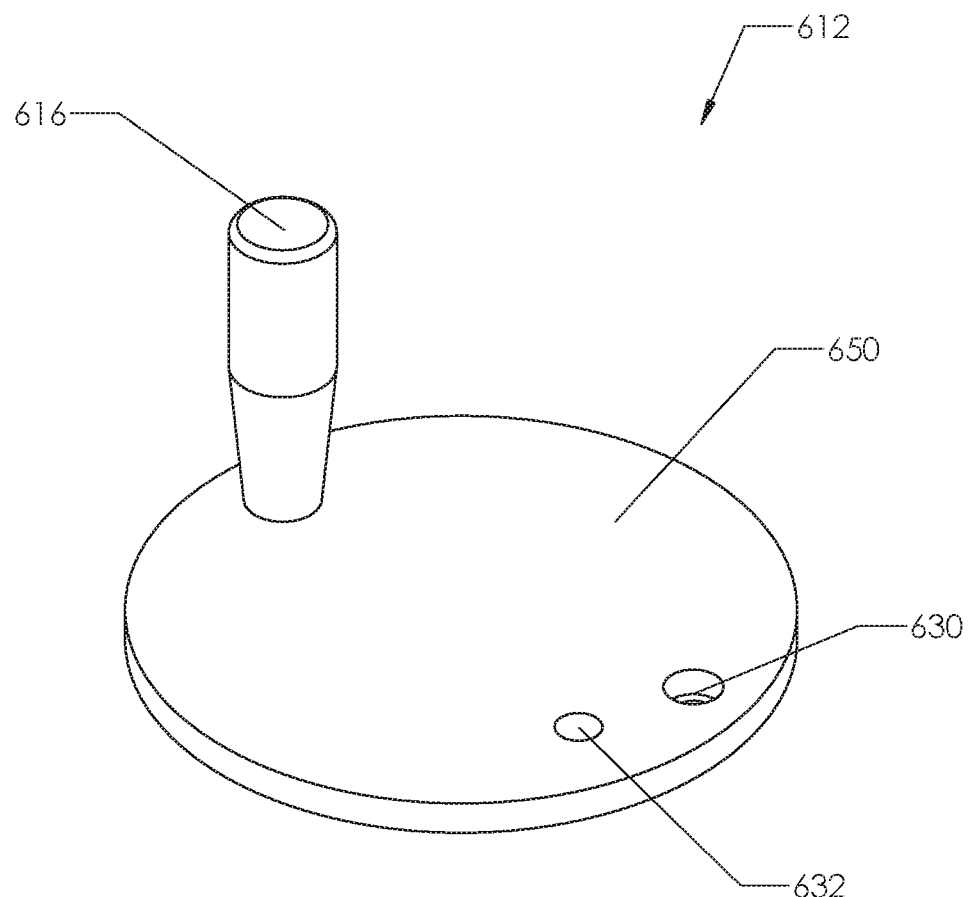
FIG. 51 is an isometric view of a second embodiment of a guide plate for a machining guide for mounting on a rotationally molded product.
Figure 52:
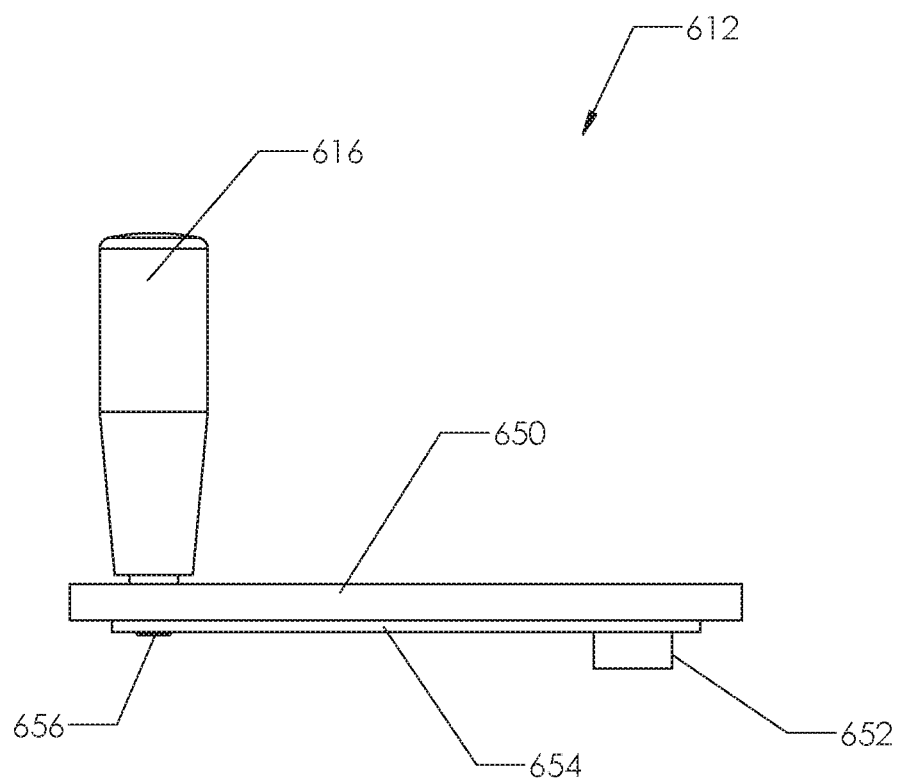
FIG. 52 is a side view of a second embodiment of a guide plate for a machining guide for mounting on a rotationally molded product.
Figure 53:
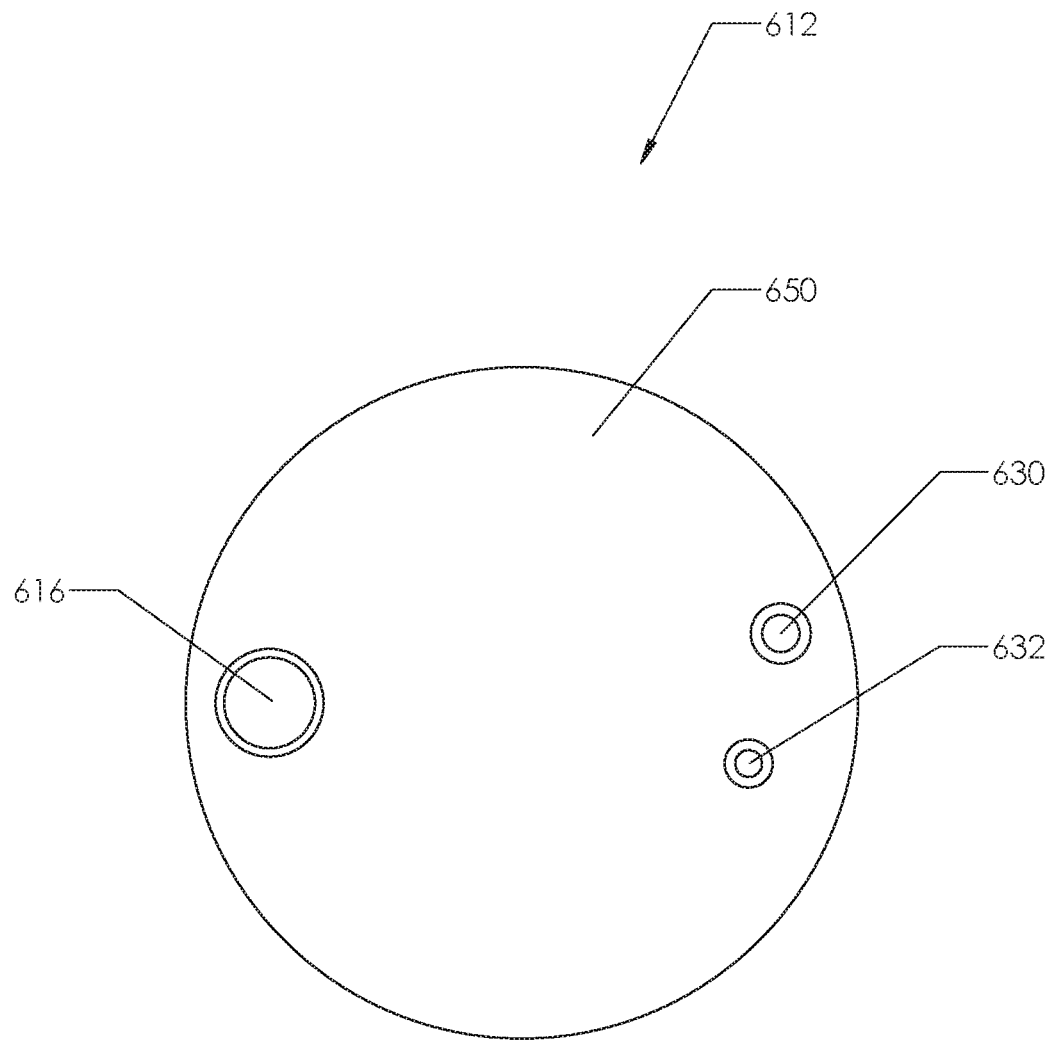
FIG. 53 is a top view of a second embodiment of a guide plate for a machining guide for mounting on a rotationally molded product.
Figure 54:
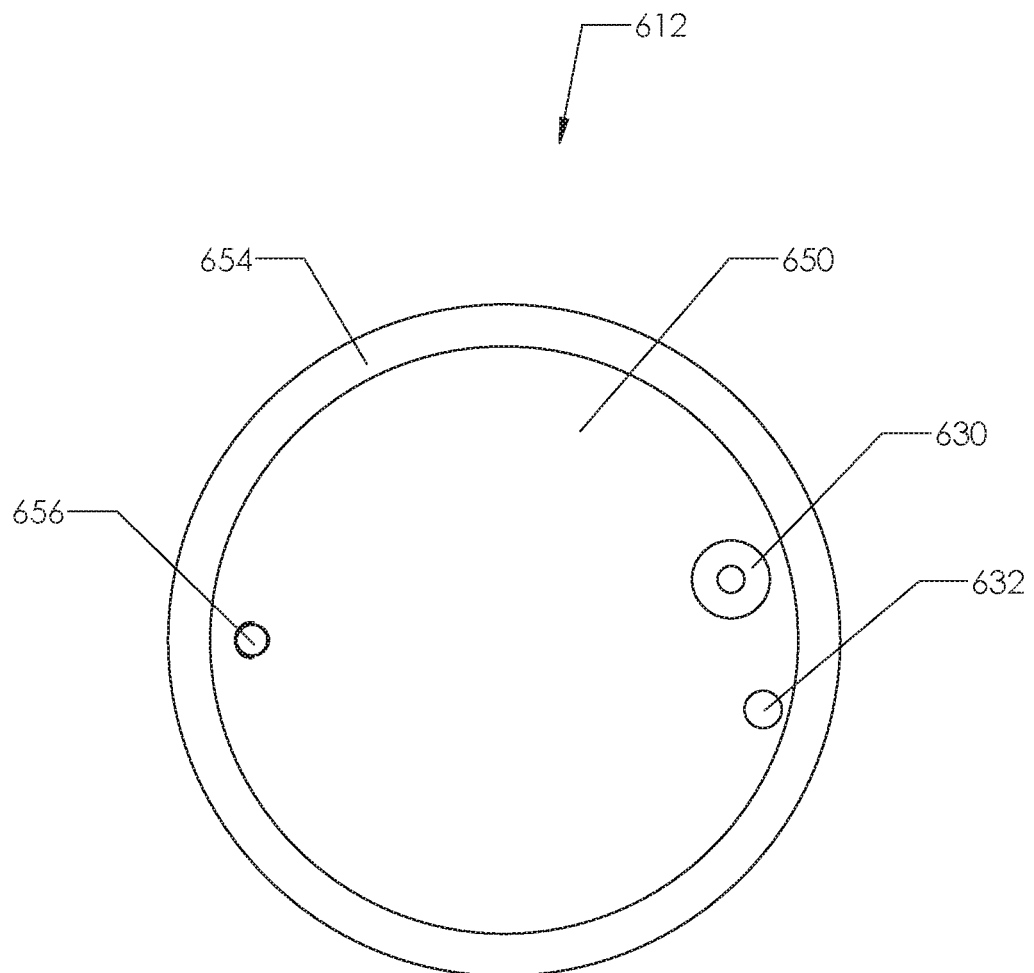
FIG. 54 is a bottom view of a second embodiment of a guide plate for a machining guide for mounting on a rotationally molded product.

FIG. 50 illustrates an exploded view of a molded product 610 with a machining guide 600. In the center of the lock ring 10 which is embedded in the top of the product 610, a vent hole 648 is illustrated. Additionally, a guide ring 312 which removably couples to the lock ring 10 embedded in the product 610 is also illustrated and a guide plate 612 which is placed inside the guide ring 312.

While the guide ring 312, used in this embodiment is identical to the guide ring 312 disclosed previously, the guide plate 612 is different.

FIGS. 51-55 illustrate a second embodiment of a guide plate 612. The guide plate 612 is configured to be received in the guide ring 312. The guide plate 612 includes a circular plate 650 with a ridge 654 formed in the bottom outside circumference of the guide plate 612. The ridge 654 is configured to be received on the lip 334 of the guide ring 312.

A handle 616 is coupled near an edge of the guide plate 612. The handle 616 allows the guide plate 612 to be rotated within the guide ring 312. The handle 616 may be shaped or formed in any way that allows a user to easily manipulate the guide plate 612.

A first router opening 630 is formed near an edge of the guide plate 612 in a location different from the location at which the handle 616 is coupled. The first router opening 630 is a hole through the guide plate 612 at a distance from the lock ring 10. The first router opening 630 is used to cut a channel in the molded product.

A router with a router guide bushing is placed in the first router opening 630. The guide plate 612 is then rotated and the router makes a circular cut into the molded product in order to create a channel in the molded product. The channel will be used to receive an O-ring.

A second router opening 632 is formed farther from an edge of the guide plate 612 that the first router opening 630 and in a location different from the location at which the handle 616 is coupled. The second router opening 632 is a hole through the guide plate 612 at a distance from the lock ring 10. The second router opening 632 is used to remove excess material on the molded product from the inside of the lock ring.

A router with a router guide bushing is placed in the second router opening 632. The guide plate 612 is then rotated and the router makes a circular cut into the molded product in order to remove a circular section of material.

Figure 55:
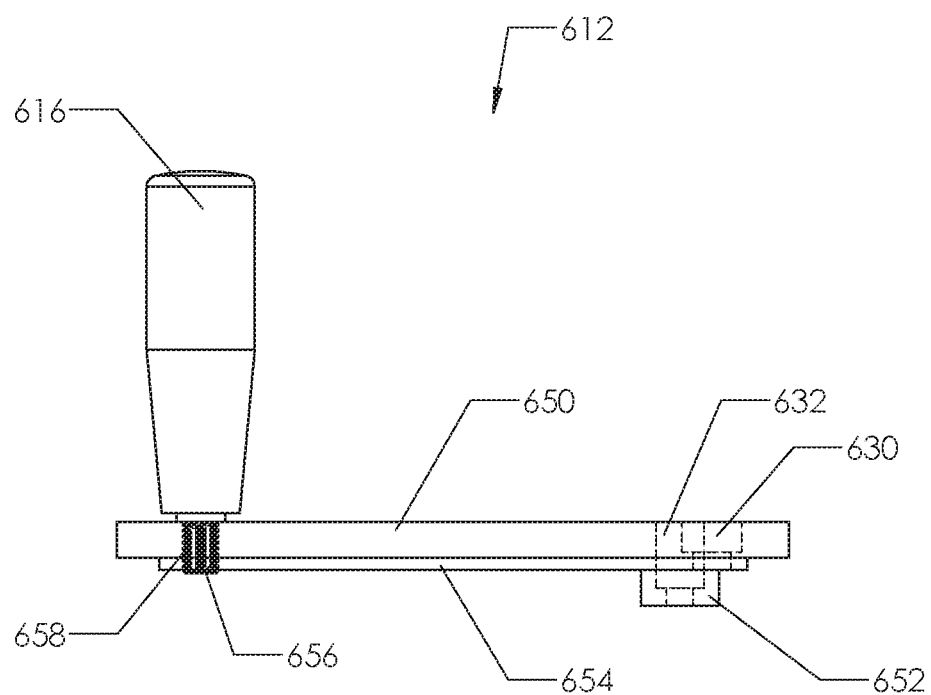
FIG. 55 is a side view with hidden lines of a second embodiment of a guide plate for a machining guide for mounting on a rotationally molded product.
Figure 56:
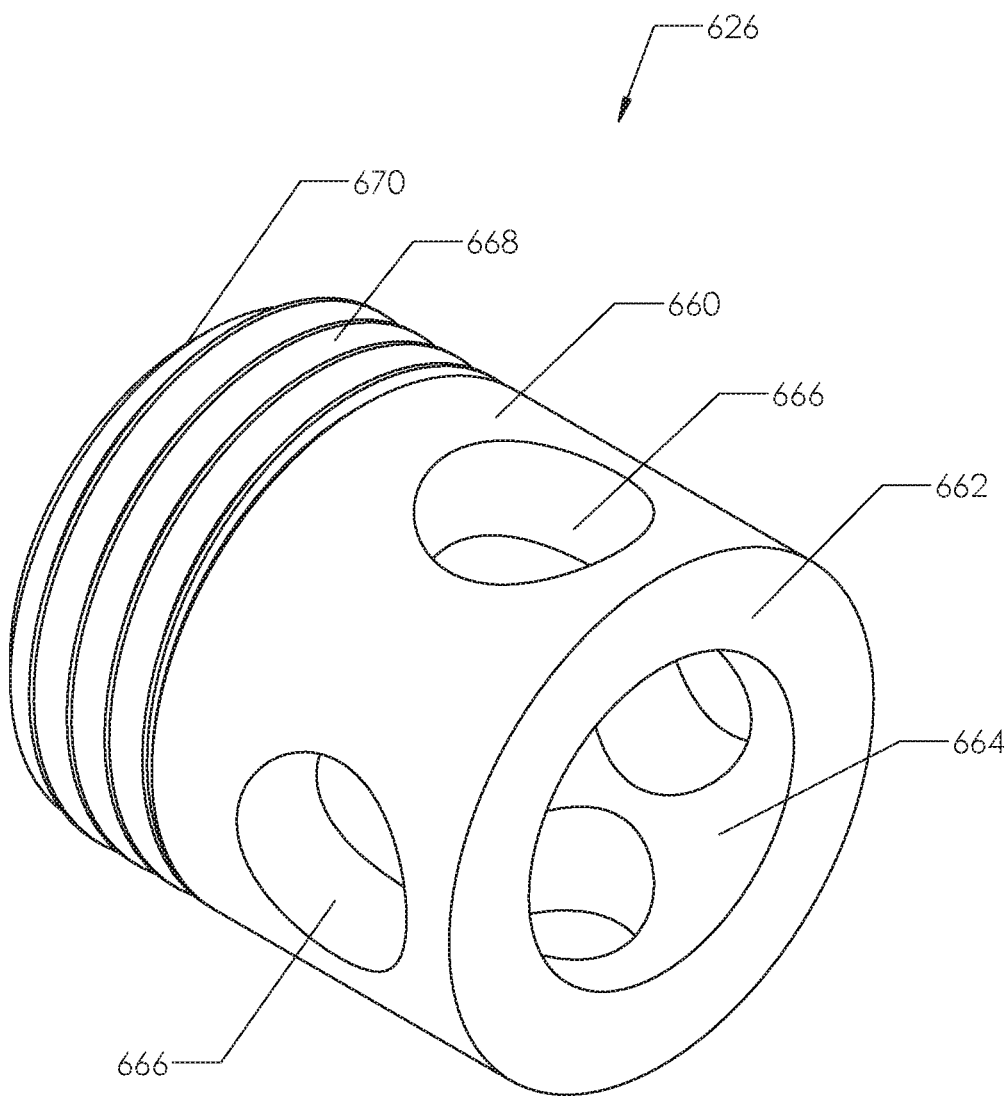
FIG. 56 is an isometric view of a second embodiment of a router guide bushing for a machining guide for mounting on a rotationally molded product.
Figure 57:
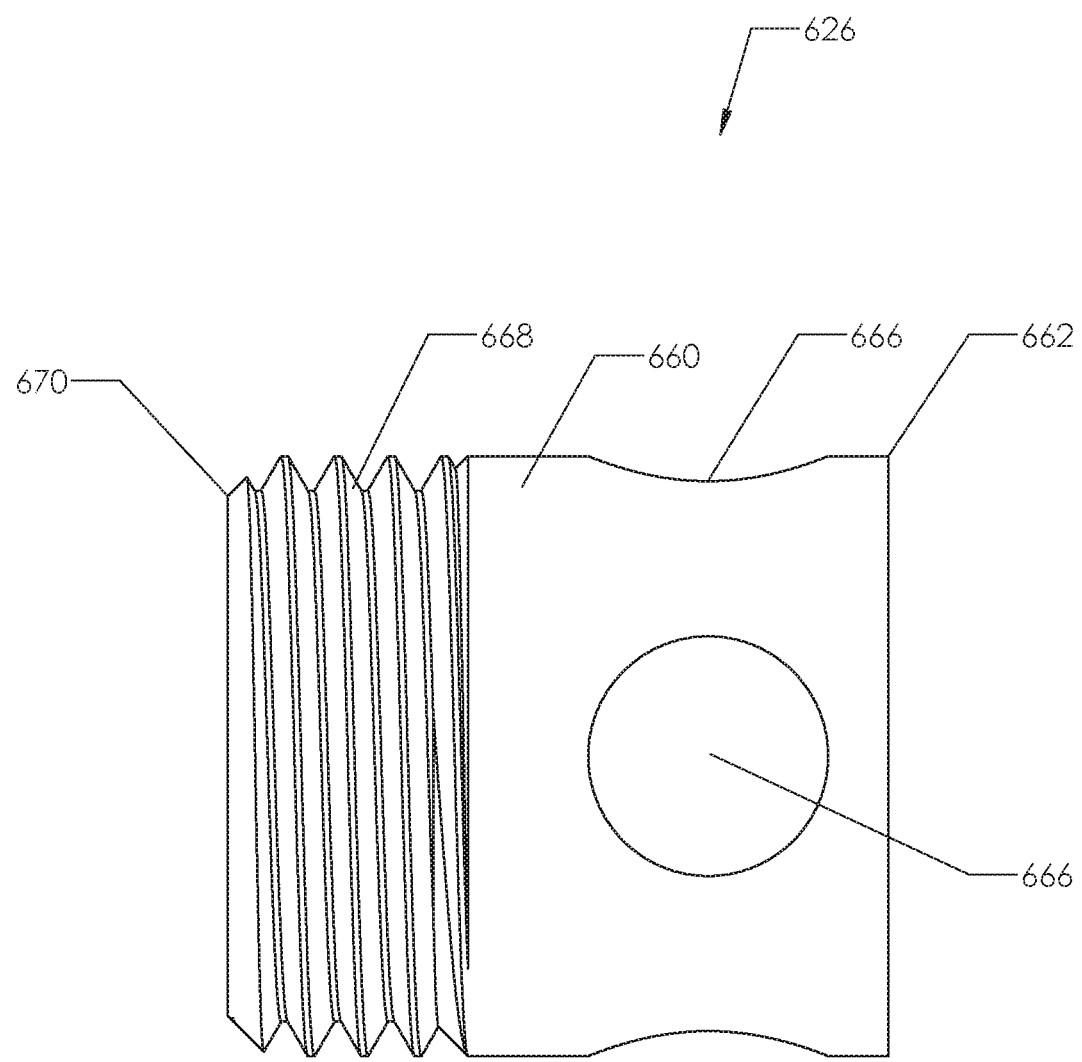
FIG. 57 is a side view of a second embodiment of a router guide bushing for a machining guide for mounting on a rotationally molded product.
Figure 58:
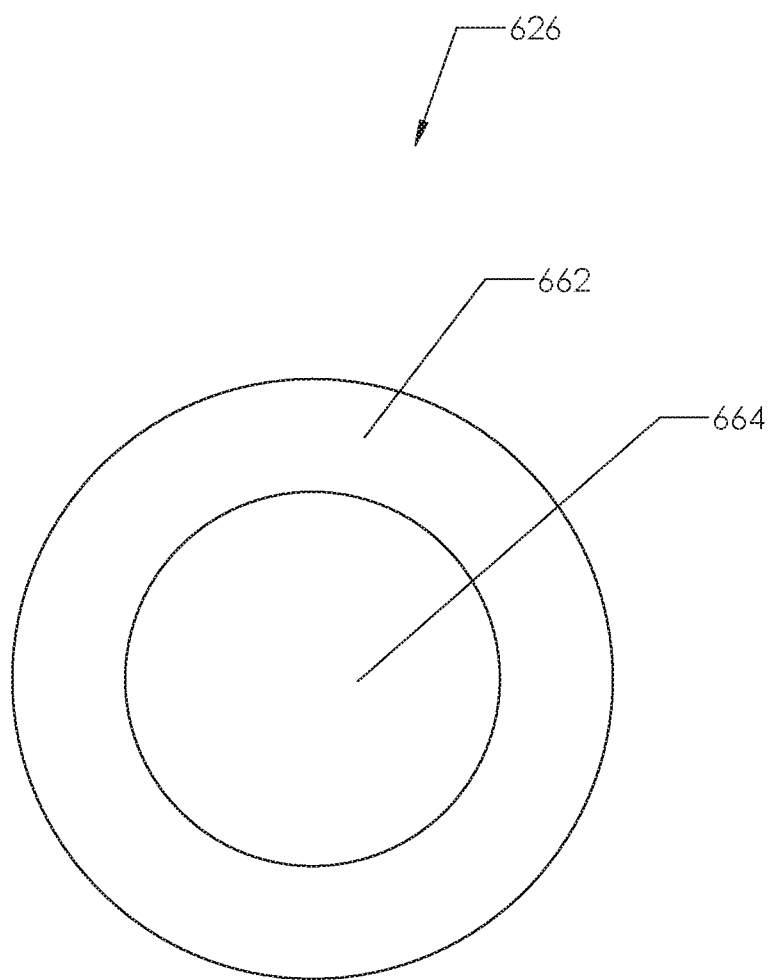
FIG. 58 is a first end view of a second embodiment of a router guide bushing for a machining guide for mounting on a rotationally molded product.
Figure 59:
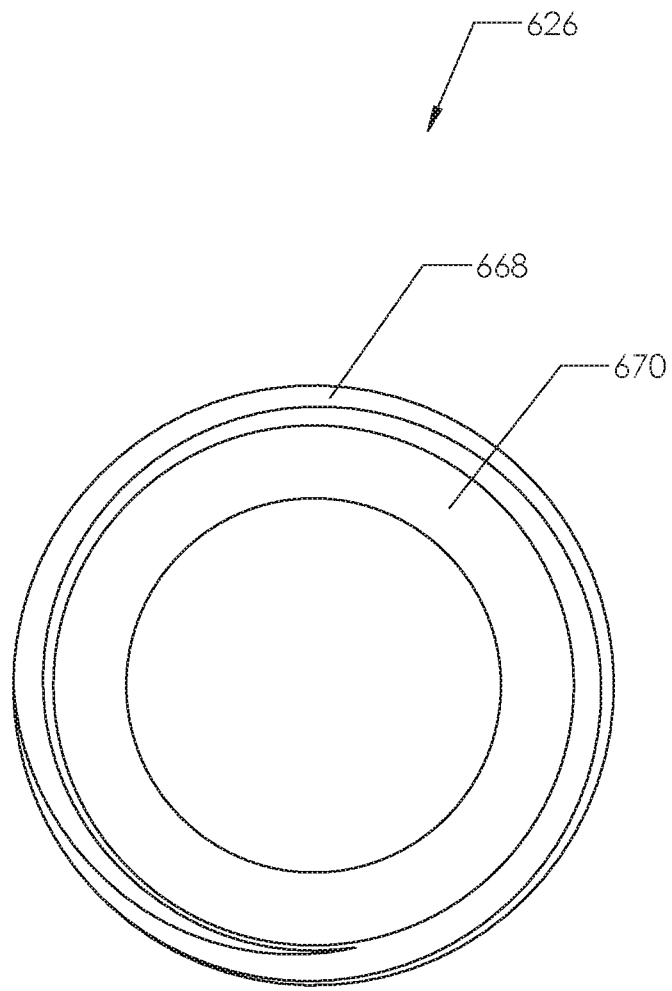
FIG. 59 is a second end view of a second embodiment of a router guide bushing for a machining guide for mounting on a rotationally molded product.
Figure 60:
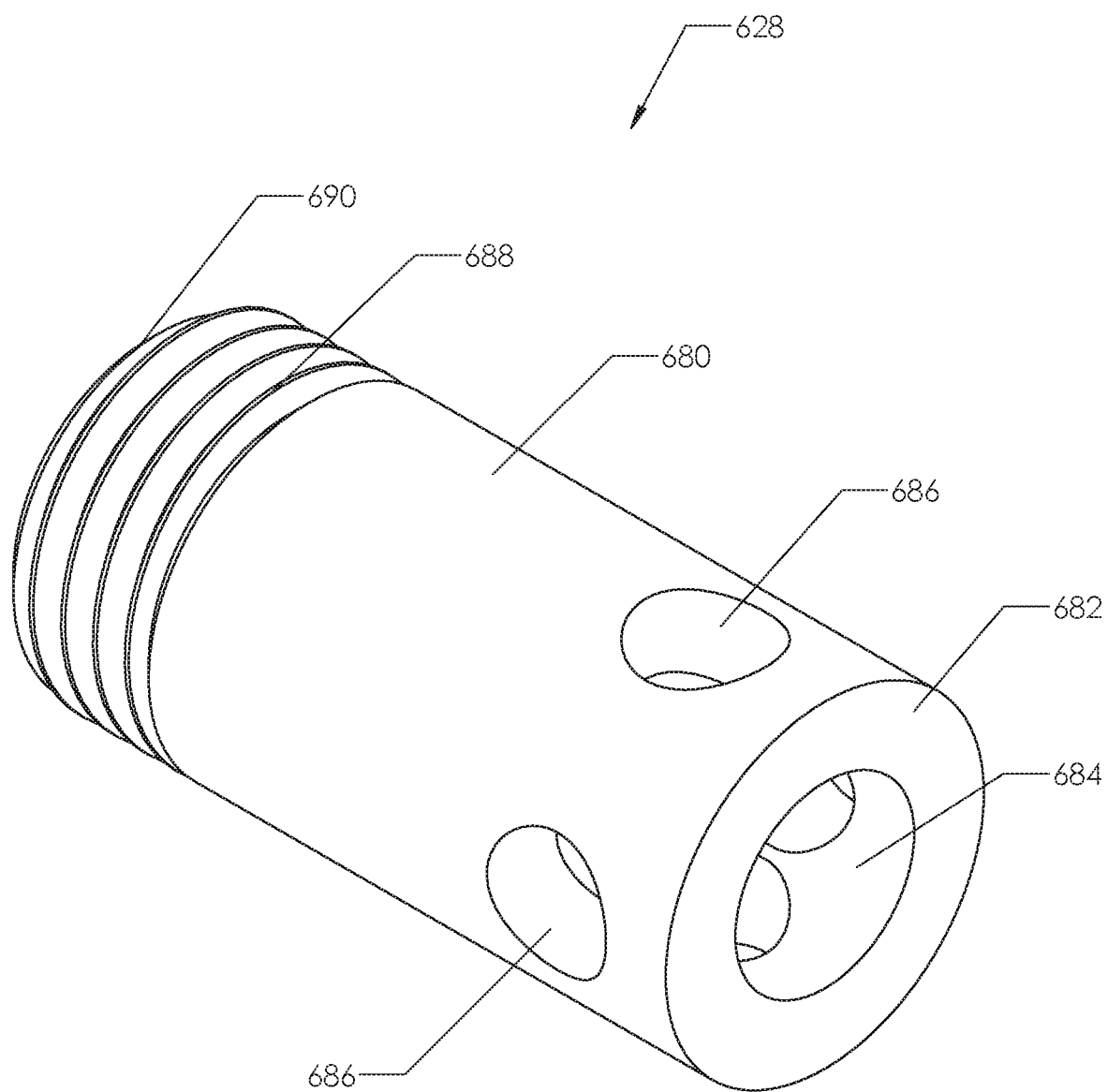
FIG. 60 is an isometric view of a third embodiment of a router guide bushing for a machining guide for mounting on a rotationally molded product.
Figure 61:
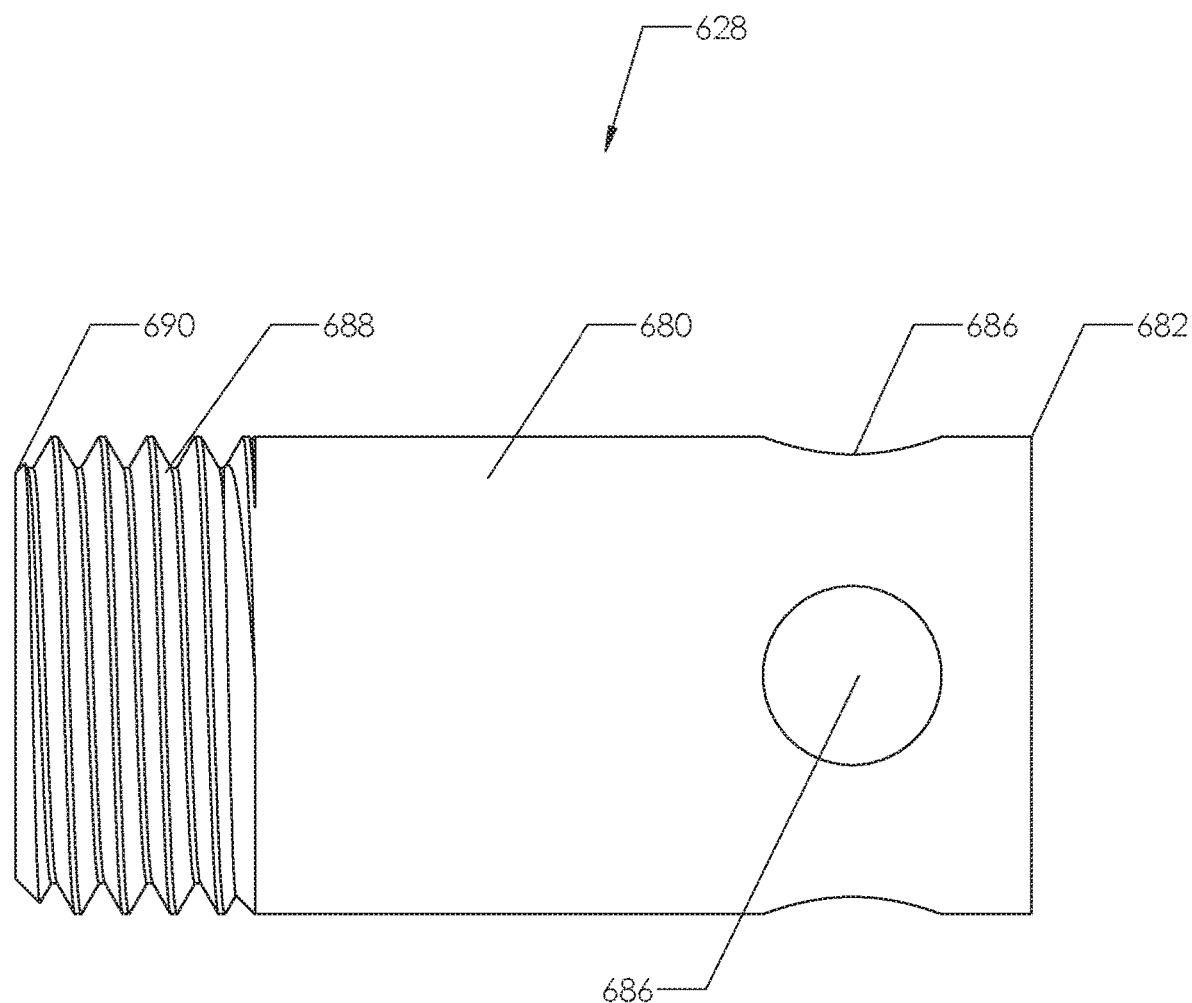
FIG. 61 is a side view of a third embodiment of a router guide bushing for a machining guide for mounting on a rotationally molded product.
Figure 62:
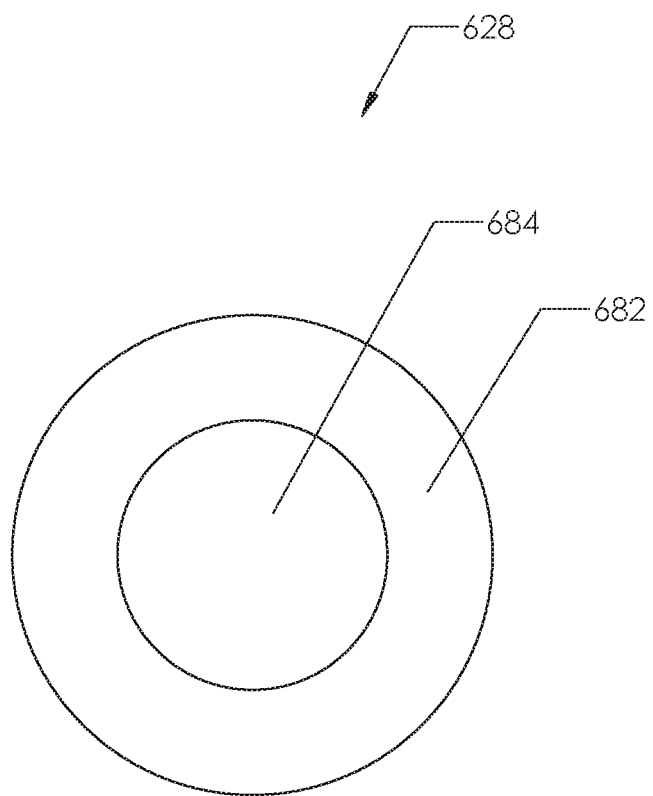
FIG. 62 is a first end view of a third embodiment of a router guide bushing for a machining guide for mounting on a rotationally molded product.
Figure 63:
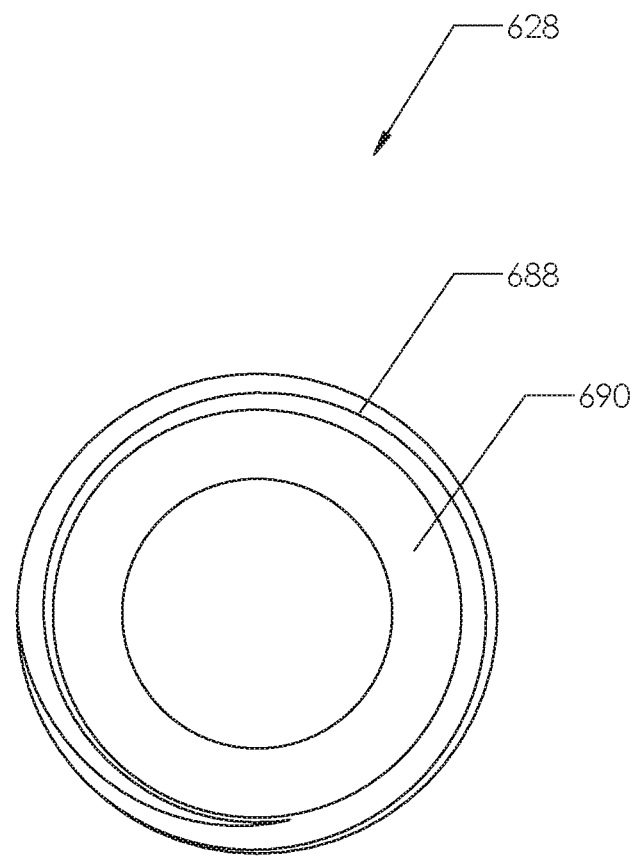
FIG. 63 is a second end view of a third embodiment of a router guide bushing for a machining guide for mounting on a rotationally molded product.

FIG. 55 illustrates a side view of a guide plate 612 with hidden lines shown. In this view, the bottom of handle 616 can be seen. The bottom of handle 616 is threaded 658 in order to allow the handle to be coupled in hole 656 formed in the guide plate 612.

Additionally, first router opening 630 has a larger opening at the top and narrows abruptly towards the bottom forming a lip for supporting the router guide bushing.

Second router opening 632 also is larger at the top and narrows towards the bottom. Additionally, second router opening 632 extends into a cylindrical extension 652 coupled to the bottom surface of the guide plate 612. Cylindrical extension 652 is a hollow cylindrical member which allows the router to cut deeper into the product in order to remove the excess material in the center of the lock ring.

FIGS. 56-59 illustrate a second embodiment of a router guide bushing 626. The second embodiment of a router guide bushing 626 is shorter and larger in diameter than the previous embodiment of a router guide bushing discussed above. Router guide bushing 626 is a cylindrical member 660 with a threaded 668 top 670. The router guide bushing 626 is open in the interior 664 with additional openings 666 in the sides of the router guide bushing 626 near the bottom 662. These additional openings 666 allow particles and the like from machining to leave the router guide bushing 626.

The router guide bushing 626 is configured to couple at its threaded end 670 to a router. The bit of the router extends through the interior 664 of the router guide bushing 626 and below the bottom 662 of the router guide bushing 626.

The router guide bushing 626 is coupled to the router and then the router guide bushing 626 is inserted into the router opening 630 in the guide plate 612. The router bit extends through the narrow bottom of the router opening 630 with the router guide bushing 626 being supported by the larger top portion of the router opening 630.

After the router guide bushing 626 is inserted into the router opening 630, the router may be used to form a channel in the surface of the molded product.

FIGS. 60-63 illustrate a third embodiment of a router guide bushing 628. The third embodiment of a router guide bushing 628 is narrower and longer than the second embodiment of a router guide bushing 626. Router guide bushing 628 is a cylindrical member 680 with a threaded 688 top 690. The router guide bushing 628 is open in the interior 684 with additional openings 686 in the sides of the router guide bushing 628 near the bottom 682. These additional openings 686 allow particles and the like from machining to leave the router guide bushing 628.

The router guide bushing 628 is configured to couple at its threaded end 690 to a router. The bit of the router extends through the interior 684 of the router guide bushing 628 and below the bottom 682 of the router guide bushing 628.

The router guide bushing 628 is coupled to the router and then the router guide bushing 628 is inserted into the router opening 632 in the guide plate 612. The router guide bushing 628 and the router bit extend into the cylindrical extension 652 with the router bit extending through the narrow bottom of the router opening 632 with the router guide bushing 628 being supported by the larger top portion of the router opening 632.

After the router guide bushing 628 is inserted into the router opening 632, the router may be used to remove a circular section of the molded product within the lock ring 10.

Figure 64:
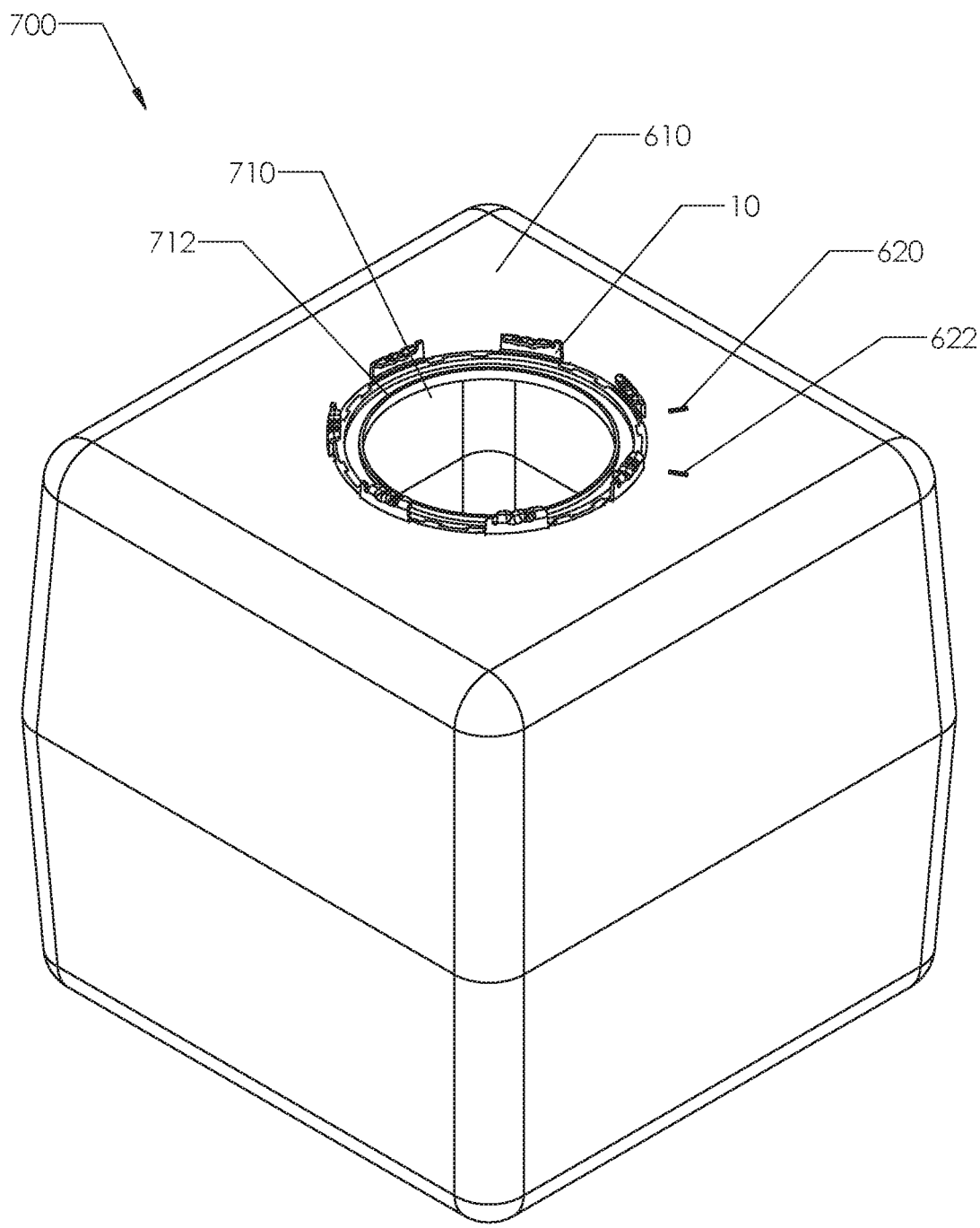
FIG. 64 is an isometric view of a completed rotationally molded product completed by a second embodiment of a method of rotationally molding a product with an embedded ring.

FIG. 64 illustrates a completed product 700. Molded product 610 is illustrated with embedded lock ring 10. Opening 710 has been cut in the center of the lock ring 10 with a router as discussed previously. Channel 712 was also machined into the surface of the molded product with a router as discussed previously. Channel 712 will receive an O-ring.

Figure 65:
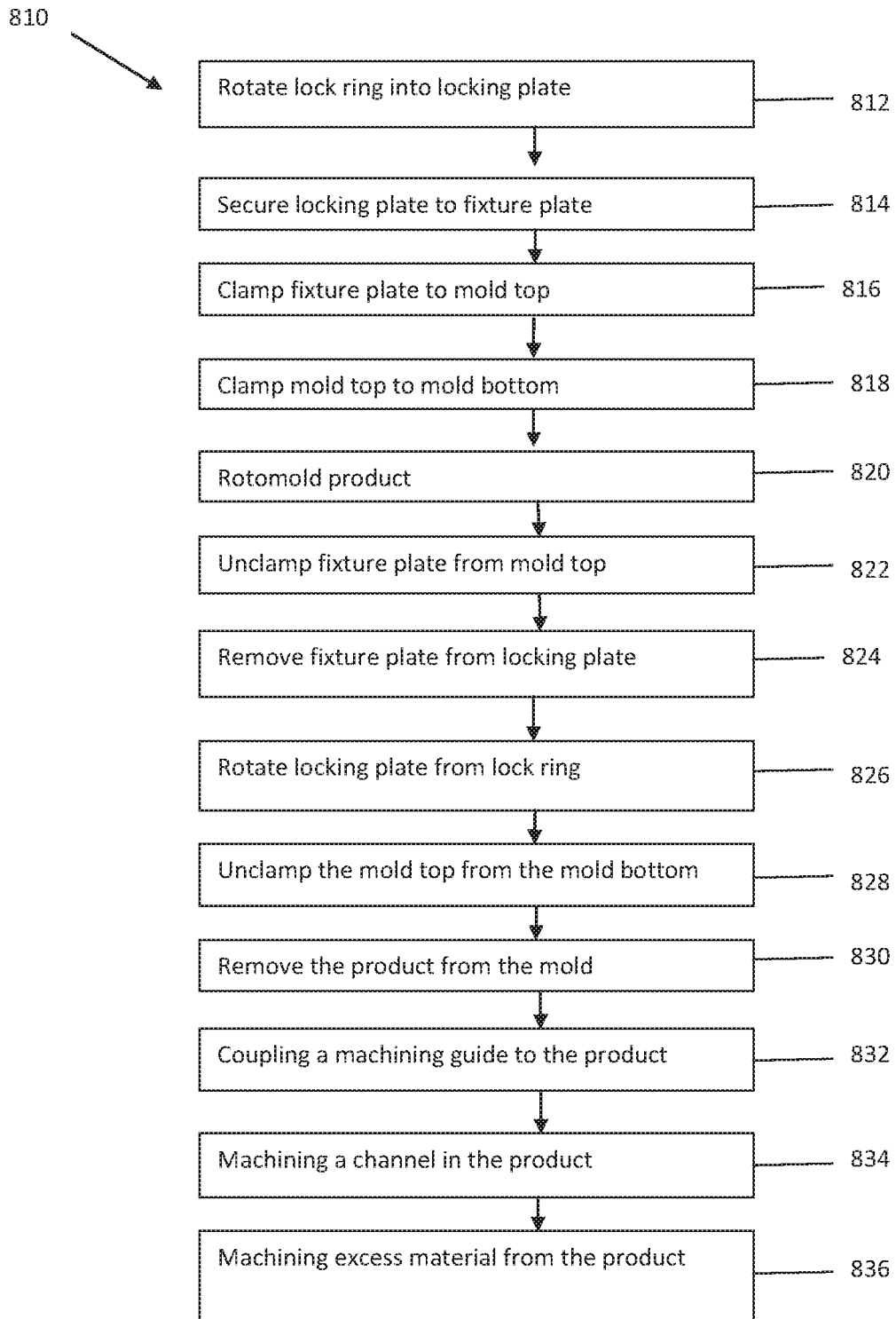
FIG. 65 is a flow chart of a second embodiment of a method of rotationally molding a product with an embedded ring.

FIG. 65 illustrates a method 810 of manufacturing a product, such as a tank, with an embedded insert such as a lock ring 10. Step 812 of the method involves rotating the lock ring into the locking plate. The lock ring is placed into the locking plate so that the coupler teeth extend above the locking plate surface. The locking plate is then rotated with respect to the lock ring so that the coupler teeth are locked into place in the slots in the locking plate.

Step 814 of the method is to secure the locking plate to the fixture plate. The locking plate is secured to the fixture plate through the use of couplers such as bolts, screws, or the like. While adhesives or epoxies may be used, it is desirable to be able to disassemble the locking plate and fixture plate when the molding is done.

Step 816 is to clamp the fixture plate to the mold top. The fixture plate may be clamped into a fixture opening formed anywhere in the mold. The fixture plate is placed in the fixture opening with the mounting tabs of the lock ring pointing towards the inside of the mold. The fixture plate is secured in place by using large clamps.

Step 818 is to assemble the mold by clamping the top of the mold to the bottom of the mold.

Step 820 is to mold the product. While the product may be molded with injection molding, rotomolding or any other process desired. It is anticipated that this fixture and process will most likely be used in a rotomolding process.

Once the product has been molded and cooled, step 822 is to unclamp the fixture plate from the top of the mold.

Step 824 is to remove the fixture plate from the locking plate. The fixture plate is removed from the locking plate by removing the nuts and washers from the fixture plate bolts. The fixture plate can then be lifted up off of the locking plate.

Step 826 is to rotate the locking plate from the lock ring. The locking plate may be uncoupled from the lock ring by rotating the locking plate in the opposite direction it was rotated previously. Once the coupler teeth are free from the slots in the locking plate, the locking plate may be lifted free from the lock ring. The lock ring is now embedded in the product.

Step 828 is to unclamp the mold top and the mold bottom.

Step 830 is to remove the product from the mold top and the mold bottom.

Step 832 is to couple a machining guide to the lock ring embedded in the top of the product. The machining guide is coupled to the lock ring by placing the guide ring over the lock ring. The guide plate is placed in the lock ring. Step 834 is machining a channel in the product. A router is placed in the router guide bushing in a router opening on the guide plate. The guide plate is then rotated and the router cuts a channel in the product adjacent the lock ring. The channel is configured to receive an O-ring.

Step 836 is to insert a router into the machining guide and by rotating the guide plate in the machining guide, to machine the excess material out of the inside of the lock ring on the molded part.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The flowchart in the Figures illustrates the operation of a possible implementation of methods according to various embodiments of the present invention. It should also be noted that, in some alternative implementations, the steps noted in the blocks may occur out of the order noted in the figures. For example, two blocks shown in succession may, in fact, be done substantially concurrently, or the blocks may sometimes be completed in the reverse order, depending upon the method involved.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A system for rotationally molding a ring into a product, the system comprising:
   a rotational molding mold;
   an opening formed in said rotational molding mold sized to fit a ring;
   said ring comprising a plurality of coupler teeth and mounting tabs;
   a fixture removably coupled to said ring, wherein said ring and said fixture when coupled are removably coupled in said opening;
   said fixture comprising:
     a locking plate;
     a plurality of slots formed in said locking plate, wherein said plurality of slots rotatably receive said plurality of coupler teeth of said ring; and
     a fixture plate removably coupled to said locking plate, wherein said fixture plate and said locking plate form a solid surface within said ring, said fixture plate covering the slots in said locking plate; and
   wherein said fixture is removed from said ring after said ring is molded into a product.

2. The system of claim 1, wherein said fixture further comprises a handle.

3. The system of claim 1, wherein said locking plate and said fixture plate further comprise a draft, said draft causing said locking plate and said fixture plate to sit flush when coupled.

4. The system of claim 1, wherein said fixture further comprises a circular shaped ridge within said mounting tabs of said ring for creating a channel in a product during molding.

5. The system of claim 4, wherein said channel is configured to receive an O-ring after rotational molding of said product.

6. The system of claim 1, further comprising at least one alignment mark coupled to said rotational molding mold and at least one alignment mark coupled to said fixture.

7. The system of claim 1, wherein said locking plate further comprises couplers for coupling said fixture plate to a top of said locking plate.

8. The system of claim 1, wherein said fixture further comprises at least one triangular lock, wherein said at least one triangular lock mates with said coupler teeth and locks said coupler teeth in place in said locking plate.

9. A fixture for holding a ring in a mold for rotational molding comprising:
   a locking plate, wherein said locking plate receives a plurality of coupling teeth on a ring, wherein the plurality of coupling teeth operate to securely lock an accessory into place after the molded part is formed;
   wherein said locking plate locks said ring into the fixture;
   a fixture plate coupled to said locking plate, wherein said fixture plate and said locking plate form a solid surface;
   said fixture plate having a ridge for placement in a fixture opening in a rotational molding mold; and
   a circular ridge coupled to a bottom of said locking plate, wherein said ridge forms a channel in a product formed in said rotational molding mold.

10. The fixture of claim 9, wherein said channel is formed adjacent said ring in said product.

11. The fixture of claim 10, wherein said channel formed in said product is configured to receive an O-ring after said product has been molded.

12. The fixture of claim 9, wherein said locking plate further comprises at least one coupler for coupling said fixture plate to a top of said locking plate.

13. The fixture of claim 9, wherein said locking plate and said fixture plate further comprise a draft, said draft causing said locking plate and said fixture plate to sit flush when coupled.

14. A system for rotationally molding a ring into a product, the system comprising:
   a rotational molding mold comprising at least two mold parts; and
   a fixture coupled to a ring, wherein:
   the ring comprises a plurality of coupler teeth extending perpendicularly from a body of the ring;
   the coupler teeth extend parallel to an axis of said ring;
   the fixture receives the plurality of coupler teeth when the ring is coupled to the fixture; and
   the fixture and the ring are coupled to at least one of the at least two mold parts, wherein the ring comprises coupler teeth to securely lock an accessory into place after the molded part is formed; and
   wherein said fixture and said ring are uncoupled after said ring is molded into a product.

15. The system of claim 14, further comprising a circular ridge coupled to a bottom of said fixture, wherein said ridge forms a channel in a product formed in said rotational molding mold.

16. The system of claim 15, wherein said channel is formed adjacent said ring in said product.

17. The system of claim 14, wherein said fixture further comprises a handle.

18. The system of claim 14, wherein said fixture further comprises coupler locations for coupling said fixture.

19. The system of claim 14, wherein said fixture further comprises at least one triangular lock for locking said coupler teeth in said fixture.

* * * * *